(12) United States Patent
Kawano et al.

(10) Patent No.: US 11,188,288 B2
(45) Date of Patent: *Nov. 30, 2021

(54) CONTROL DEVICE AND CONTROL METHOD TO ISSUE NOTIFICATION ON OCCURRENCE OF PROCESSING OVERFLOW

(71) Applicant: SONY CORPORATION, Tokyo (JP)

(72) Inventors: Shinichi Kawano, Tokyo (JP); Miwa Ichikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,501

(22) Filed: Apr. 8, 2020

(65) Prior Publication Data

US 2020/0233630 A1    Jul. 23, 2020

Related U.S. Application Data

(63) Continuation of application No. 16/096,754, filed as application No. PCT/JP2017/010313 on Mar. 15, 2017, now Pat. No. 10,649,715.

(30) Foreign Application Priority Data

May 2, 2016    (JP) ................. 2016-092413

(51) Int. Cl.
| | | |
|---|---|---|
| *G06F 3/16* | (2006.01) | |
| *G09F 27/00* | (2006.01) | |
| *G10L 15/22* | (2006.01) | |
| *G10L 15/28* | (2013.01) | |
| *G10L 15/10* | (2006.01) | |

(52) U.S. Cl.
CPC ............. *G06F 3/16* (2013.01); *G06F 3/167* (2013.01); *G09F 27/00* (2013.01); *G10L 15/10* (2013.01); *G10L 15/22* (2013.01); *G10L 15/28* (2013.01)

(58) Field of Classification Search
CPC ...................................................... G06F 3/16
See application file for complete search history.

(56) References Cited

U.S. PATENT DOCUMENTS

| | | | |
|---|---|---|---|
| 2008/0165791 A1* | 7/2008 | DeGrazia | H04M 3/42391 370/412 |
| 2009/0138507 A1 | 5/2009 | Burckart et al. | |
| 2010/0283829 A1 | 11/2010 | De Beer et al. | |

(Continued)

FOREIGN PATENT DOCUMENTS

| | | |
|---|---|---|
| EP | 3239976 A1 | 11/2017 |
| JP | 2006-085440 A | 3/2006 |

(Continued)

OTHER PUBLICATIONS

Non-Final Office Action for U.S. Appl. No. 16/096,754, dated Sep. 5, 2019, 15 pages.

(Continued)

*Primary Examiner* — Joseph Saunders, Jr.
(74) *Attorney, Agent, or Firm* — Chip Law Group

(57) ABSTRACT

Provided is a control device including a control unit that executes a process of causing a speaker to stop speaking on a device toward which the speaker speaks on a basis of a result obtained by analyzing speech content based on a result of the speaker speaking toward the device.

13 Claims, 51 Drawing Sheets

(56) References Cited

U.S. PATENT DOCUMENTS

2015/0347399 A1  12/2015  Aue et al.
2015/0350451 A1  12/2015  Aue et al.

FOREIGN PATENT DOCUMENTS

| JP | 2009-276495 A | 11/2009 |
| JP | 2011-061450 A | 3/2011 |
| JP | 2011-141819 A | 7/2011 |
| JP | 2013-191103 A | 9/2013 |
| JP | 2015-219768 A | 12/2015 |

OTHER PUBLICATIONS

Notice of Allowance for U.S. Appl. No. 16/096,754, dated Jan. 13, 2020, 07 pages.
International Search Report and Written Opinion of PCT Application No. PCT/JP2017/010313, dated May 30, 2017, 06 pages of English Translation and 06 pages of ISRWO.
International Preliminary Report on Patentability of PCT Application No. PCT/JP2017/010313, dated Nov. 15, 2018, 07 pages of English Translation and 04 pages of IPRP.

* cited by examiner

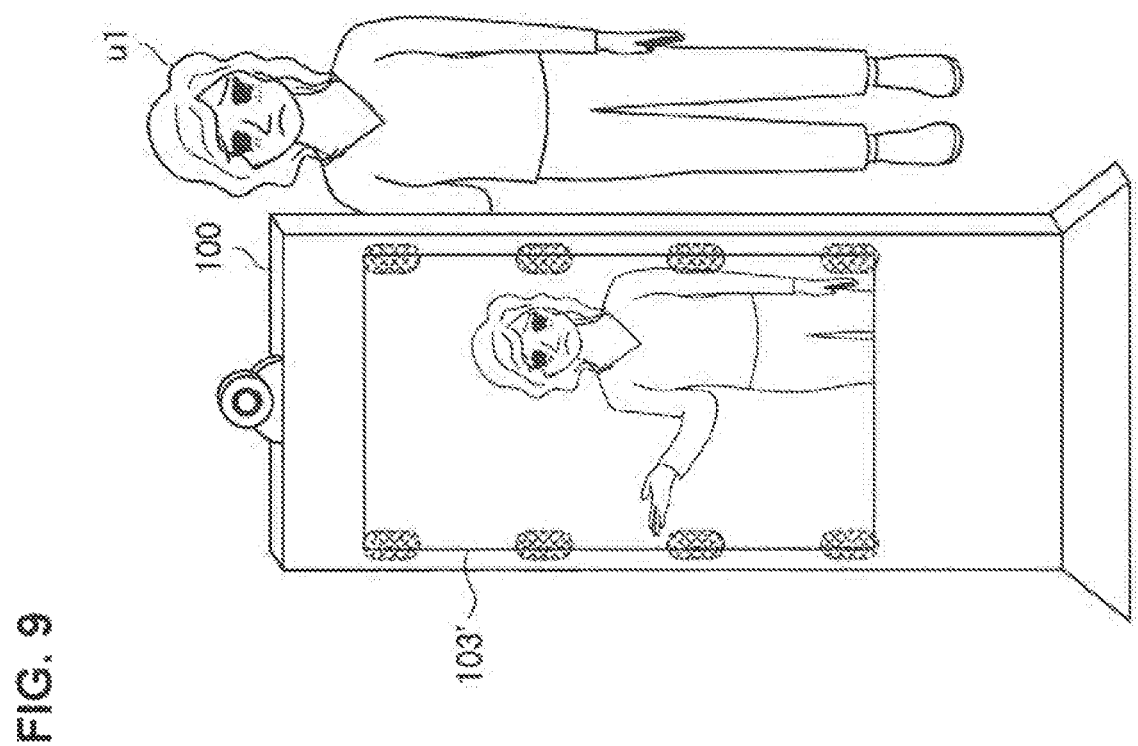
FIG. 9
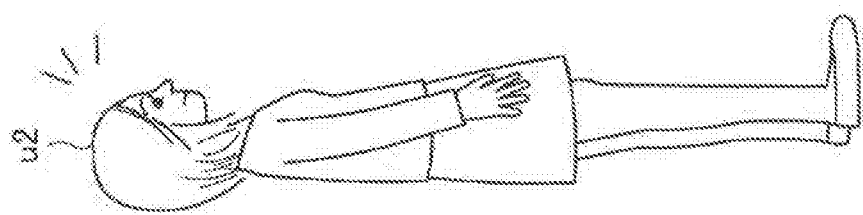

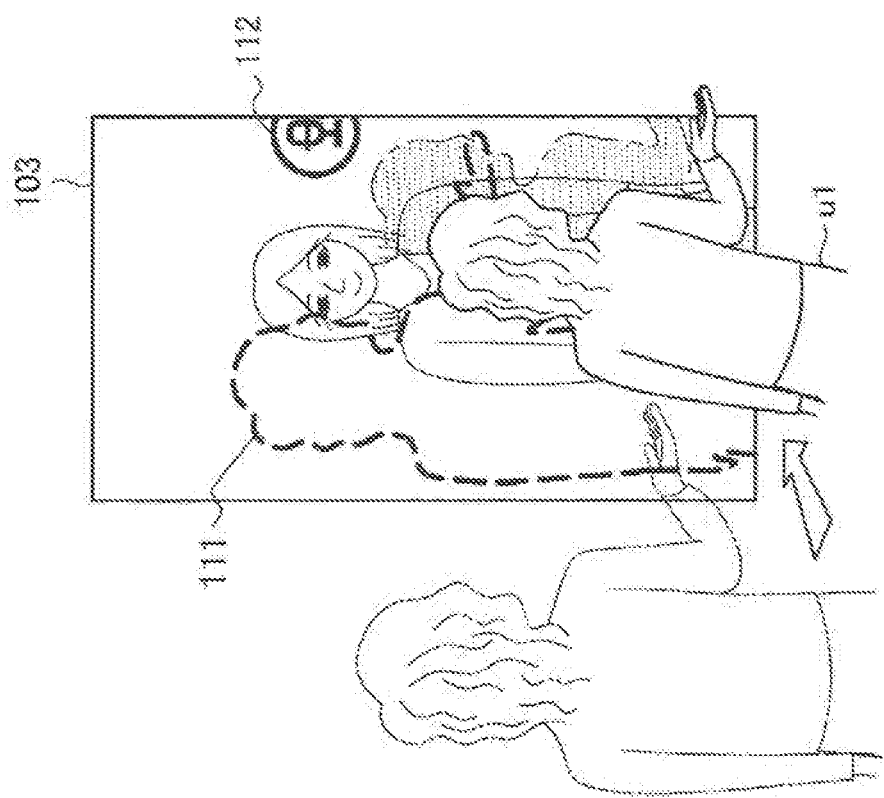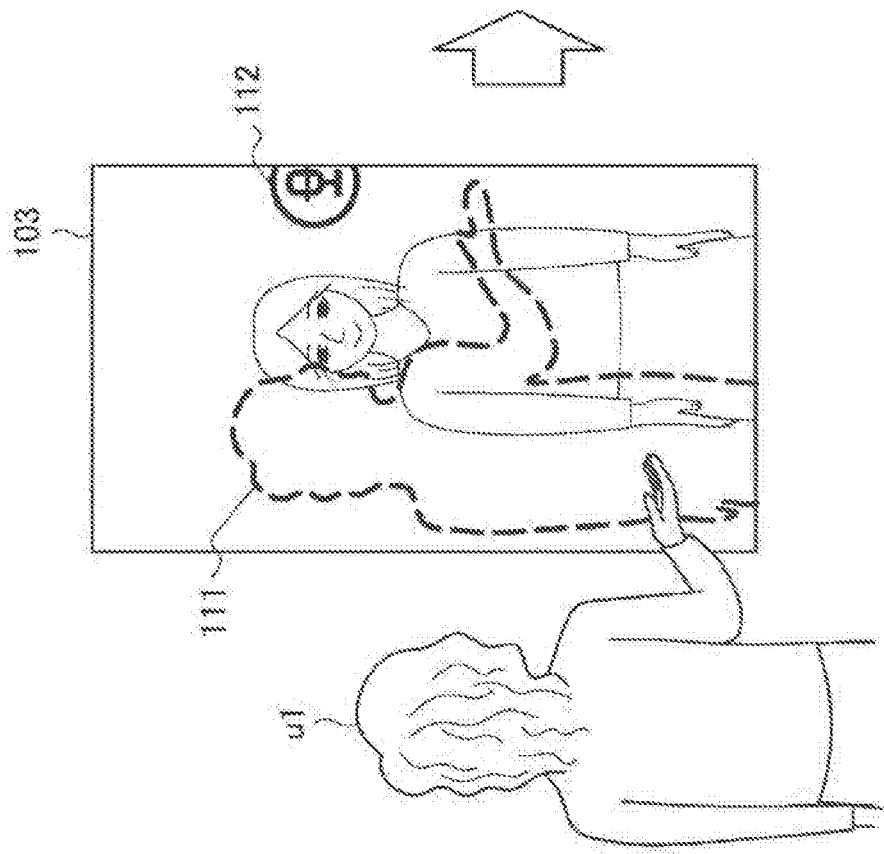
FIG. 14

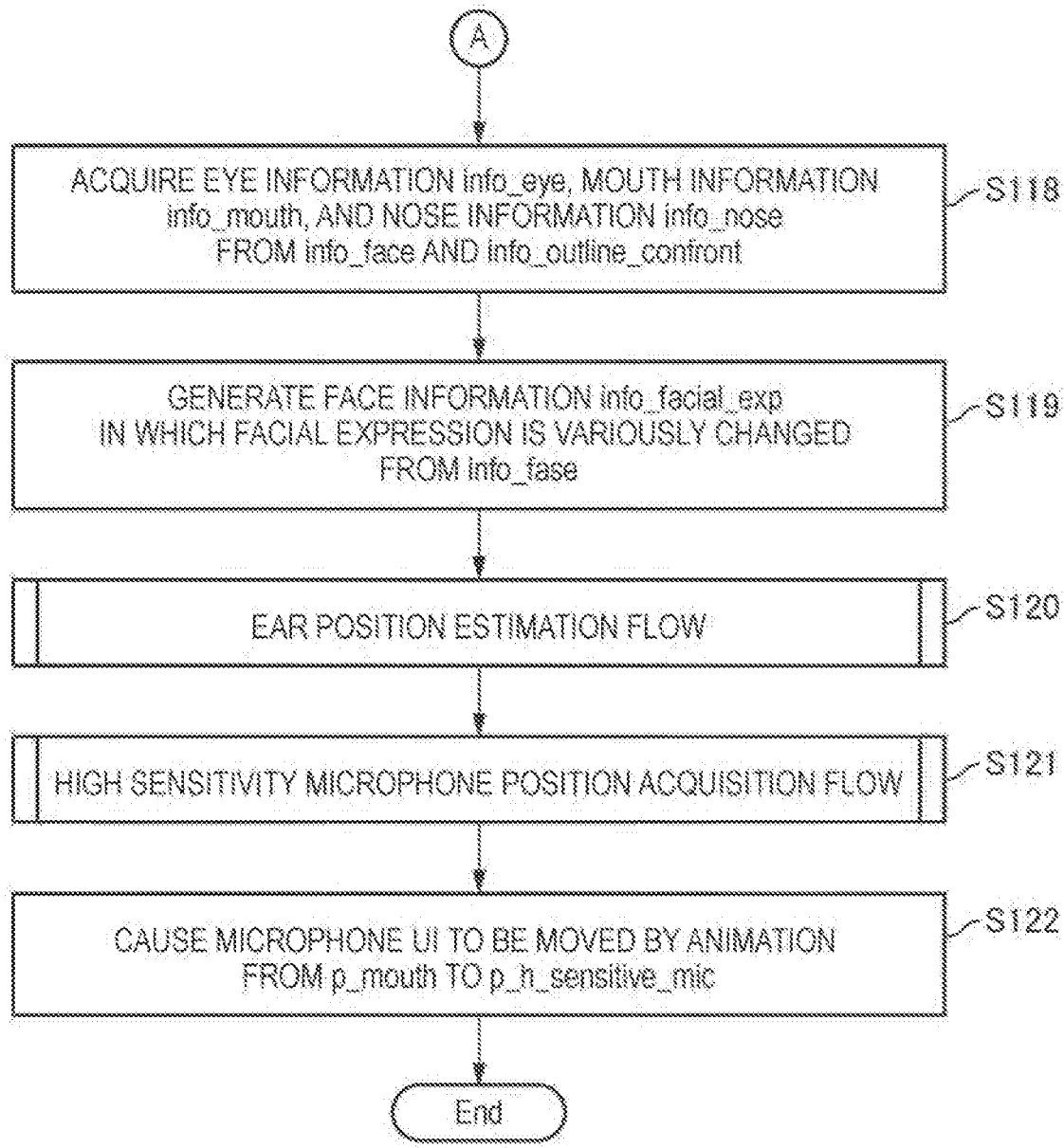

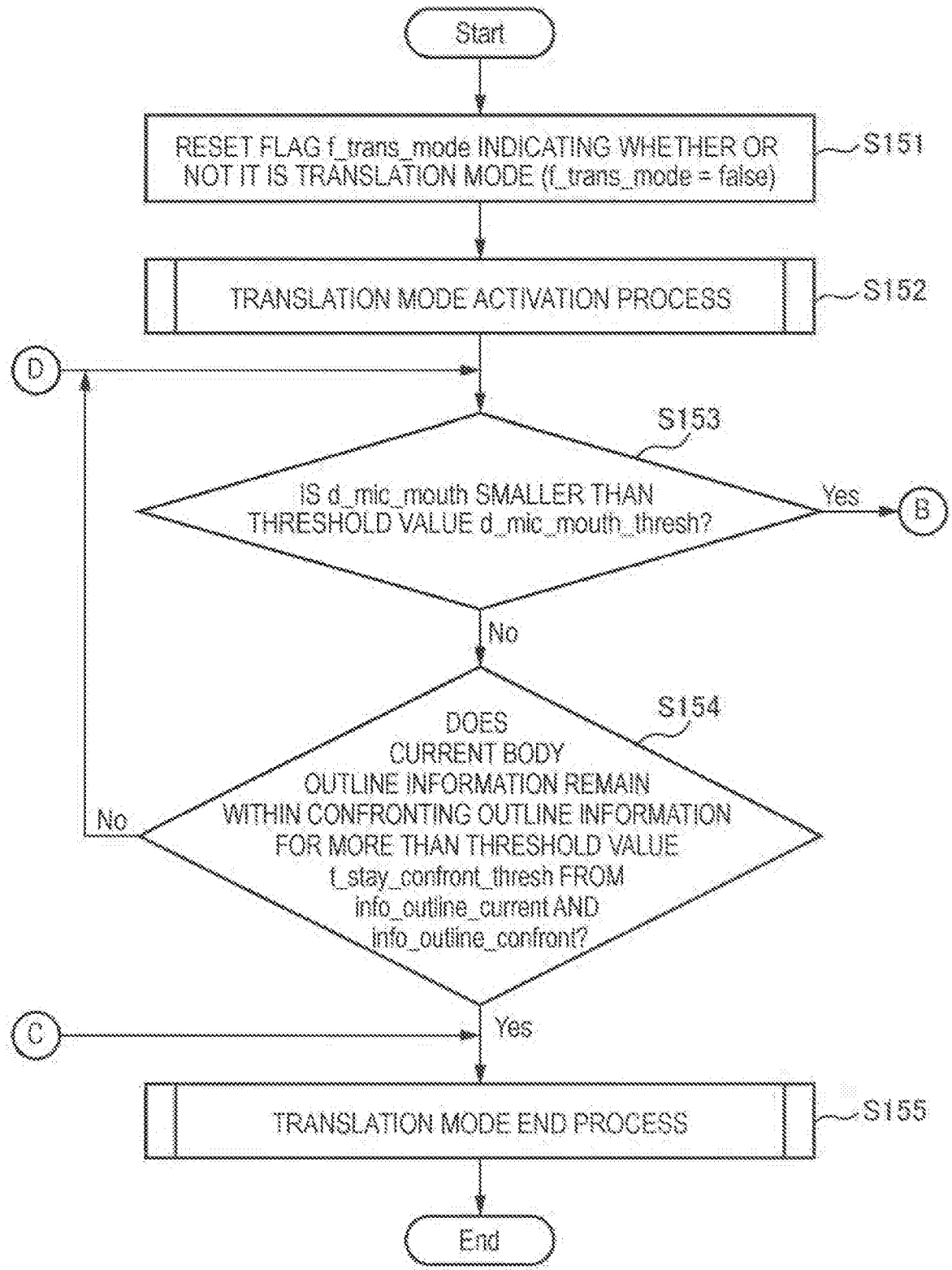

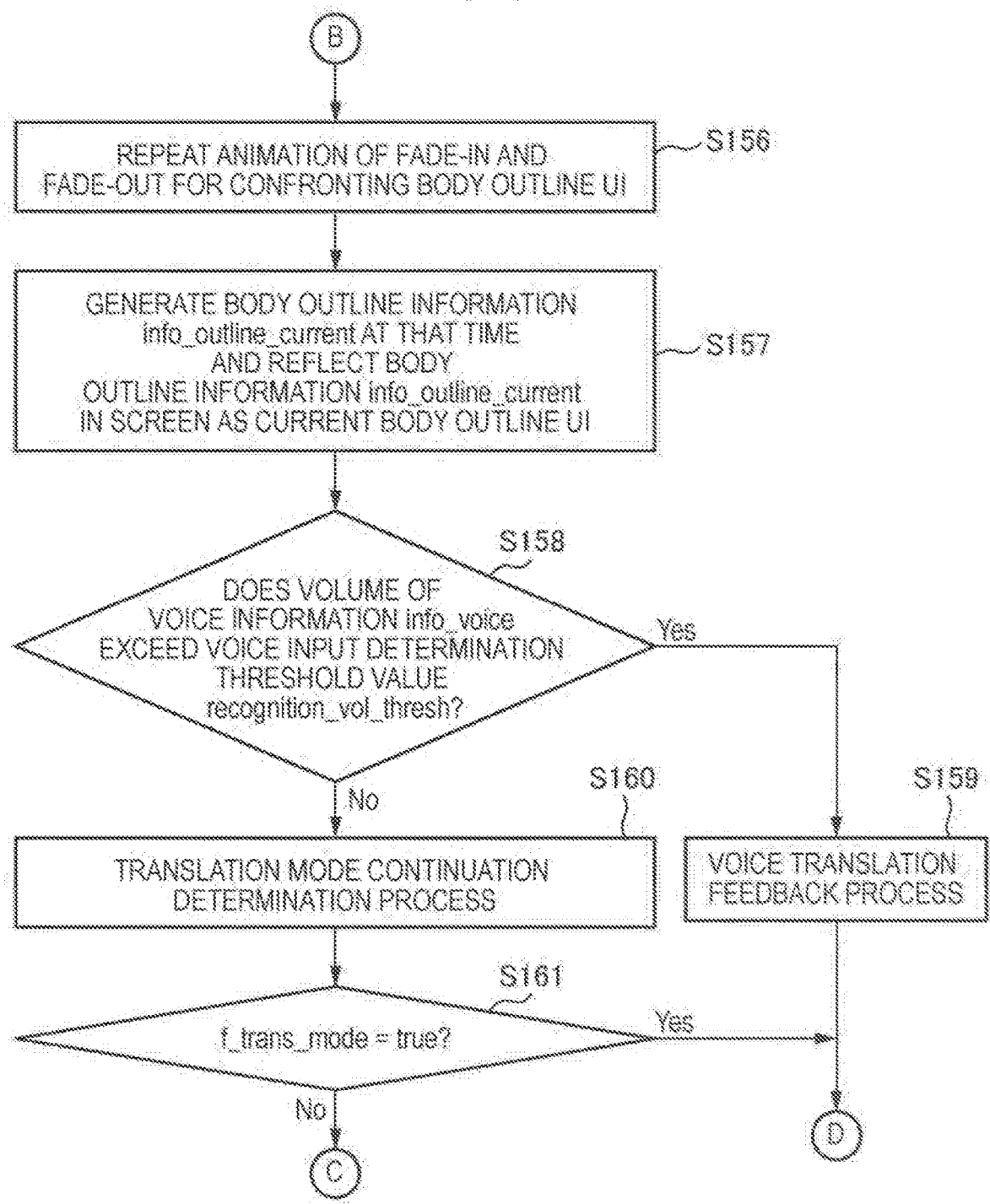

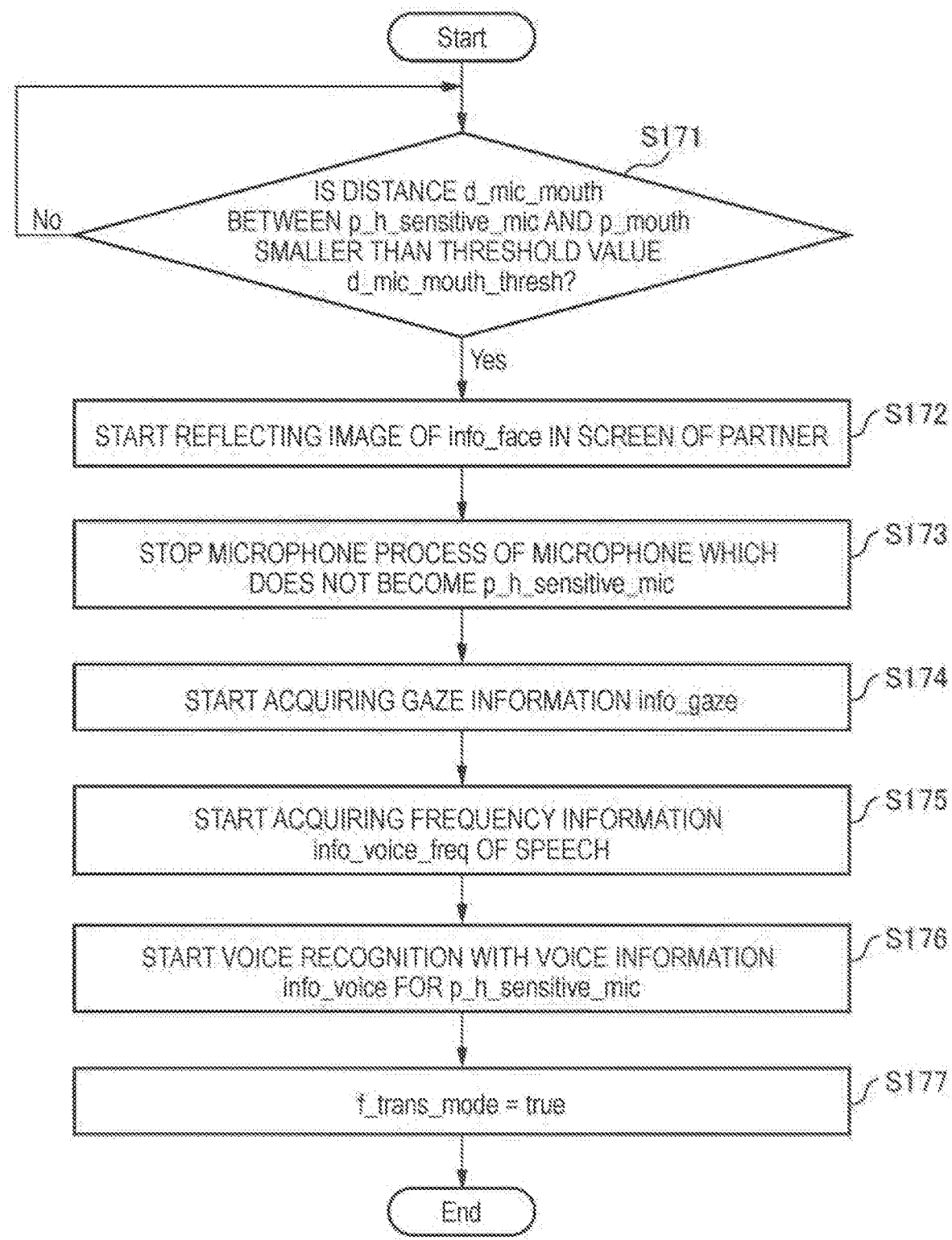

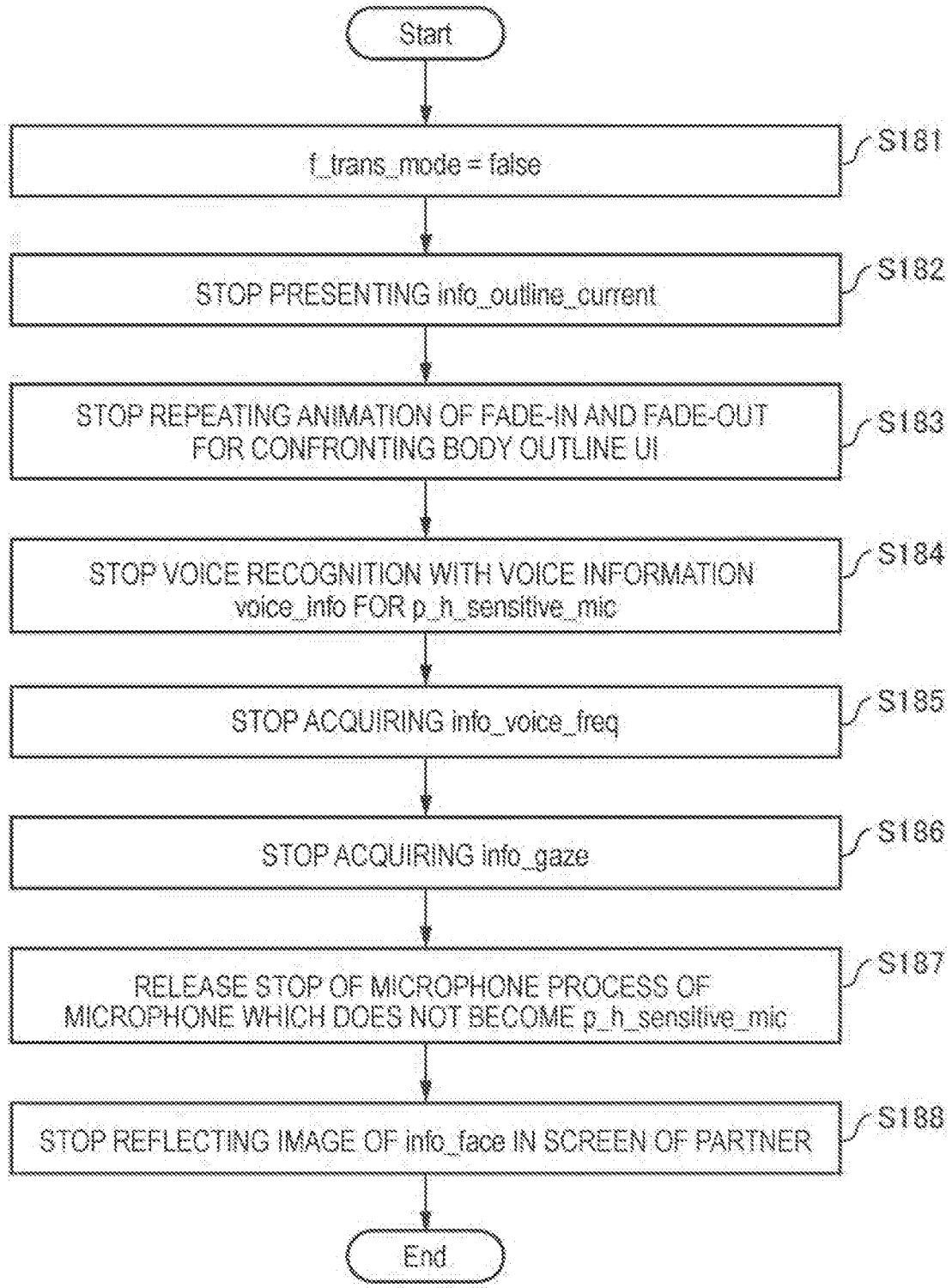

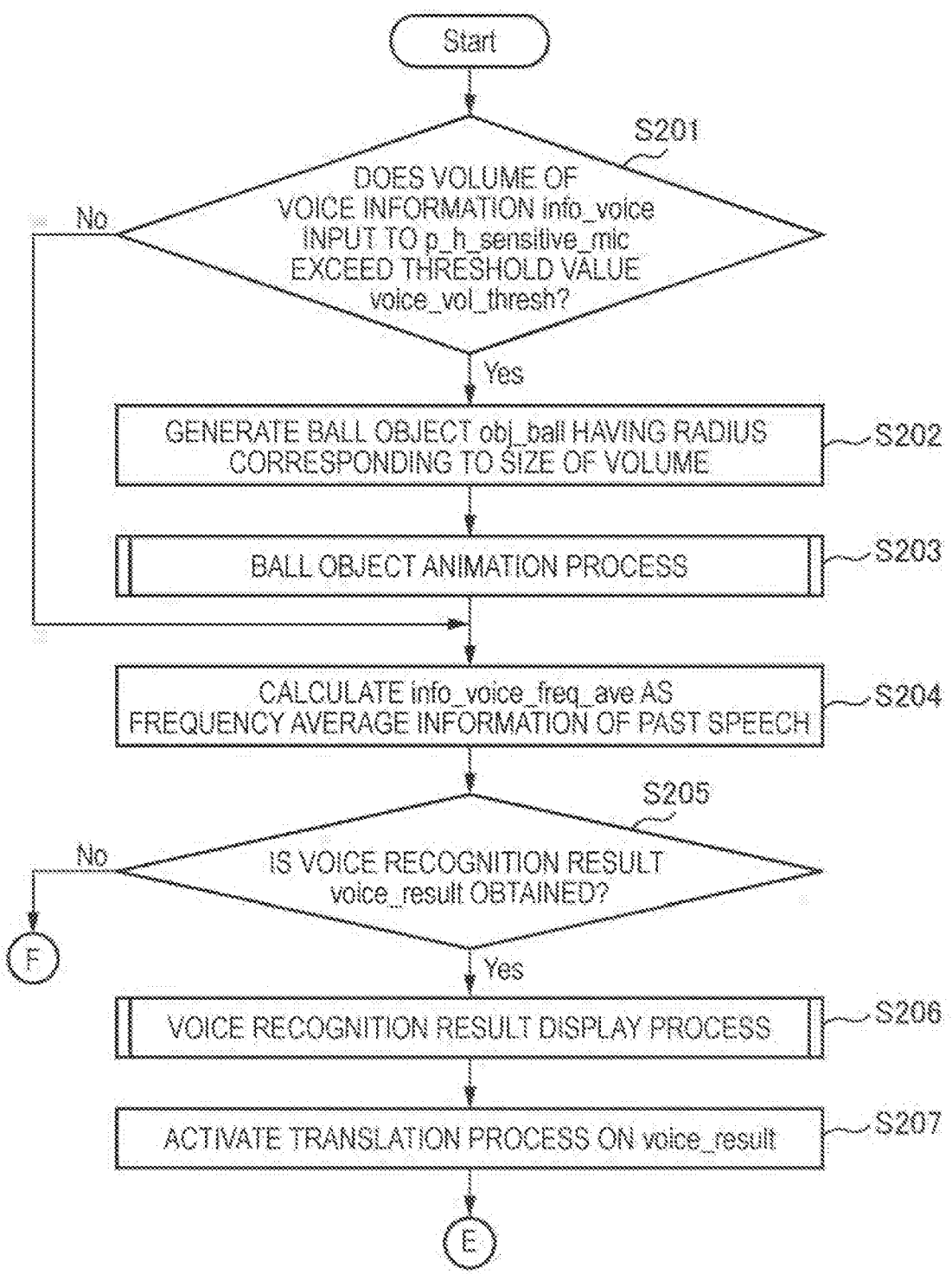

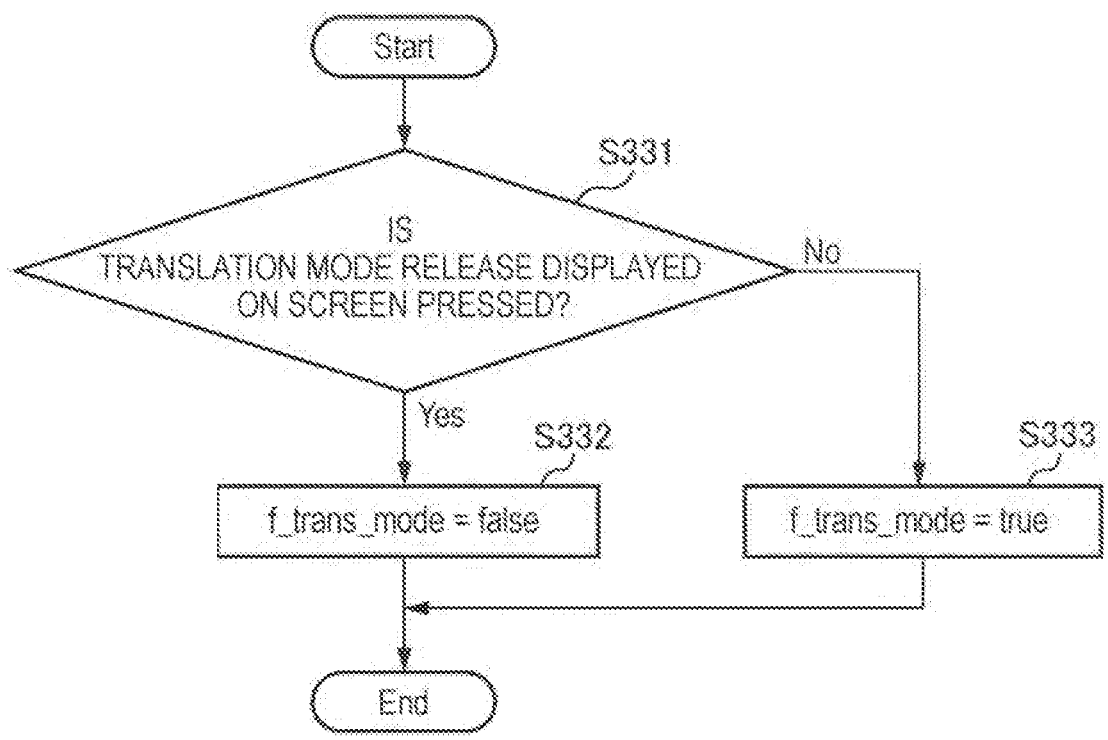

CONTROL DEVICE AND CONTROL METHOD TO ISSUE NOTIFICATION ON OCCURRENCE OF PROCESSING OVERFLOW

CROSS REFERENCE TO RELATED APPLICATIONS

This application is a continuation application of U.S. patent application Ser. No. 16/096,754, filed Oct. 26, 2018, which is a U.S. National Phase of International Patent Application No. PCT/JP2017/010313 filed on Mar. 15, 2017, which claims priority benefit of Japanese Patent Application No. JP 2016-092413 filed in the Japan Patent Office on May 2, 2016. Each of the above-referenced applications is hereby incorporated herein by reference in its entirety.

TECHNICAL FIELD

The present disclosure relates to a control device, a control method, and a computer program.

BACKGROUND ART

Techniques of recognizing characters or a voice and translating the characters or the voice into other languages are being developed. Further, techniques for applying such translation techniques in various fields are also being developed. For example, Patent Literature 1 discloses an example of a technique in which a translation technique is applied to a signage terminal.

CITATION LIST

Patent Literature

Patent Literature 1:
JP 2015-219768A

DISCLOSURE OF INVENTION

Technical Problem

If a person who performs speech (hereinafter also referred to as a "speaker") continuously speaks unilaterally, a listener is unable to process information, but when the listener forces the speaker to stop speaking, communication is unable to be smoothly performed.

In this regard, the present disclosure proposes a control device, a control method, and a computer program which are novel and improved and capable of causing the speaker or the listener to understand a situation of the listener while the speaker is speaking.

Solution to Problem

According to the present disclosure, there is provided a control device including: a control unit configured to execute a process of causing a speaker to stop speaking on a device toward which the speaker speaks on a basis of a result obtained by analyzing speech content based on a result of the speaker speaking toward the device.

In addition, according to the present disclosure, there is provided a control method including: executing a process of causing a speaker to stop speaking on a device toward which the speaker speaks on a basis of a result obtained by analyzing speech content based on a result of the speaker speaking toward the device.

In addition, according to the present disclosure, there is provided a computer program causing a computer to execute a process of causing a speaker to stop speaking on a device toward which the speaker speaks on a basis of a result obtained by analyzing speech content based on a result of the speaker speaking toward the device.

Advantageous Effects of Invention

As described above, according to the present disclosure, it is possible to provide a control device, a control method, and a computer program which are novel and improved and capable of continuing the translation process smoothly.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is an explanatory diagram describing an operation example of a communication system 1 according to the embodiment.

FIG. 14 is an explanatory diagram illustrating an example in which a user u1 brings her face closer to a high sensitivity microphone position.

FIG. 30B is a flowchart illustrating an operation example of a communication system 1 according to the embodiment.

FIG. 36A is a flowchart illustrating an operation example of a communication system 1 according to the embodiment.

FIG. 36B is a flowchart illustrating an operation example of a communication system 1 according to the embodiment.

FIG. 37 is a flowchart illustrating an operation example of a communication system 1 according to the embodiment.

FIG. 38 is a flowchart illustrating an operation example of a communication system 1 according to the embodiment.

FIG. 39A is a flowchart illustrating an operation example of a communication system 1 according to the embodiment.

FIG. 52 is a flowchart illustrating an operation example of a communication system 1 according to the embodiment.

MODE(S) FOR CARRYING OUT THE INVENTION

Figure 1:
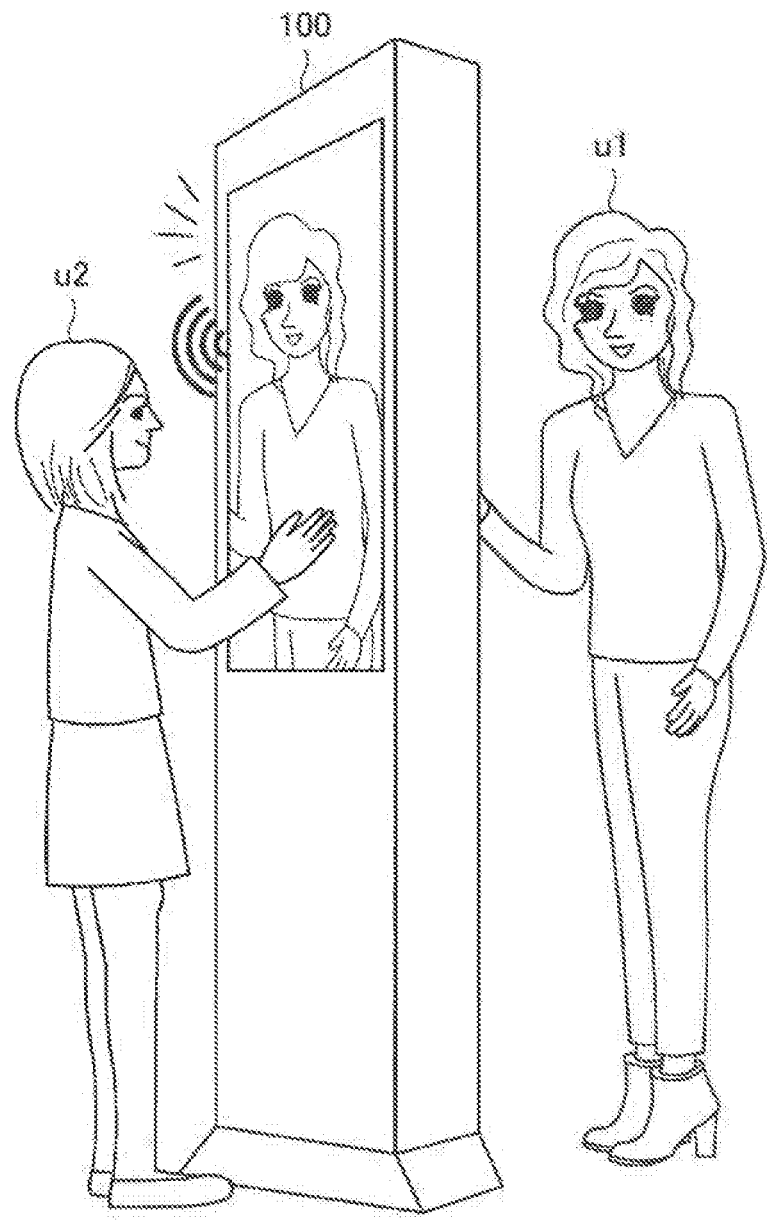
FIG. 1 is an explanatory diagram illustrating a communication system using a signage terminal 100 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. Embodiment of Present Disclosure
1.1. Overview
1.2. Configuration Example
1.3. Operation Example
2. Conclusion

1. EMBODIMENT OF PRESENT DISCLOSURE

1.1. Overview

An overview of an embodiment of the present disclosure will be described before describing an embodiment of the present disclosure in detail.

As described above, techniques of recognizing characters or a voice and translating the characters or the voice into other languages are being developed. Further, techniques for applying such translation techniques in various fields are also being developed. For example, an example of a technique of facilitating communication between people by applying a translation technique of a signage terminal including a transparent display is disclosed in Patent Literature 1.

For example, in a situation in which people communicate while facing each other, in particular, presenting conversation and translation results via a signage terminal placed on a street, a videophone that connects remote sites, or the like is considered. In a case in which people communicate while facing each other via the signage terminal as described above, it is necessary to consider the following points.

(1) When Speech Starts

In a case in which a distance between a speaker's mouth and a microphone installed in the signage terminal is far, the signage terminal is more likely to fail in voice recognition. Further, in the signage terminal, if a voice recognition process is constantly in an activated state, since it is difficult to specify an interval of a voice recognition target, a possibility of failure of the voice recognition increases. Further, in a signage terminal with a large display size, it is not realistic to optimize a position of a microphone to be directed toward everyone, and the microphone has to be arranged at a position at which a body movement increases for a certain person during speech.

In other words, it is necessary for the speaker to bring his/her mouth closer to the microphone, but when the speaker moves his/her body closer to the microphone or moves his/her mouth closer to the microphone, the speaker's posture collapses, and a conversation partner is likely to feel uncomfortable. Further, in a case in which a user interface for activating the voice recognition is displayed on the display, it is necessary for the speaker to move his/her gaze in order to search for the user interface and manipulate the user interface. As a result, although an interlocutor desires to talk while facing the speaker, the speaker looks in a different direction from the face of the interlocutor, and because such a behavior is normally unnecessary in conversation, the dialogue becomes unnatural.

If a technique that enables the entire display to function as a microphone is developed, it may be possible to avoid an unnatural dialogue caused by the speaker looking in an unnatural direction when speaking. However, it is difficult to increase a success rate of voice recognition by increasing only sensitivity of a specific microphone because a position of the mouth differs depending on a person, and since ambient noise or the like is more likely to be picked up as the number of microphones increases, the possibility of the failure of the voice recognition increases. It is possible to increase only sensitivity of a microphone in a specific direction through a beam forming technique, but in this case, the possibility of the failure of the voice recognition increases since it is more likely to be influenced by ambient noise or the like.

(2) Considerations on Speaker Side when Speaker is Speaking

In a case in which people communicate while facing each other and speech content is translated through the signage terminal, it is very difficult for a listener who is unable to understand the speech content of the speaker due to differences in manners or customs in speech, differences in used languages, or the like to understand whether or not a received voice coincides with a translation result of the voice. It is difficult for the listener to accurately judge whether the speaker is merely speaking to him/herself, or a strange recognition or translation is performed in a silent state in which the speaker is deep in thought. Further, there are cases in which the listener starts to speak if the speaker stops speaking, but since such a behavior may be different from the speaker's intention, it may not be communication expected by the other.

However, it is troublesome for the speaker to continuously tell the listener that the signage terminal is performing the translation process. Further, since humans often use unnecessary words, it is very difficult for the signage terminal to distinguish whether or not spoken words should be translated. Even when the speaker informs the listener that the signage terminal is performing the translation process, it is unnecessary for communication, and it is inherently unnatural in a conversation.

There are many situations in which a speaker is unsure of what to speak about, but speaks while thinking or speaks while thinking about content about which to ask. Therefore, even when the speaker does not speak, the speaker is often unlikely to want a situation in which the conversion is interrupted by the listener. However, it is difficult for the speaker to convey that intention to the listener naturally by speaking or the like, and particularly, it is more difficult in a situation in which translation is performed. As a result, the listener is likely to interrupt the speech of the speaker and start speaking.

In other words, in communication requiring translation via the signage terminal, it is very important to translate only necessary parts without translating unnecessary words, simply convey to the listener that the signage terminal is performing the translation process, and thus keep a conversation in a natural state.

(3) Considerations at Listener Side when Speaker is Speaking

In the communication requiring the translation via the signage terminal, if the signage terminal continuously translates speech content of the speaker one word after another and presents a large translation result, a recipient of the translation result is unable to process it, and communication breaks down.

On the other hand, it is difficult for the speaker to keep track of his/her speech amount, and if the speaker gets absorbed in speaking, an information amount increases greatly before he/she notices it. Since the information amount presented to the listener is translated, it is difficult for the speaker to understand the size of the information amount after the translation, and it is difficult for him/her to understand that the listener feels that the speech amount is large. Since the listener wants the speaker to stop after speaking an appropriate amount, it is necessary for the listener to convey this to the speaker despite a language barrier.

Further, when the speech amount of the speaker or the information amount after the translation greatly increases, it is necessary for the listener to make the speaker stop speaking. However, if the listener notifies the speaker that the listener feels that the information amount is large, communication becomes unnatural, and thus the listener would naturally hesitate to perform any such notification. Further, if the speaker brings his/her mouth closer to the microphone, the state in which they face each other falls apart, and thus it is hard for the recipient to approach the microphone proactively.

In light of the foregoing, the author of the present disclosure conducted keen examination on a technique that enables natural communication in a situation in which people communicate while facing each other, and particularly, in which a conversation and a translation result are presented via the signage terminal or the like. As a result, the author of the present disclosure came up with a technique that enables natural communication by detecting a state of a speaker or an interlocutor when people communicate while facing each other via the signage terminal or the like.

The overview of the embodiment of the present disclosure has been described above. Next, the embodiment of the present disclosure will be described in further detail.

1.2. Configuration Example

FIG. 1 is an explanatory diagram illustrating a communication system using a signage terminal 100 according to the embodiment of the present disclosure.

The signage terminal 100 is an information display terminal with a large display installed in a place in which many people are gathered such as a station, a department store, a shopping mall, or a stadium, or the like in a town. The signage terminal 100 in accordance with the present embodiment has a function that enables people to communicate while facing each other, particularly, a function of analyzing speech content of humans, translating the speech content, and conveying a translation result to a conversation partner. In description of the present embodiment, a case in which two persons (users u1 and u2) are talking with the signage terminal 100 therebetween will be assumed.

(Communication System 1)

Figure 2:
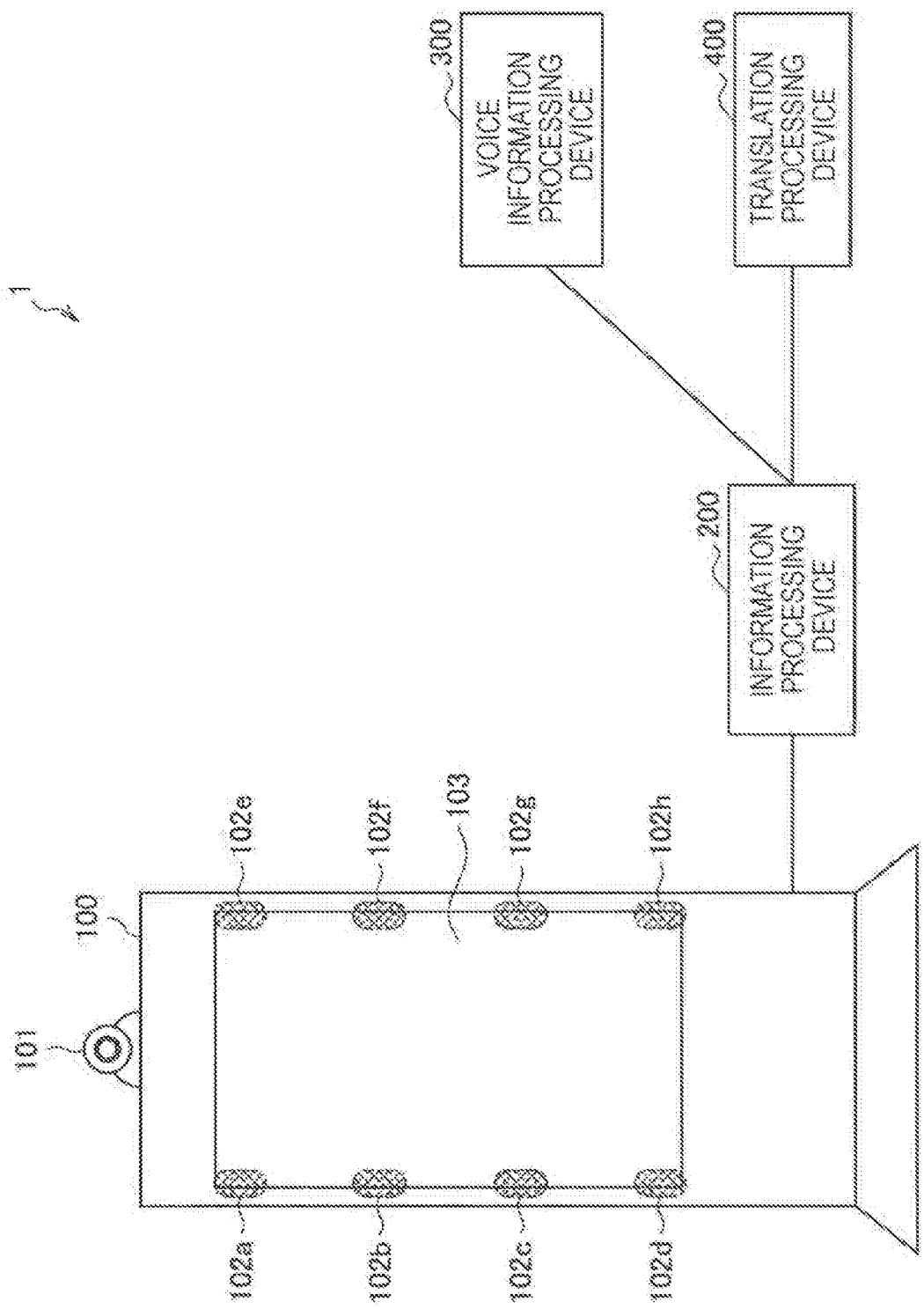
FIG. 2 is an explanatory diagram illustrating an overall configuration example of a communication system 1 using a signage terminal 100 according to the embodiment.

FIG. 2 is an explanatory diagram illustrating an overall configuration example of the communication system 1 using the signage terminal 100 according to the embodiment of the present disclosure. Hereinafter, an overall configuration example of communication system 1 according to the embodiment of the present disclosure will be described with reference to FIG. 2.

As illustrated in FIG. 2, the communication system 1 according to the embodiment of the present disclosure includes the signage terminal 100, an information processing device 200, a voice information processing device 300, and a translation processing device 400.

The signage terminal 100 is an information display terminal having a function of helping people communicate with each other. In the present embodiment, the signage terminal 100 includes a camera 101, microphones 102a to 102h, and a display 103 on one side. The camera 101 captures an image of a person who uses the signage terminal 100. The microphones 102a to 102h collect speech content of a person who uses the signage terminal 100. In the present embodiment, the microphones 102a to 102d are installed on one side, and the microphones 102e to 102h are installed on the opposite side, but the number of microphones and an arrangement of the microphones are not limited to this example. In the following description, the microphones 102a to 102h are also collectively referred to simply as a microphone 102.

Further, all the microphones 102a to 102h need not be in a sound collection state, and at least one of the microphones 102a to 102h may be in the sound collection state in accordance with positions of faces of the users u1 and u2. A method of selecting the microphone 102 that is in the sound collection state will be described later in detail.

The display 103 is a display device that displays various information and includes a liquid crystal display, an organic EL display, or the like. The display 103 may be transparent or non-transparent. In the present embodiment, the display 103 displays a translation of the speech content of the users u1 and u2 or displays information for conveying speech states of the users u1 and u2 to the partner.

Figure 3:
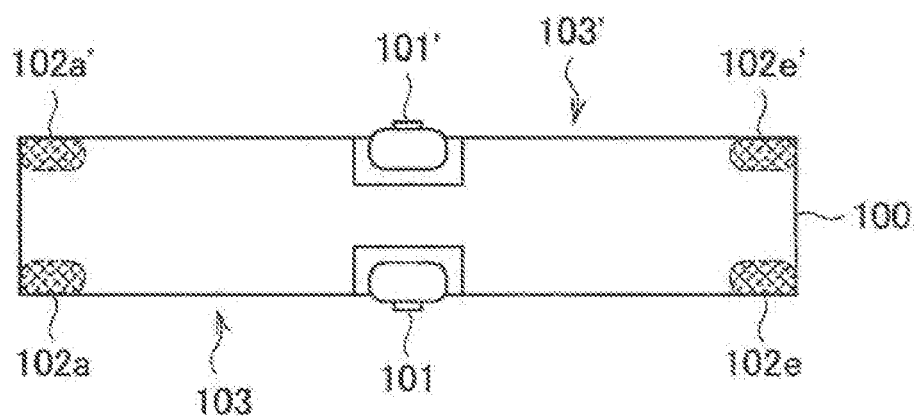
FIG. 3 is an explanatory diagram illustrating an example in which a signage terminal 100 is viewed from above.

FIG. 3 is an explanatory diagram illustrating an example in which the signage terminal 100 is viewed from above. As described above, the signage terminal 100 includes the camera 101, the microphones 102a to 102h, and the display 103 on one side, and includes a camera 101', microphones 102a' to 102h', and a display 103' on a side opposite to that side.

The information processing device 200 is a device that mainly executes a process related to display of information to be displayed on the signage terminal 100. The information processing device 200 is connected to the signage terminal 100 via a certain communication path. The communication path may be a wired path or a wireless path. Further, a communication protocol used in communication between the signage terminal 100 and the information processing device 200 is not particularly limited.

The voice information processing device 300 is a device that executes a process on the voices collected by the microphones 102a to 102h of the signage terminal 100. The voice information processing device 300 is connected to the information processing device 200 via a certain communication path. The communication path may be a wired path or a wireless path. Further, a communication protocol used in communication between the information processing device 200 and the voice information processing device 300 is not particularly limited.

The translation processing device 400 is a device that mainly executes a process related to translation, particularly, a device which executes a translation process on content which is spoken by the users u1 and u2 and recognized by the voice information processing device 300. The translation processing device 400 is connected to the voice information processing device 300 by a certain communication path. The communication path may be a wired path or a wireless path. A communication protocol used in communication between the voice information processing device 300 and the translation processing device 400 is not particularly limited.

Further, in the example illustrated in FIG. 2, the configuration in which the signage terminal 100 is connected to the information processing device 200, the voice information processing device 300, and the translation processing device 400 via a network has been illustrated, but the present disclosure is limited to this example. At least some of the functions provided by the information processing device 200, the voice information processing device 300, and the translation processing device 400 may be implemented in the signage terminal 100, and conversely, some of the functions implemented in the signage terminal 100 may be implemented in the information processing device 200, the voice information processing device 300, or the translation processing device 400. Further, although the three devices, that is, the information processing device 200, the voice information processing device 300, and the translation processing device 400, are illustrated in FIG. 2, the present disclosure is not limited to this example, and at least some of the functions implemented in any of the devices may be provided in another device.

The overall configuration example of the communication system 1 according to the embodiment of the present disclosure has been described above with reference to FIG. 2. Next, a functional configuration example of the signage terminal 100 according to the embodiment of the present disclosure will be described.

(Signage Terminal 100)

Figure 4:
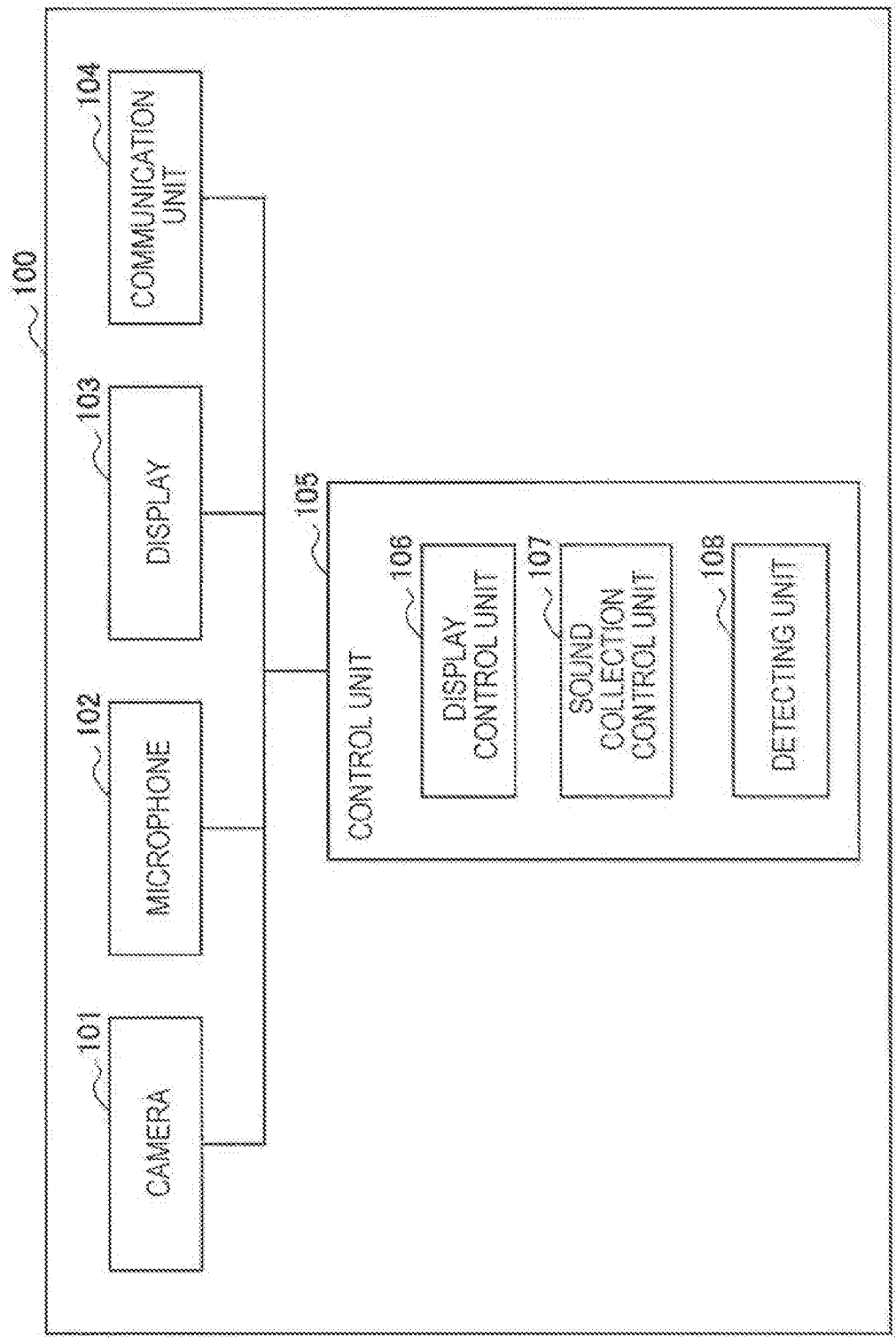
FIG. 4 is an explanatory diagram illustrating a functional configuration example of a signage terminal 100 according to the embodiment.

FIG. 4 is an explanatory diagram illustrating a functional configuration example of the signage terminal 100 according to the embodiment of the present disclosure. The functional configuration example of the signage terminal 100 according to the embodiment of the present disclosure will be described below with reference to FIG. 4. As illustrated in FIG. 4, the signage terminal 100 according to the embodiment of the present disclosure includes the camera 101, the microphone 102, the display 103, a communication unit 104, and a control unit 105.

As described above, the camera 101 captures an image of a person who uses the signage terminal 100 as a moving image. The moving image captured by the camera 101 is transmitted to the control unit 105 or transmitted to the information processing device 200 via the communication unit 104.

As described above, the microphone 102 collects the voice spoken by a person who uses the signage terminal 100. The voice collected by the microphone 102 is transmitted to the control unit 105 or transmitted to the voice information processing device 300 via the communication unit 104.

As described above, the display 103 is a display device that displays various information and includes a liquid crystal display, an organic EL display, or the like. The display 103 may be transparent or non-transparent. In the present embodiment, the display 103 displays a translation of the speech content of the users u1 and u2 or displays information for conveying speech states of the users u1 and u2 to the partner. Display of information by the display 103 is controlled by, for example, a control unit 105 to be described later or an information processing device 200.

The communication unit 104 is a communication interface for exchanging information with other devices. The communication unit 104 may perform wired communication or wireless communication with other devices. Further, the communication unit 104 can apply an arbitrary communication protocol to the communication with other devices.

The control unit 105 includes a processor such as a central processing unit (CPU), a ROM, a RAM, and the like and controls an operation of each unit of the signage terminal 100.

In the present embodiment, the control unit 105 includes a display control unit 106, a sound collection control unit 107, and a detecting unit 108.

The display control unit 106 controls the display of information by the display 103. An example of the information displayed on the display 103 by the display control unit 106 will be described later in detail.

The sound collection control unit 107 performs control such that a sound collection mechanism is turned on or off with respect to a plurality of microphones 102. The sound collection control unit 107 performs a process for turning on the sound collection mechanism only for the microphone 102 decided to be at a high sensitivity microphone position by a high sensitivity microphone position acquisition flow to be described later. The sound collection control unit 107 selects the microphone 102 whose sound collection mechanism is turned on or off on the basis of, for example, a position of a face of a person imaged by the camera 101. A specific example of turning the sound collection mechanism on or off with respect to the microphone 102 by the sound collection control unit 107 will be described later in detail.

The detecting unit 108 performs various detection processes using the image captured by the camera 101. In the present embodiment, the detection processes performed by the detecting unit 108 include detection of a person, detection of a face, detection of parts of a face, estimation of a position of an ear, detection of a motion amount, determination of whether or not the mouth approaches the microphone 102 whose sound collection mechanism is turned on by the sound collection control unit 107, detection of the gaze of the user, detection of nodding of the user, detection of a palm of the user, and the like. Information detected by the detecting unit 108 may be used in various processes to be described later such as an initial process flow, an ear position estimation flow, a high sensitivity microphone position acquisition flow, a translation mode process flow, a ball object animation process flow, a translation mode continuation determination process flow, and a processing amount overflow determination process flow.

The functional configuration example of the signage terminal 100 according to the embodiment of the present disclosure has been described above with reference to FIG. 4. Next, a functional configuration example of the information processing device 200 according to the embodiment of the present disclosure will be described.

(Information Processing Device 200)

Figure 5:
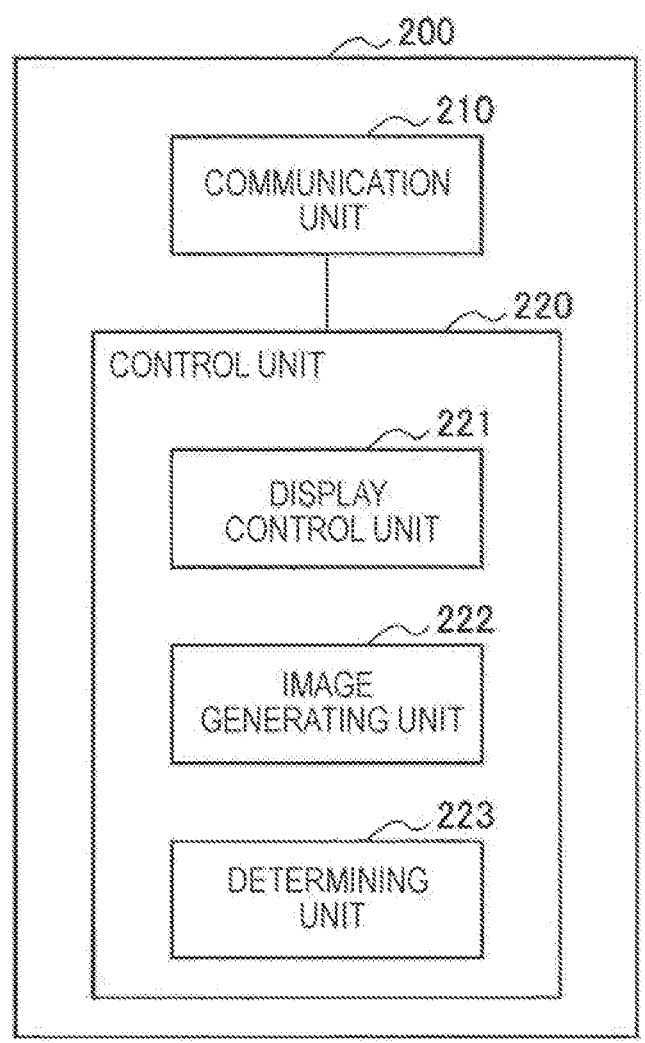
FIG. 5 is an explanatory diagram illustrating a functional configuration example of an information processing device 200 according to the embodiment.

FIG. 5 is an explanatory diagram illustrating a functional configuration example of the information processing device 200 according to the embodiment of the present disclosure. The functional configuration example of the information processing device 200 according to the embodiment of the present disclosure will be described below with reference to FIG. 5.

As illustrated in FIG. 5, the information processing device 200 according to the embodiment of the present disclosure includes a communication unit 210 and a control unit 220.

The communication unit 210 is a communication interface for exchanging information with other devices. The communication unit 210 may perform wired communication or wireless communication with other devices. Further, the communication unit 210 can apply an arbitrary communication protocol to the communication with other devices.

The control unit 220 includes a processor such as a CPU, a ROM, a RAM, and the like, and controls the operation of each unit of the information processing device 200. The control unit 220 executes process flows of the communication system 1 to be described later such as the initial process flow, the ear position estimation flow, the high sensitivity microphone position acquisition flow, the translation mode process flow, the ball object animation process flow, the translation mode continuation determination process flow, and the processing amount overflow determination process flow.

In the present embodiment, the control unit 220 includes a display control unit 221, an image generating unit 222, and a determining unit 223.

The display control unit 221 controls a display of information by the display 103 of the signage terminal 100. For example, the display control unit 221 performs image processing on an image in which the person who uses the signage terminal 100 is shown. The image processing performed by the display control unit 221 will be described later in detail.

For example, the image generating unit 222 generates an image to be displayed on the display 103 in accordance with a result of image processing performed by the display control unit 221. The image generation process performed by the image generating unit 222 will be described later in detail.

The determining unit 223 executes various processes related to communication performed in the communication system 1, specifically, various determination processes in the process flows of the communication system 1 to be described later. The determination process performed by the determining unit 223 will be described later in detail, but for example, in a case in which the speaker temporarily stops speaking, determination of whether or not the translation process is continued, speech, determination of whether or not the recipient receiving speech content or a translation result feels that a speech amount is large.

For example, in a case in which the speech content of the speaker reaches a level at which determination as to whether or not the translation process for the speech content is continued is performed, the determining unit 223 performs continuation determination for the translation process on the basis of the speech content and the speech state of the speaker. In a case in which the determining unit 223 determines that the translation process is continued as a result of the continuation determination for the translation process, the information processing device 200 causes the translation processing device 400 to continue the translation process, and in a case in which the translation process is determined to end, the information processing device 200 causes the translation processing device 400 to end the translation process.

The functional configuration example of the information processing device 200 according to the embodiment of the present disclosure has been described above with reference to FIG. 5. Next, a functional configuration example of the voice information processing device 300 according to the embodiment of the present disclosure will be described.

(Voice Information Processing Device 300)

Figure 6:
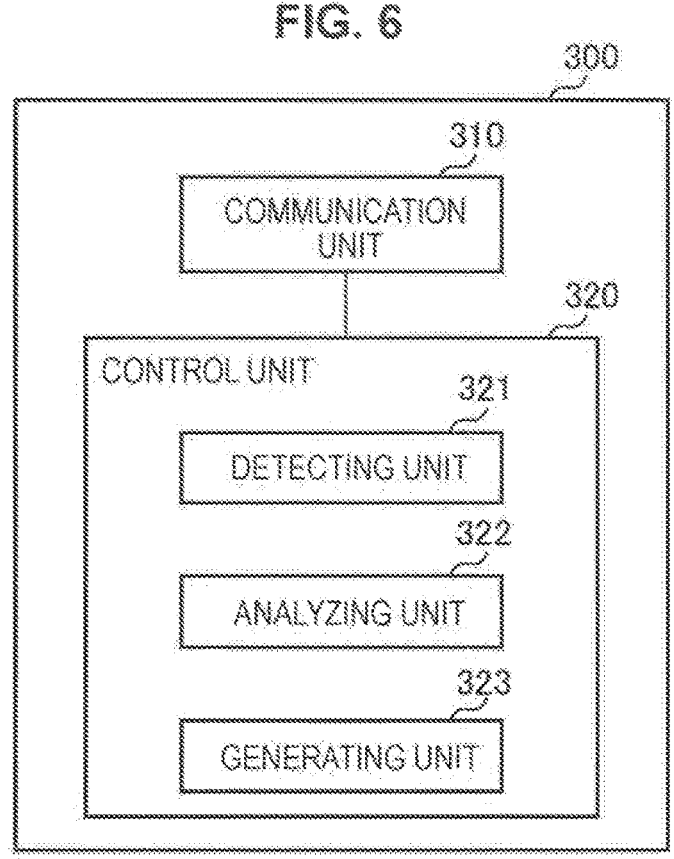
FIG. 6 is an explanatory diagram illustrating a functional configuration example of a voice signal processing device 300 according to the embodiment.

FIG. 6 is an explanatory diagram illustrating a functional configuration example of the voice information processing device 300 according to the embodiment of the present disclosure. The functional configuration example of the voice information processing device 300 according to the embodiment of the present disclosure will be described below with reference to FIG. 6.

As illustrated in FIG. 6, the voice information processing device 300 according to the embodiment of the present disclosure includes a communication unit 310. and a control unit 320.

The communication unit 310 is a communication interface for exchanging information with other devices. The communication unit 310 may perform wired communication or wireless communication with other devices. Further, the communication unit 310 can apply an arbitrary communication protocol to the communication with other devices.

The control unit 320 includes, for example, a processor such as a CPU, ROM, RAM, and the like, and controls the operation of each unit of the voice information processing device 300.

In the present embodiment, the control unit 320 includes a detecting unit 321, an analyzing unit 322, and a generating unit 323.

The detecting unit 321 detects a voice of a person who speaks toward the signage terminal 100. The voice detected by the detecting unit 321 is analyzed in the analyzing unit 322. When detecting a voice of a person, the detecting unit 321 can perform detection of a hesitation, detection of a predetermined word (filler word), detection of a speech tone, detection of a silent interval, and the like in addition to the detection of the speech content, detect speech.

The analyzing unit 322 performs various analysis processes on the voice of the person detected by the detecting unit 321. As the analysis process executed by the analyzing unit 322, for example, analysis of voice information, analysis of languages, analysis of morphemes or phrases included in the speech content, and the like can be performed.

The generating unit 323 generates text indicating content spoken towards the signage terminal 100 on the basis of the analysis result obtained by the analyzing unit 322. The text generated by the generating unit 323 is used for the translation process in the translation processing device 400.

The functional configuration example of the voice information processing device 300 according to the embodiment of the present disclosure has been described above with reference to FIG. 6. Next, a functional configuration example of the translation processing device 400 according to the embodiment of the present disclosure will be described.

(Translation Processing Device 400)

Figure 7:
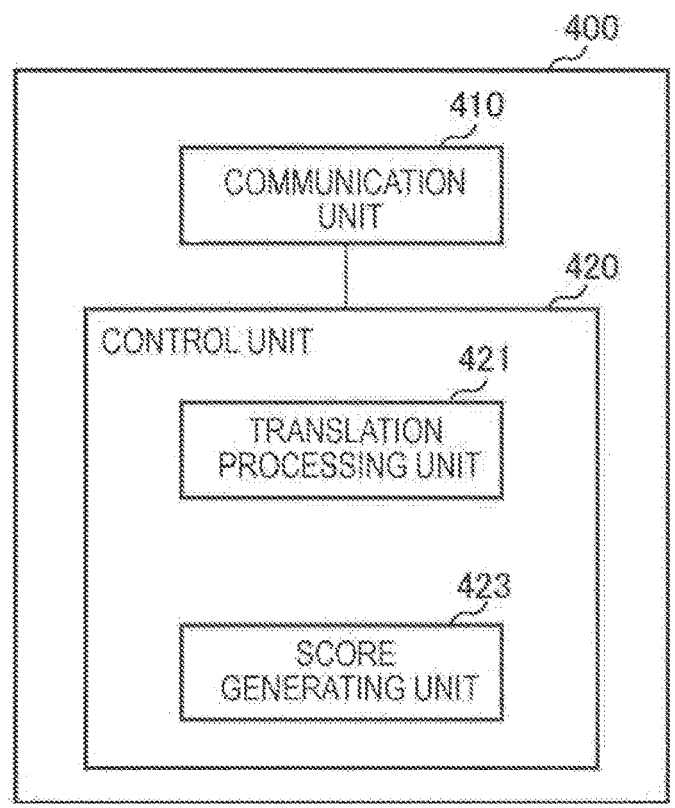
FIG. 7 is an explanatory diagram illustrating a functional configuration example of a translation processing device 400 according to the embodiment.

FIG. 7 is an explanatory diagram illustrating a functional configuration example of the translation processing device 400 according to the embodiment of the present disclosure. The functional configuration example of the translation processing device 400 according to the embodiment of the present disclosure will be described below with reference to FIG. 7.

As illustrated in FIG. 7, the translation processing device 400 according to the embodiment of the present disclosure includes a communication unit 410. and a control unit 420.

The communication unit 410 is a communication interface for exchanging information with other devices. The communication unit 410 may perform wired communication or wireless communication with other devices. Further, the communication unit 410 can apply an arbitrary communication protocol to the communication with other devices.

The control unit 420 includes, for example, a processor such as a CPU, ROM, RAM, and the like, and controls the operation of each unit of the translation processing device 400.

In the present embodiment, the control unit 420 includes a translation processing unit 421 and a score generating unit 422.

The translation processing unit 421 performs a translation process into another language directly using the text generated from the voice of the person spoken toward the signage terminal 100 by the voice information processing device 300 or the voice of the person spoken towards the signage terminal 100.

The score generating unit 422 generates a score when the translation process is performed in the translation processing unit 421. The process of generating the score by the score generating unit 422 will be described later in detail.

The functional configuration example of the translation processing device 400 according to the embodiment of the present disclosure has been described above with reference to FIG. 7. Next, an operation example of the communication system 1 according to the embodiment of the present disclosure will be described.

1.3. Operation Example

Use Case Example

A use case to be described below is used in describing the operation example of the communication system 1 according to the embodiment of the present disclosure. In the following description, it is assumed that a native tongue of the user n1 is English, and a mother tongue of the user u2 is a language other than English, for example, Japanese.

Figure 8:
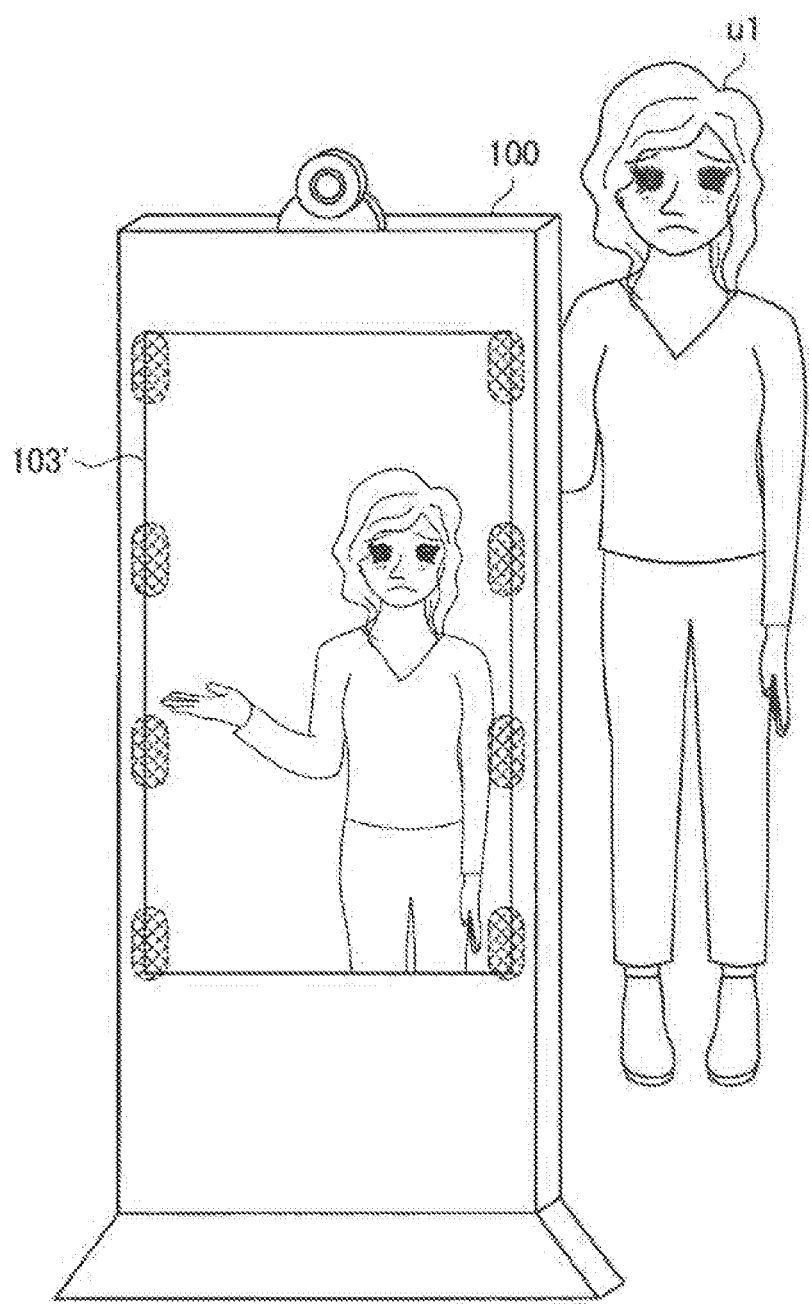
FIG. 8 is an explanatory diagram describing an operation example of a communication system 1 according to the embodiment.

FIG. 8 is an explanatory diagram describing an operation example of communication system 1 according to the embodiment of the present disclosure. For example, a situation in which the user u1 coming from a foreign country is in trouble since the user u1 does not know a way to a destination, or a place in which the user u1 can buy food, or the like. If the user u1 is wandering around the street, the user u1 finds the signage terminal 100 on which a message indicating that communication is possible while translating and stands in front of the signage terminal 100 while expecting to learn it from someone. At this time, the image of the user u1 image by the camera 101 is displayed on the display 103'.

FIG. 9 is an explanatory diagram describing an operation example of the communication system 1 according to the embodiment of the present disclosure. The user u2 who found the user u1 standing in front of the signage terminal 100 with the troubled face wants to help the user u1 but is not good at English. However, the user u2 thinks that the user u2 can do anything through signage terminal 100 that enables communication while translating and stands in front of the signage terminal 100.

In this case, the user u1 speaks toward the signage terminal 100 because the user u2 appears on the side opposite to the signage terminal 100. The signage terminal 100 acquires speech content of the user u1 and outputs content of the translation process of a server at the back to a display on the side of the user u2. The user u2 can understand the speech content of the user u1 by checking the content of the translation process output by the signage terminal 100.

(Initial Process)

An initial process will be described first. If the user stands in front of the signage terminal 100, the communication system 1 transitions to a conversation mode as the initial process. For example, the communication system 1 detects a person from the image captured by the camera 101, enters a state in which the face can be detected since the face confronts the camera 101, and further transitions to the conversation mode on a condition that the person stays on the spot for a predetermined time or more.

If the transition to the conversation mode is performed, the communication system 1 executes various processes on the basis of the image information of the user facing the signage terminal 100 as the initial process. As the initial process, the communication system 1 performs, for example, generation of an image simulating the face of the user, generation of the user interface using outline information of the head, the face, and the body of the user, acquisition of information of position of the eyes, the mouth, and the noise of the user, calculation of a position of the ears based on the information of the position of the mouth and the nose, and the like. These initial processes can be executed by, for example, the information processing device 200.

Further, the communication system 1 performs a process of reflecting information of a microphone position on the user interface as the initial process. Specifically, the communication system 1 generates the user interface indicating the position of the microphone 102 which the user brings the mouth closer to and speaks on the basis of information of the position of the microphone 102 installed in the signage terminal 100 and information of the acquired position of the mouth of the user.

Figure 10:
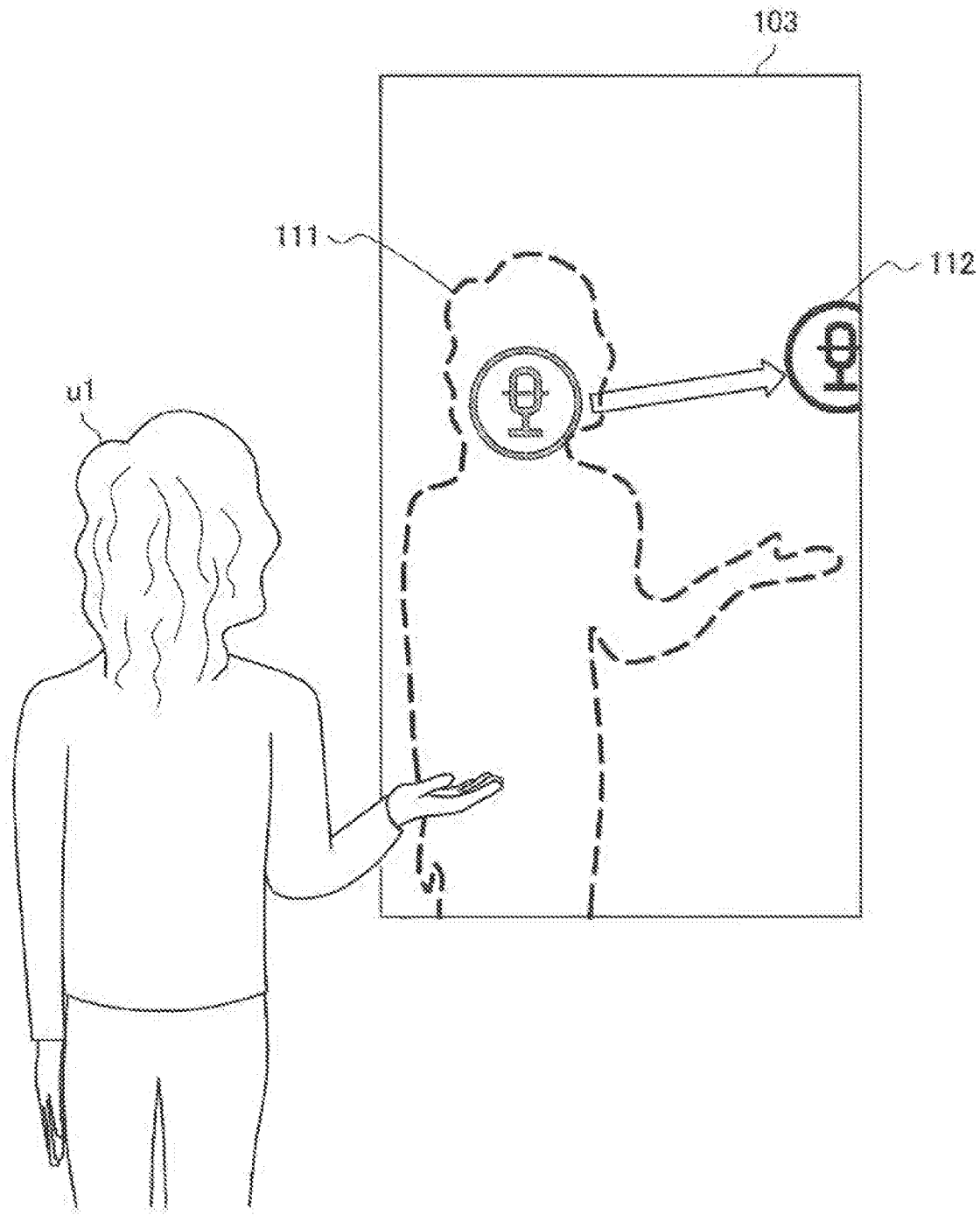
FIG. 10 is an explanatory diagram illustrating an example of a user interface.

FIG. 10 is an explanatory diagram illustrating an example of the user interface displayed on the display 103 of the signage terminal 100. FIG. 10 illustrates an example of the user interface in a case in which the user u1 stands in front of the signage terminal 100. The communication system 1 generates a confronting body outline Ul111 of the user u1 from the image information of the user u1 facing the signage terminal 100 and causes the confronting body outline Ul111 to be displayed on the display 103. Further, the communication system 1 decides the position of the microphone 102 which the user brings the mouth closer to and speaks (referred to as a "high sensitivity microphone position") from the information of the position of the microphone 102 and the information of the acquired position of the mouth of the user, generates a microphone Ul112 indicating the high sensitivity microphone position, and causes the microphone Ul112 to be displayed on the display 103.

The communication system 1 may decide the position of the microphone 102 at a position far from the position corresponding to the mouth in the confronting body outline Ul111 as the high sensitivity microphone position to which the user brings the mouth closer to and speaks. This is to urge the user to speak out of the confronting body outline Ul111 as much as possible at the time of speaking.

When the microphone Ul112 is displayed on the display 103, the communication system 1 may cause the microphone U112 to be displayed so that the user moves from the position corresponding to the mouth in the confronting body outline Ul111 to the high sensitivity microphone position to which the user brings the mouth closer to and speaks. Further, when the microphone Ul112 is displayed on the display 103, the communication system 1 may cause the microphone Ul112 to be displayed in a flickering manner or to be displayed in a vertical moving manner.

Figure 11:
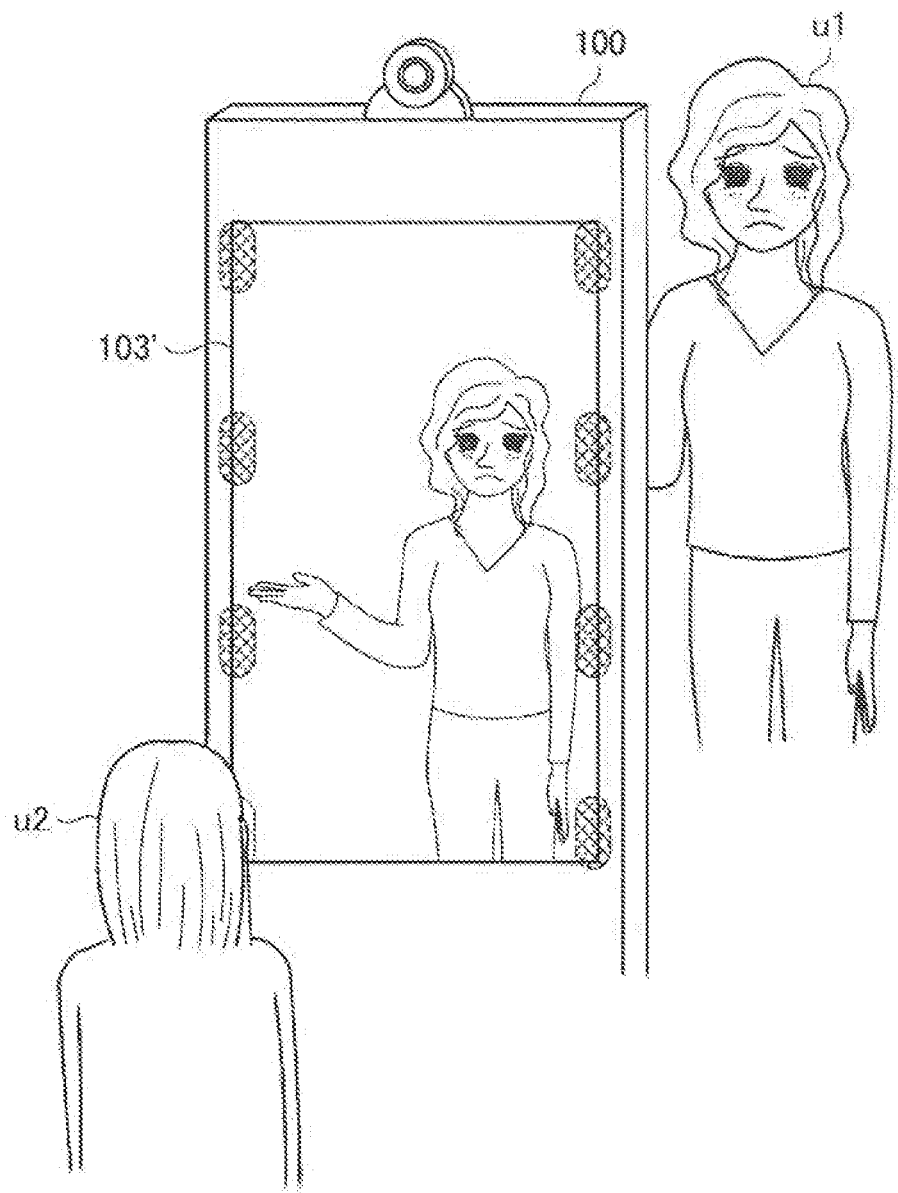
FIG. 11 is an explanatory diagram illustrating an example of a state in which a user u2 stands on an opposite side of a signage terminal 100 as viewed by a user u1.
Figure 12:
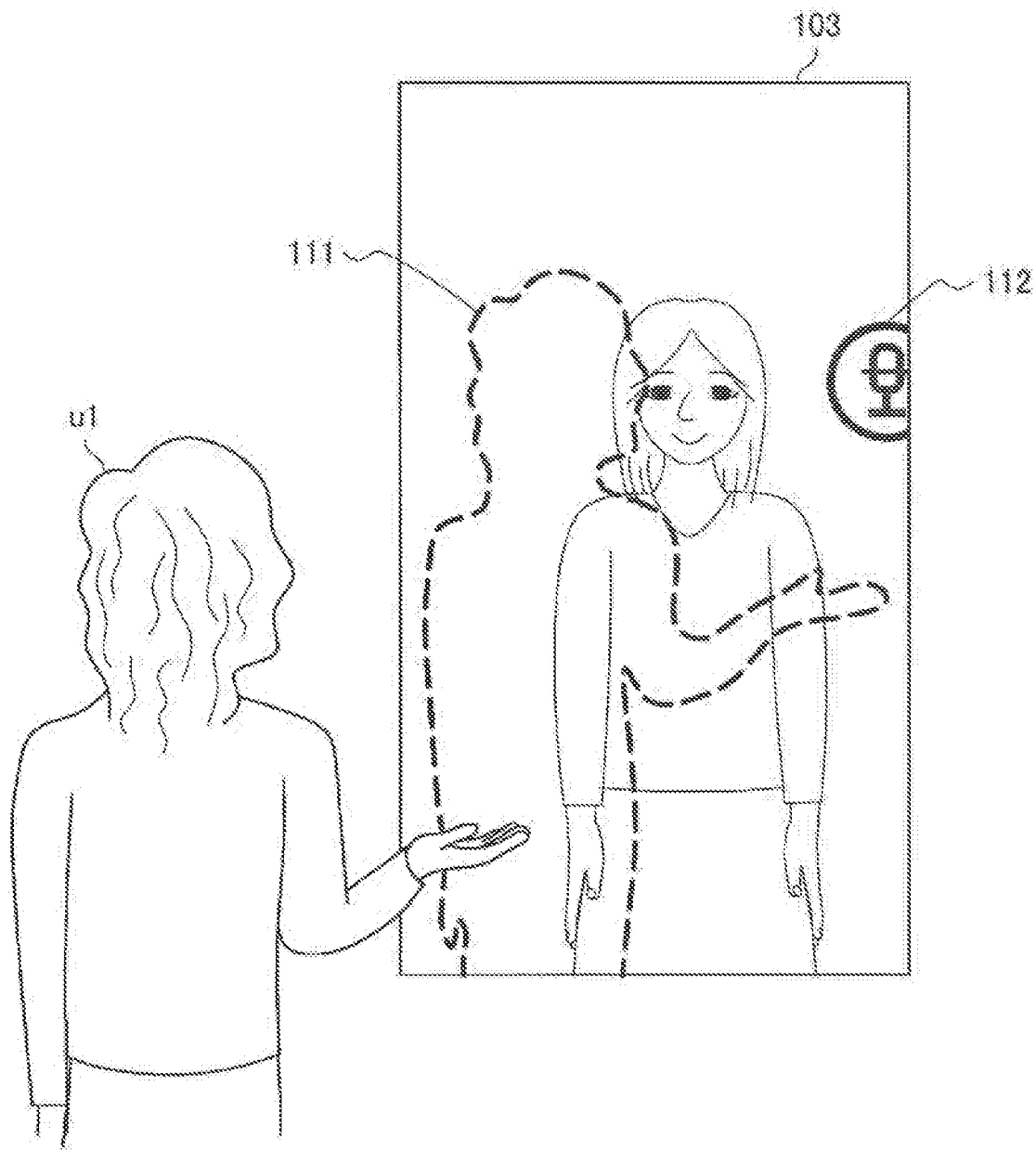
FIG. 12 is an explanatory diagram illustrating a display example of a display 103.

FIG. 11 is an explanatory diagram illustrating an example of a state in which the user u2 stands on the side opposite to the signage terminal 100 as viewed by the user u1. Further, FIG. 12 is an explanatory diagram illustrating a display example of the display 103 when the user u2 stands on the side opposite to the signage terminal 100 when viewed from the user u1 in a case in which the user interface illustrated in FIG. 10 is displayed on the display 103. As described above, the image captured by the camera 101' installed on the opposite side can be displayed on the display 103.

Figure 13:
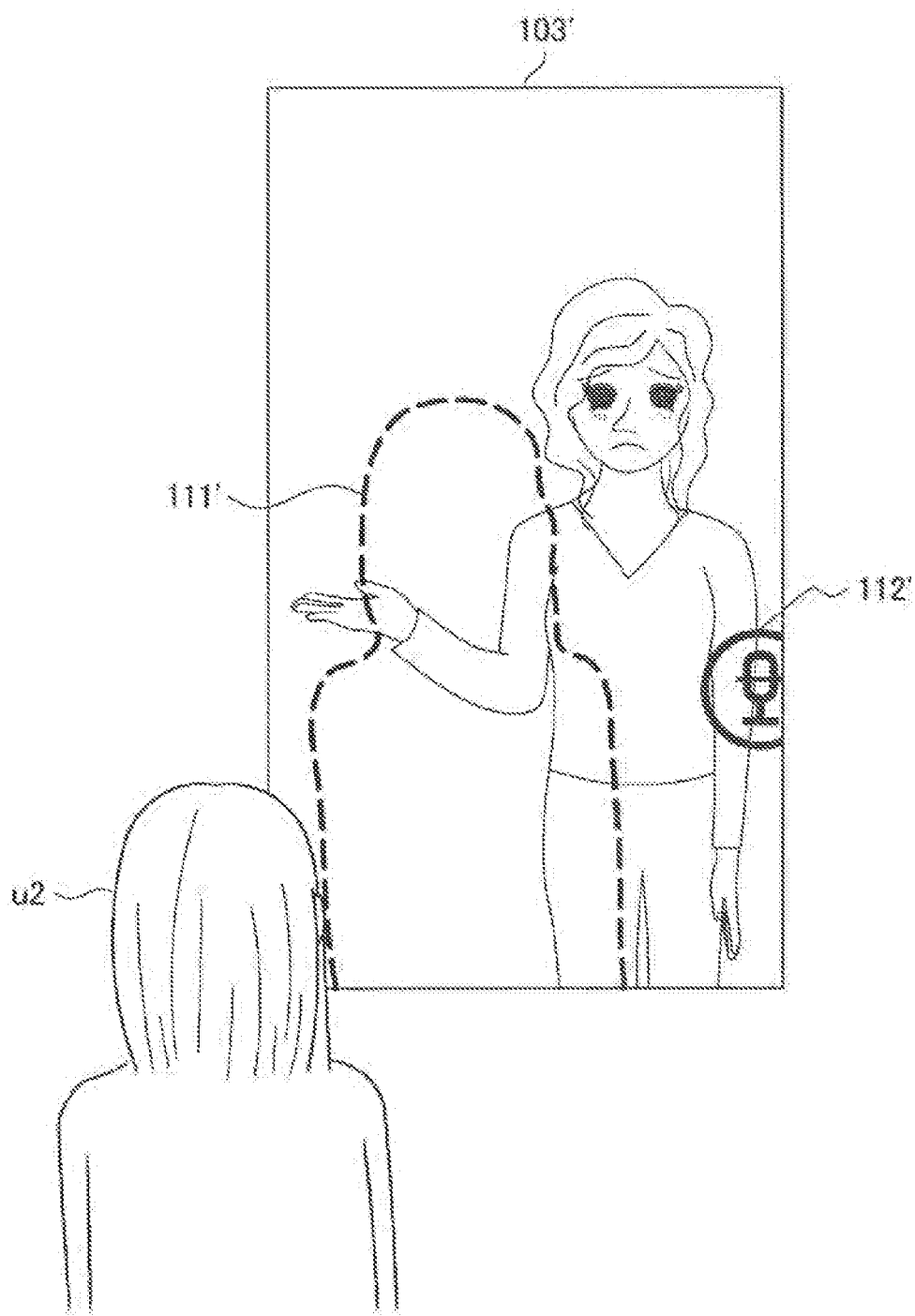
FIG. 13 is an explanatory diagram illustrating an example of a user interface.

FIG. 13 is an explanatory diagram illustrating an example of the user interface displayed on the display 103' of the signage terminal 100. FIG. 13 illustrates an example of the user interface in a case in which the user u2 stands in front of the signage terminal 100. The communication system 1 generates a confronting body outline Ul111' of the user u2 from the image information of the user u2 facing the signage terminal 100 and causes the confronting body outline Ul111' to be displayed on the display 103'. Further, the communication system 1 generates a microphone Ul112' indicating the position of the microphone 102' which the user brings the mouth closer to and speaks (high sensitivity microphone position) from the information of the position of the microphone 102' and the information of the acquired position of the mouth of the user, and causes the microphone Ul112' to be displayed on the display 103'.

As described above, if the users u1 and u2 stand in front of the signage terminal 100, the communication system 1 executes the initial process. If the initial process is completed, the communication system 1 then performs transition to a translation mode and a voice recognition activation process.

(Transition to Translation Mode and Voice Recognition Activation)

If a distance between the position of the mouth of the user standing in front of the signage terminal 100 and the high sensitivity microphone position is equal to or less than a predetermined threshold value, the communication system 1 causes the transition to the translation mode to be performed. FIG. 14 is an explanatory diagram illustrating an example in which the user u1 brings the face closer to the high sensitivity microphone position. As described above, if the user u1 brings the face closer to the high sensitivity microphone position, and the distance between the position of the mouth of the user and the high sensitivity microphone position is detected to be equal to or less than the predetermined threshold value, the communication system 1 causes the transition to the translation mode to be performed.

Then, if the transition to the translation mode is performed, the communication system 1 causes the voice recognition to be activated. When the voice recognition is activated, the communication system 1 performs a process of causing an image simulating the face of the user u1 generated in the initial process to be displayed at the position of the face of the confronting body outline UI111 of the user u1 in the display 103' of the partner.

Figure 15:
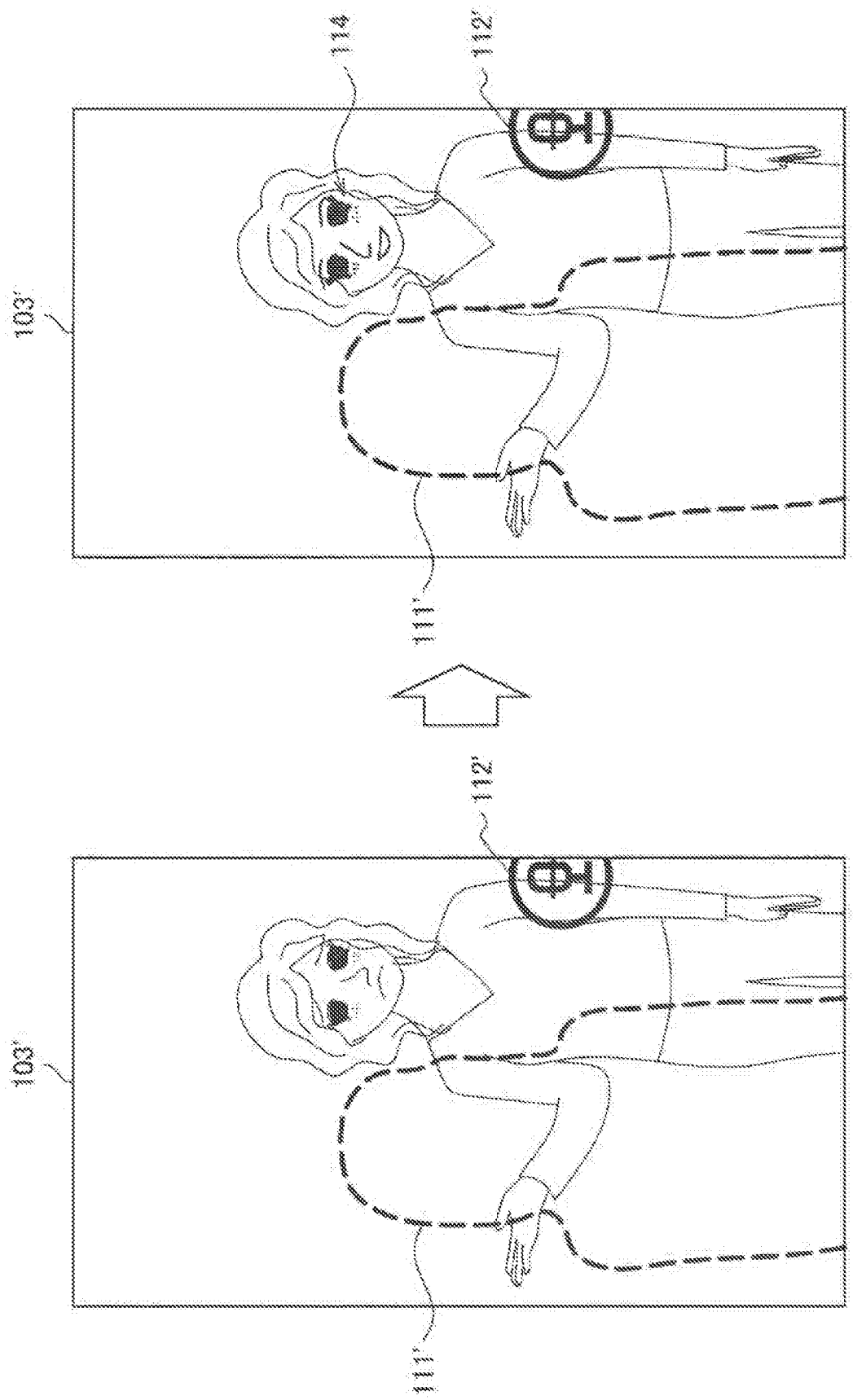
FIG. 15 is an explanatory diagram illustrating an example of a user interface.

FIG. 15 is an explanatory diagram illustrating an example of the user interface displayed on the display 103' when the communication system 1 causes the voice recognition to be activated. If the user u1 brings the face closer to the high sensitivity microphone position, and the position of the body deviates from the confronting body outline, the communication system 1 causes an image 114 simulating the face of the user u1 to be displayed at the position of the face of the user u1.

Since the image 114 simulating the face of the user u1 is displayed at the position of the face of the user u1 as described above, the communication system 1 can cause the user u1 and the user u2 to talk facing each other with the signage terminal 100 therebetween even in a case in which the user u1 brings the face closer to the high sensitivity microphone position.

In the communication system 1, when the image 114 simulating the face of the user u1 is displayed, a part or all of the image of the user u1 visible to the user u2 may be replaced with the image 114. The image 114 simulating the face of the user u1 may be the entire face or may be a part of the face such as only the mouth or the eyes. Further, when the image 114 simulating the face of the user u1 is displayed, the communication system 1 may perform image processing of moving the mouth part as if it is speaking or blinking at random intervals on the image 114.

Further, when the user u1 faces the signage terminal 100, the communication system 1 may replace a part or all of the image of the user u1 facing the user u2 with the image 114.

Further, when the voice recognition is activated, the communication system 1 turns off the microphones 102 at positions other than the high sensitivity microphone position. Further, if the voice recognition is activated, the communication system 1 continuously acquires gaze information of the user u1 while activating the voice recognition. Further, if the voice recognition is activated, the communication system 1 continuously acquires frequency information of the speech of the user u1 while activating the voice recognition.

Further, when the voice recognition is activated, the communication system 1 causes user interface for ending the voice recognition to be displayed on the display 103. For example, as the user interface for ending the voice recognition, the communication system 1 may cause the confronting body outline UI111 to blink or causes the information of the current body outline to be displayed as a body outline user interface.

(Voice Input and Translation Process)

If the user u1 speaks toward the microphone 102 at the high sensitivity microphone position, the communication system 1 may cause a user interface indicating that the speech content arrives at the user u2 of the partner to be displayed.

Figure 16:
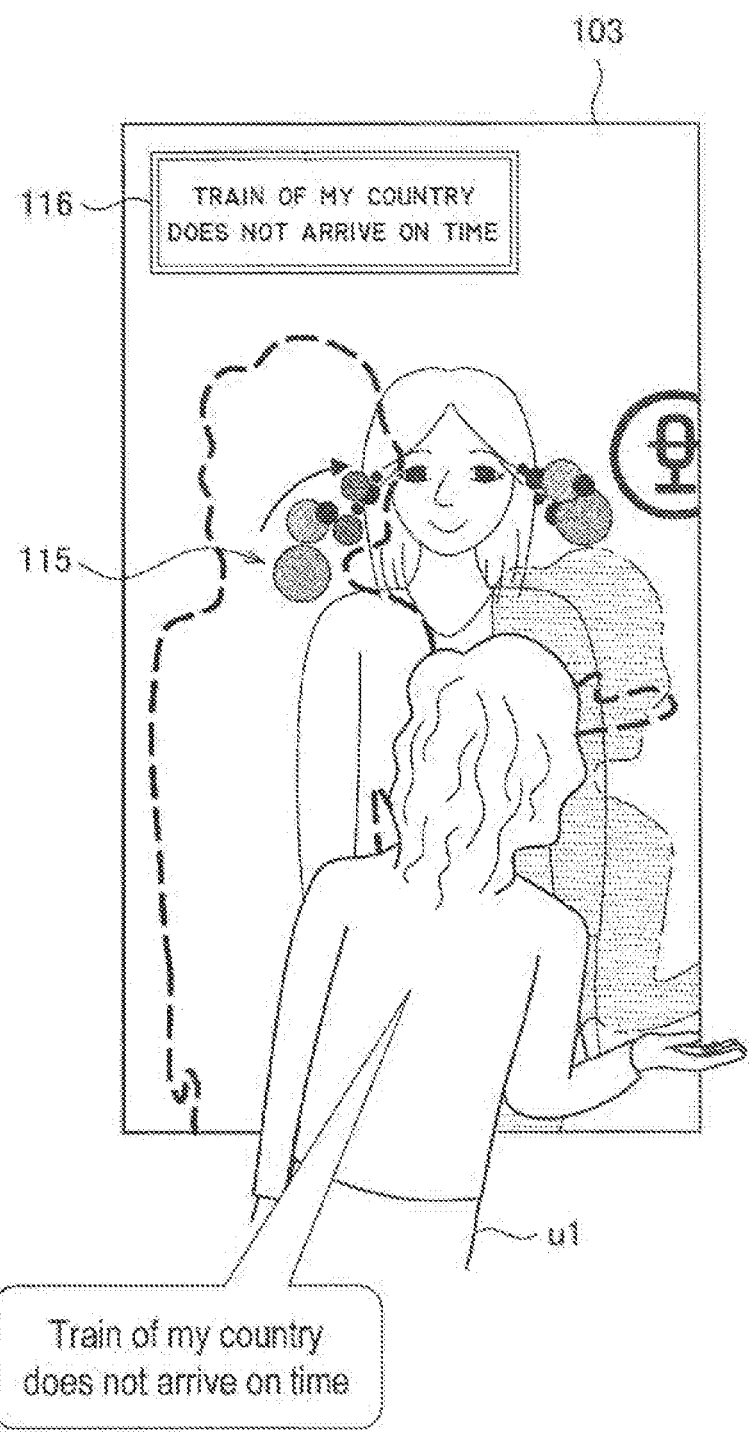
FIG. 16 is an explanatory diagram illustrating an example of a user interface.

FIG. 16 is an explanatory diagram illustrating an example of the user interface displayed on the display 103 on the user u1 side. If the user u1 speaks toward the microphone 102 at the high sensitivity microphone position, the communication system 1 causes a ball UI1115 displaying a recognition result of the speech to be displayed on the display 103. The ball UI1115 is a user interface which is displayed to move from the height of the mouth of the user u1 toward the ears of the user u2 displayed on the display 103.

By performing such an effect, the communication system 1 can indicate that the speech content of the user u1 arrives at the user u2 of the partner.

Further, if the user u1 speaks toward microphone 102 at the high sensitivity microphone position, the communication system 1 may cause the voice recognition result of the speech to be displayed on the display 103. FIG. 16 illustrates an example in which a voice recognition result 116 of the speech of the user u1 is displayed on the display 103. In the example illustrated in FIG. 16, the voice information processing device 300 recognizes that the user u1 speaks in English, and the speech content of the user u1 is displayed on the display 103 in English. A language spoken by the user may be automatically recognized by the voice information processing device 300 or may be determined by analyzing the speech content by the voice information processing device 300. Further, the user may designate the language spoken by the user in the signage terminal 100 by manipulating the signage terminal 100.

The communication system 1 executes the translation process using the voice recognition result of the speech of the user u1. The communication system 1 continuously acquires the score of the translation process when the translation process is executed. A method of acquiring the score will be described later in detail. Further, when the translation process is executed, the communication system 1 may translate the entire text of the voice recognition result or may summarize the voice recognition result and translate the summary. When the voice recognition result is summarized, for example, the communication system 1 may perform morphological analysis on the voice recognition result and extract the part of speech considered to be a main point.

On the other hand, the communication system 1 may cause a user interface indicating that the user u1 is speaking to the user u2 to be displayed.

Figure 17:
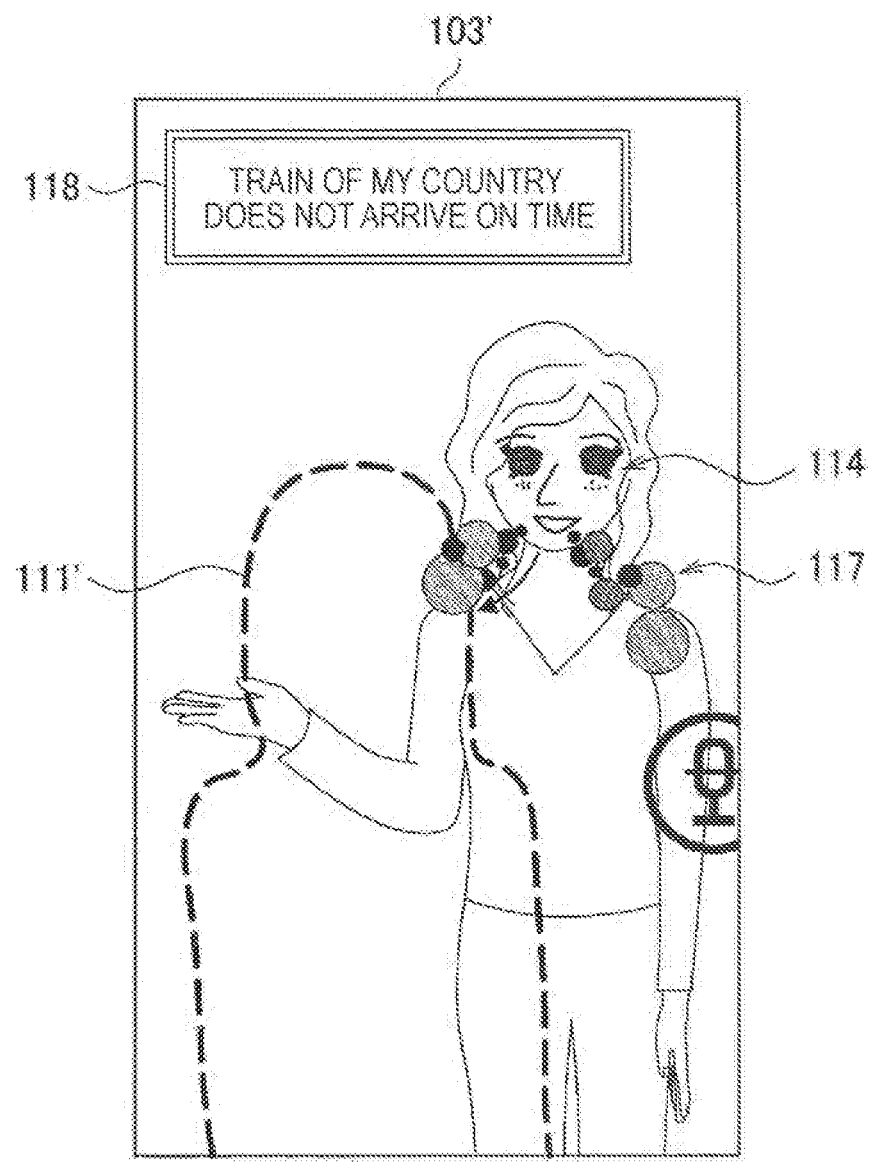
FIG. 17 is an explanatory diagram illustrating an example of a user interface.

FIG. 17 is an explanatory diagram illustrating an example of the user interface displayed on the display 103' on the user u2 side. If the user u1 speaks towards the microphone 102 at the high sensitivity microphone position, the communication system 1 causes a ball UI117 displaying the recognition result of the speech from the position of the mouth of the image 114 simulating the face of the user u1 to be displayed on the display 103'.

By performing such an effect, the communication system 1 can indicate to the user u2 of the partner that the user u1 is speaking.

Further, if the user u1 speaks toward microphone 102 at the high sensitivity microphone position, the communication system 1 may cause the translation result of the voice recognition result of the speech to be displayed on the display 103'. FIG. 17 illustrates an example in which a translation result 118 of the voice recognition result of the speech of the user u1 is displayed on the display 103'.

Further, in FIG. 17, "train of my country does not arrive on time" is illustrated as the translation result 118, but if translation of the above summary is performed, for example, "train does not arrive on time" is displayed as the translation result 118.

When the translation result 118 is displayed on the signage terminal 100, it is desirable that the communication system 1 cause the translation result 118 to be displayed at a position in which the confronting state of the listener does not collapse. In the example illustrated in FIG. 18, the translation result 118 is displayed near the image 114 of the speaker. Since the translation result 118 is displayed near the image 114 of the speaker, the listener the user u2 can check the translation result without breaking the confronting state.

Figure 18:
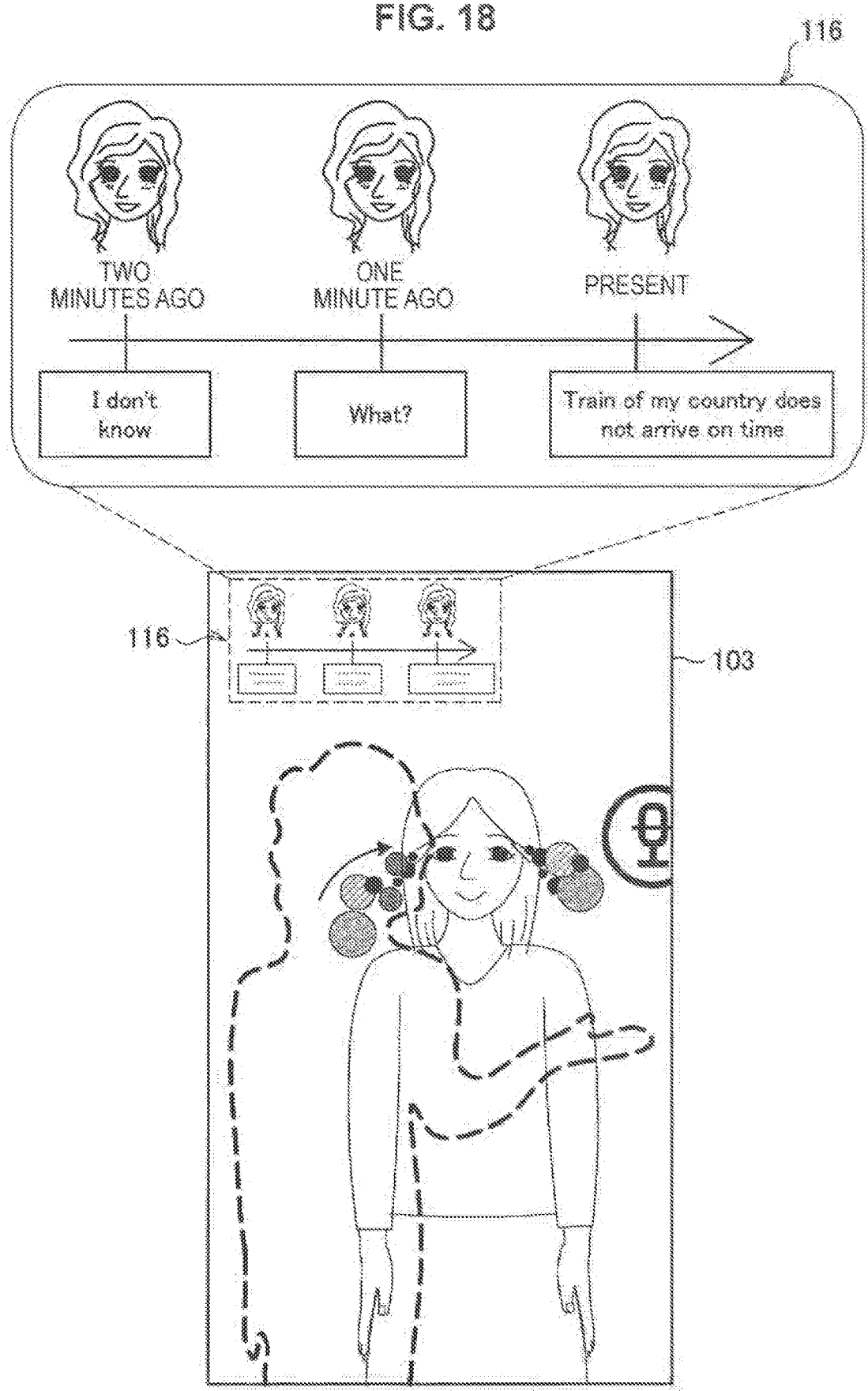
FIG. 18 is an explanatory diagram illustrating an example of a user interface.

The communication system 1 may cause the voice recognition results to be displayed side by side on a time axis. FIG. 18 is an explanatory diagram illustrating an example of the user interface displayed on the display 103 on the user u1 side. The communication system 1 may cause the voice recognition results 116 of the user u1 to be displayed side by side on the time axis as illustrated in FIG. 18. Since the voice recognition results of the user u1 are displayed chronologically, the communication system 1 can cause the speaker to check the past speech content.

Further, when the voice recognition results 116 of the user u1 are displayed side by side on the time axis, the communication system 1 may cause the photograph of the speaker to be displayed together as illustrated in FIG. 18. Since the photograph of the speaker is displayed together with the voice recognition results 116, the communication system 1 can cause the speaker to check a person who spoke the content in the past.

(Translation Mode Continuation Determination (1))

If the speech of the user u1 is detected to cease, the communication system 1 determines whether or not the translation mode is continued by using, for example, the past speech content of the user u1 and the speech state of the user u1. First, a first determination example of determining whether or not the translation mode is continued.

Even in a case in which there is no voice input, that is, the speech of the user u1 cease, the communication system 1 continues the translation mode when a translation score for the speech content of the user u1 is lower than a predetermined value, and the gaze of the user u1 whose is the speaker does not face the user u2. This is based on the human psychology that if people do not know conveyed information, people do not make eye contact with other people or looks down.

Figure 19:
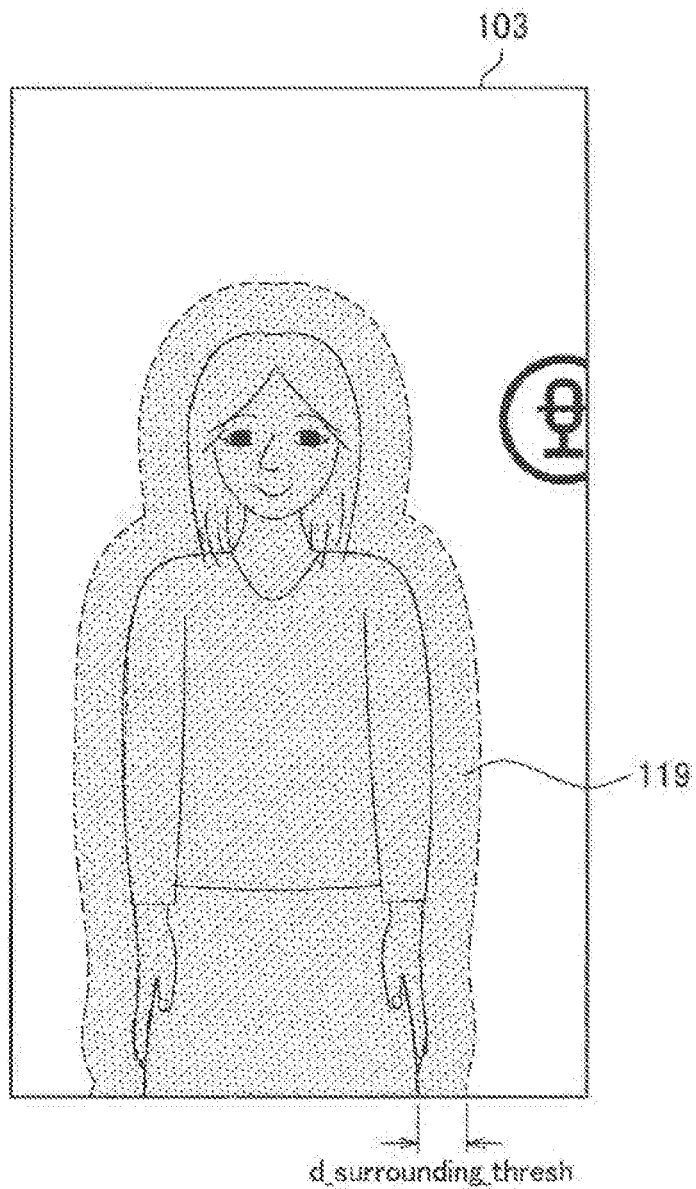
FIG. 19 is an explanatory diagram for describing that a communication system 1 determines whether or not a translation mode is continued.

FIG. 19 is an explanatory diagram for describing that the communication system 1 determines whether or not the translation mode is continued. FIG. 19 illustrates a state in which the image of the user u2 is displayed on the display 103 on the user u1 side.

In FIG. 19, a region 119 obtained by adding a predetermined threshold value d_surrounding_thresh to the confronting body outline region of the user u2 is illustrated. The region 119 may not be displayed on the display 103. The communication system 1 determines to continue the translation mode in a case in which the translation score for the speech content of the user u1 is lower than a predetermined value, and the gaze of the user u1 is present outside the region 119 for a predetermined time t_surrounding_thresh or more.

On the other hand, in a case in which the translation score for the speech content of the user u1 is lower than a predetermined value, and the gaze of the user u1 is present within the region 119 for the predetermined time t_surrounding_thresh or more, the communication system 1 determines to release the translation mode.

Further, FIG. 19 illustrates an example in which the predetermined threshold value d_surrounding_thresh is uniformly added to the entire confronting body outline region of the user u2, but the predetermined threshold value may be changed in accordance to a part of the body of the user u2. The communication system 1 may cause the predetermined threshold value to be different, for example, between a part above the neck and a part below the neck.

Further, the communication system 1 may cause the determination of whether or not the translation mode is continued to be changed depending on the tip of the gaze of the user u1. In other words, the communication system 1 may cause the determination of whether or not the translation mode is continued to be changed depending on whether the user u1 is looking at the face of the user u2, looking at the body, looking at the hand, or the like.

Further, the communication system 1 may also cause the determination of whether or not the translation mode is continued to be changed depending on depending on the presence or absence of a motion of the background of the user u2. Accordingly, the communication system 1 can cause the determination of whether or not the translation mode is continued to be changed depending on whether or not the user u1 does not understand the speech content and looks down or whether or not the user u1 looks at the background of the user u2.

The communication system 1 may determine whether or not the translation mode is continued by using a habit of the user if the user using the communication system 1 has an experience of using the communication system 1 in the past. For example, if the user is a user who open moves the gaze, the translation mode may be determined to continue even when the user moves the gaze from the conversation partner.

The communication system 1 may cause a threshold value used for determining whether or not the translation mode is continued to be changed depending on a situation in which the users are communicating with each other. For example, the communication system 1 may cause the threshold value used for determining whether or not the translation mode is continued to be changed depending on whether or not the situation in which the communication is performed is a guide, a conference, or the like. Further, for example, the communication system 1 may cause the threshold value used for determining whether or not the translation mode is continued to be changed depending on whether or not the situation in which the communication is performed is a situation in which the user is in a hurry, a situation in which the user has enough time, or the like.

The communication system 1 may cause the threshold value used for determining whether or not the translation mode is continued to be changed depending on a relationship with the partner performing communication. For example, the communication system 1 may cause the threshold value used for determining whether or not the translation mode is continued to be changed depending on whether or not the partner performing communication is a stranger, a male, a person with a high position in a partner company, or the like.

(Translation Mode Continuation Determination (2))

Next, a second determination example of determining whether or not the translation mode is continued will be described.

Even in a case in which there is no voice input, that is, the speech of the user u1 ceases, if a sentence spoken by the user u1 is not completed, for example, if a hesitation is detected in the speech content of the user u1, the communication system 1 continues the translation mode. Further, when a predetermined filler word is included before silence, the communication system 1 continues the translation mode until a predetermined time t_fillerwords_thresh elapses after the filler word is spoken.

Figure 20:
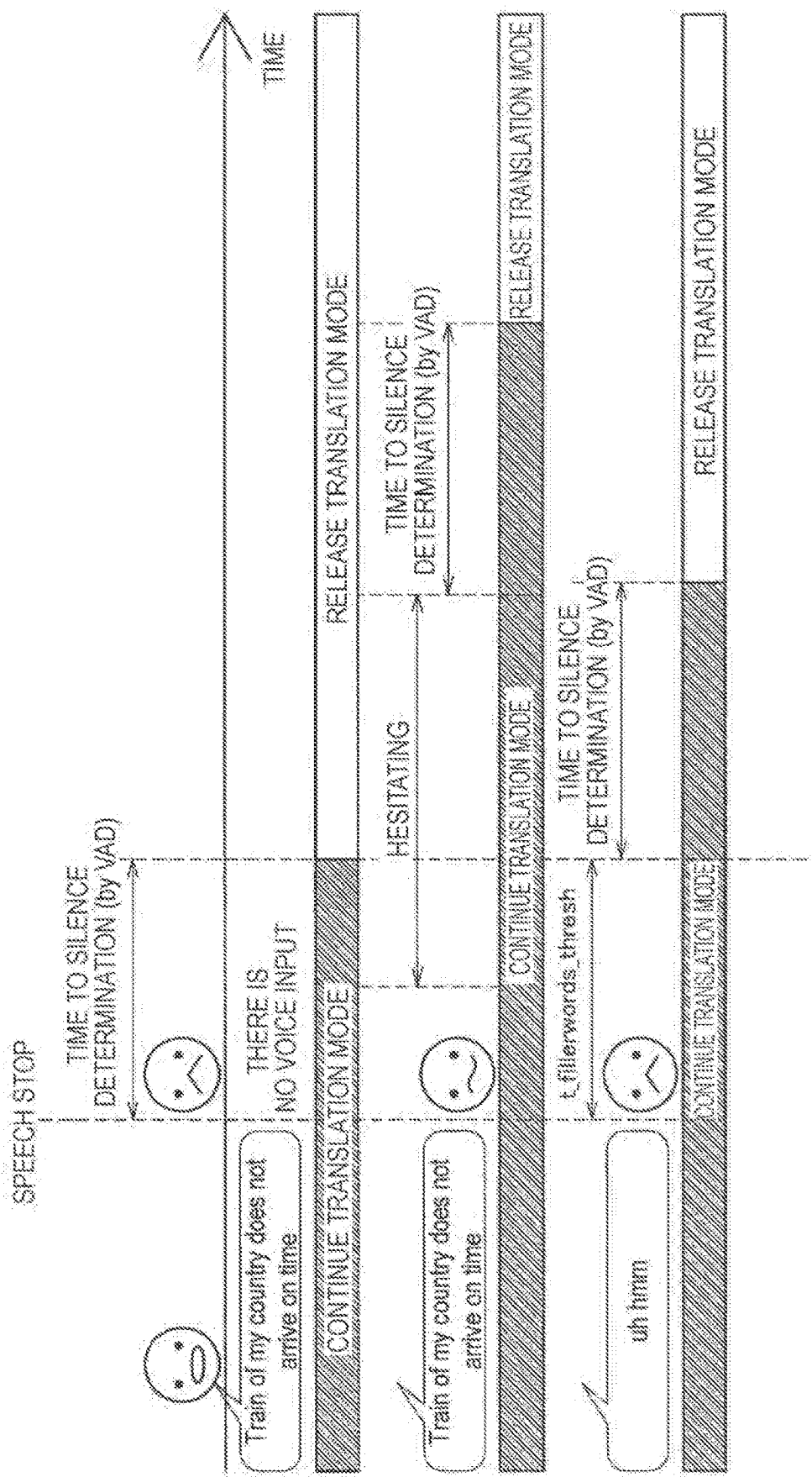
FIG. 20 is an explanatory diagram for describing that a communication system 1 determines whether or not a translation mode is continued.

FIG. 20 is an explanatory diagram for describing that the communication system 1 determines whether or not the translation mode is continued. FIG. 20 illustrates three determination examples in which the communication system 1 determines whether or not the translation mode is continued. A first example is an example in which the communication system 1 releases the translation mode if a predetermined time elapses after the speech of the user u1 ceases. A second example is an example in which the communication system 1 continues the translation mode if a hesitation is detected even in a case in which the speech of the user u1 ceases. A third example is an example in which if the user u1 is detected to speak a predetermined filler word, the communication system 1 continues the translation mode until a predetermined time t_fillerwords_thresh elapses after the filler word is spoken.

(Translation Mode Continuation Determination (3))

Next, a third determination example of determining whether or not the translation mode is continued will be described.

The communication system 1 determines whether or not the translation mode is continued on the basis of a voice quality of the user even in a case in which there is no voice input, that is, the speech of the user u1 ceases. For example, even in a case in which there is no voice input, that is, the speech of the user u1 ceases, if the frequency information of the last speech is equal to or less than a certain threshold value as compared with an average of frequencies acquired up to now, the communication system 1 continues the translation mode.

Specifically, when there is no voice input, that is, the speech of the user u1 ceases, the communication system 1 calculates frequency information info_last_voice_freq of the last speech, and calculates average frequency information f_all_voice of all speeches which have been performed up to now. Then, in a case in which info_last_voice_freq<info_voice_freq_ave-f_thresh is satisfied, the communication system 1 determines that the tone of the voice is lowered, that is, the speaker is losing confidence and continues the translation mode. On the other hand, in a case in which info_last_voice_freq>=info_voice_freq_ave-f_thresh is satisfied, the communication system 1 releases the translation mode.

(Translation Mode Continuation Determination (4))

Next, a fourth determination example of determining whether or not the translation mode is continued will be described.

If it matches a person included in a predetermined database (here referred to as a "conversation end determination word database") as a result of performing the voice recognition before the voice input ceases, the communication system 1 continues the translation mode until a predetermined time t_convendwords_thresh elapses after the voice input from the user ceases, and ends the translation mode if the predetermined time t_convendwords_thresh elapses.

Figure 21:
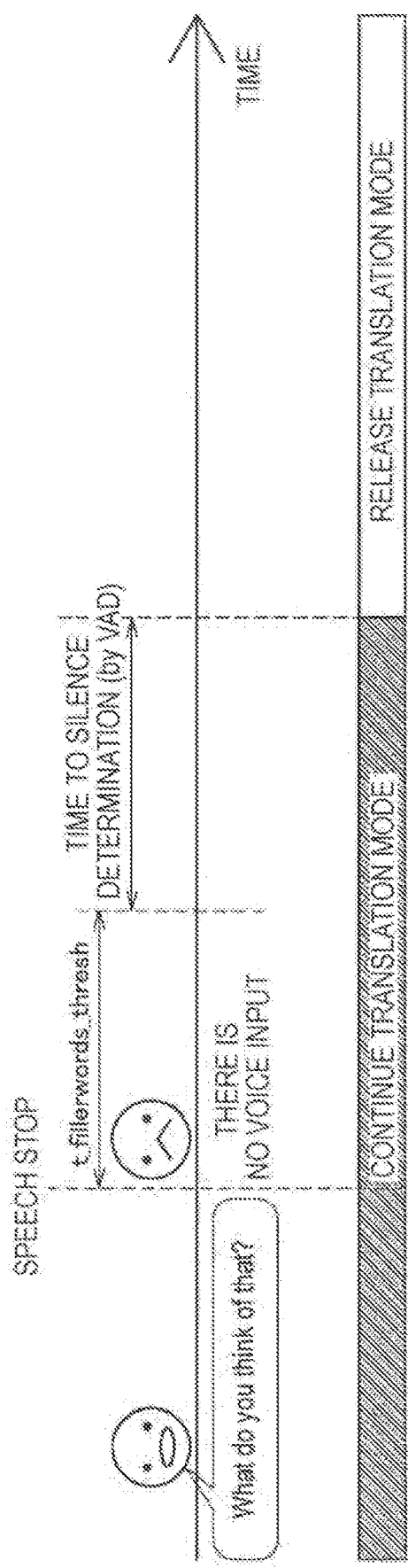
FIG. 21 is an explanatory diagram for describing that a communication system 1 determines whether or not a translation mode is continued.

FIG. 21 is an explanatory diagram for describing that the communication system 1 determines whether or not the translation mode is continued. FIG. 21 illustrates an example in a case in which the user speaks a phrase "What do you think of that?" registered in the conversation end determination word database just before stopping speaking. The communication system 1 which has detected the speech of the phrase continues the translation mode until a predetermined time t_convendwords_thresh elapses after the voice input from the user ceases. Further, if the predetermined time t_convendwords_thresh elapses after the voice input from the user ceases, the communication system 1 ends the translation mode.

(Translation Mode Continuation Determination (5))

Next, a fifth determination example of determining whether or not the translation mode is continued is illustrated.

In a case in which the user performs a motion for intentionally releasing the translation mode, the communication system 1 releases the translation mode. Examples of the motion for intentionally releasing the translation mode include a motion of pressing an end button displayed on the display 103, a motion of returning the body to the confronting state, a motion of returning the gaze to the conversation partner after ending the speech, or the like, but the present embodiment is not limited to these examples.

Figure 22:
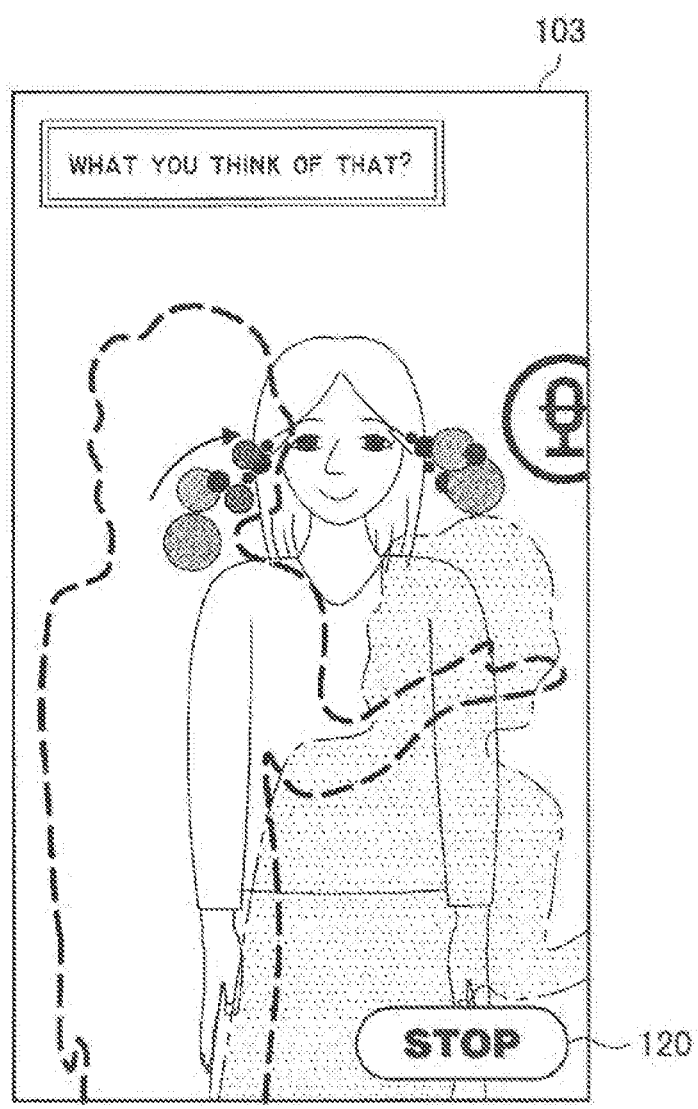
FIG. 22 is an explanatory diagram illustrating an example of a user interface.

FIG. 22 is an explanatory diagram illustrating an example of the user interface displayed by the communication system 1 on the display 103. FIG. 22 illustrates an example in which an end button 120 for canceling the translation mode which is displayed as "STOP" is displayed on the display 103. The communication system 1 releases the translation mode if it detects that the user touches the end button 120 or that the finger is brought closer to the end button 120. Further, the words displayed on the end button 120 may be changed in accordance with the language spoken by the user u1.

If it detects that the user touches the end button 120 or that the finger is brought closer to the end button 120, for example, the communication system 1 may cause a message for urging the user to return the body to the confronting state to be displayed on the display 103 by text or may output the message by voice.

Figure 23:
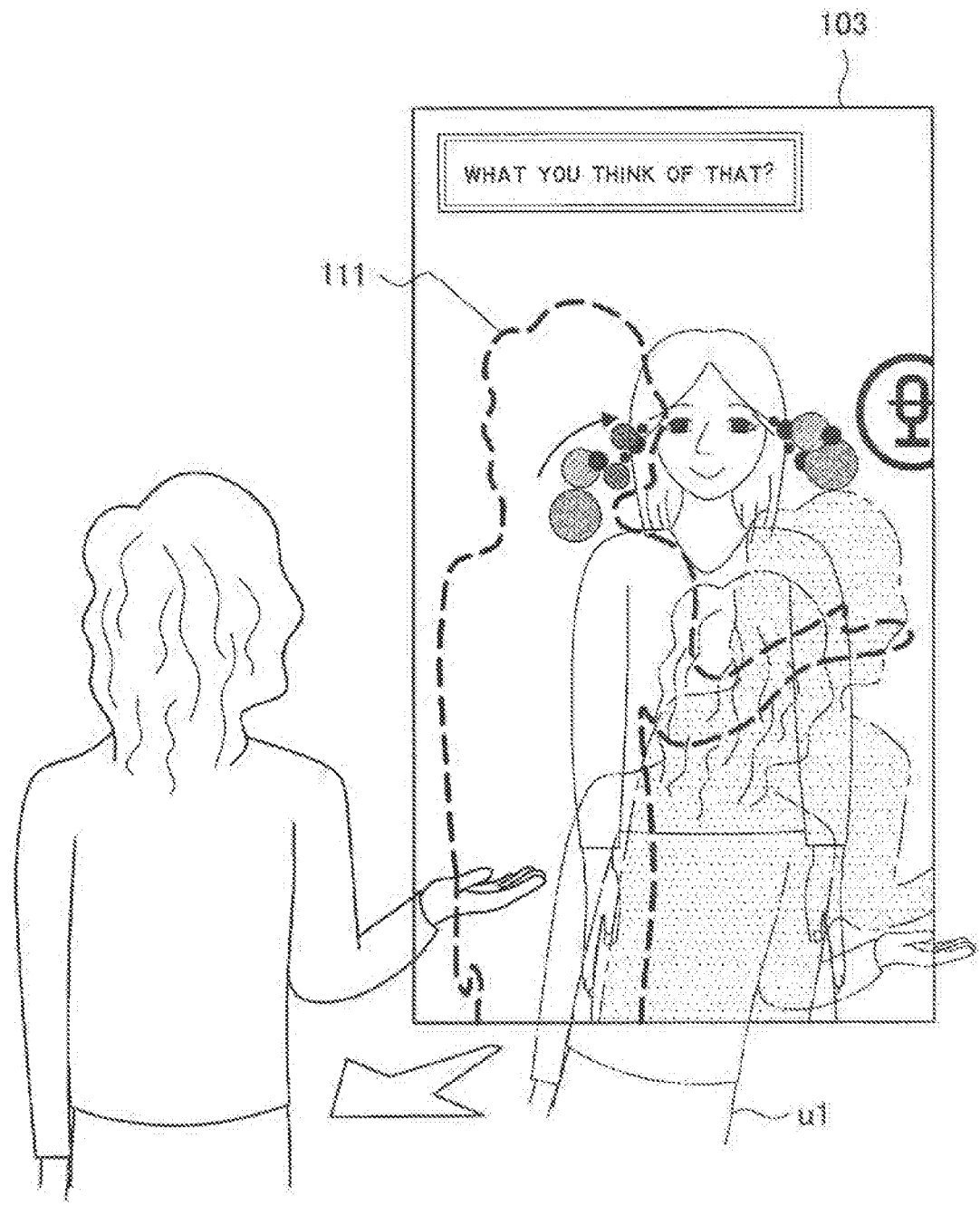
FIG. 23 is an explanatory diagram for describing that a communication system 1 determines whether or not a translation mode is continued.

FIG. 23 is an explanatory diagram for describing that the communication system 1 determines whether or not the translation mode is continued. FIG. 23 illustrates an example in a case in which the user returns the posture to the position corresponding to the confronting body outline Ul111. If it is detected that the user returns the posture to the position corresponding to the confronting body outline Ul111, and then a predetermined time elapses after the posture is returned, the communication system 1 releases the translation mode.

Even when the user does not fully return the posture to the position corresponding to the confronting body outline Ul111, for example, if 50% or more of the body is included in a range corresponding to confronting body outline Ul111, the communication system 1 may determine that the body is returned to the confronting state.

In addition, for example, the communication system 1 may determine whether or not the translation mode is continued depending on the presence or absence of a noise around the signage terminal 100. In a case in which the speaker stopped speaking, if a noise occurs around the signage terminal 100, the speaker is likely to be distracted by the noise. Therefore, in a case in which the speaker stopped speaking, if a noise occurs around the signage terminal 100, the communication system 1 may determine that the translation mode is continued.

In addition, for example, the communication system 1 may determine whether or not the translation mode is continued on the basis of content of a response from the partner. For example, in a case in which the response from the partner is a question, the user tries to answer the response, and thus even when the user does not speak for a while, the communication system 1 determines that the translation mode is continued. On the other hand, if the response from the partner is not a question, and the user does not speak for a while, the communication system 1 determines that the translation mode ends.

(Listener Side Processing Overflow Determination)

As pointed out in the above "(3) Considerations at listener side while speaker is speaking," In the communication requiring the translation via the signage terminal, if the signage terminal continuously translates speech content of the speaker one after another and presents a large amount of translation result, a recipient of the translation result is unable to process it, and communication is not continued.

In this regard, the communication system 1 detects a situation of the listener side, and determines the presence or absence of a processing overflow on the listener side. Then, if a processing overflow is determined to occur on the listener side, the communication system 1 gives a notification to the speaker side to stop speaking temporarily.

(Listener Side Processing Overflow Determination (1))

First, a first example of the listener side processing overflow determination will be described.

When, while the user u1 who is the speaker is speaking, the gaze of the user u2 who is the listener side is not facing the user u1 and is on the outside from the confronting body outline information of the user u1 at a distance of a predetermined threshold value or more, and the state continues for a predetermined time or more, the communication system 1 determines that the user u2 undergoes the processing overflow.

Figure 24:
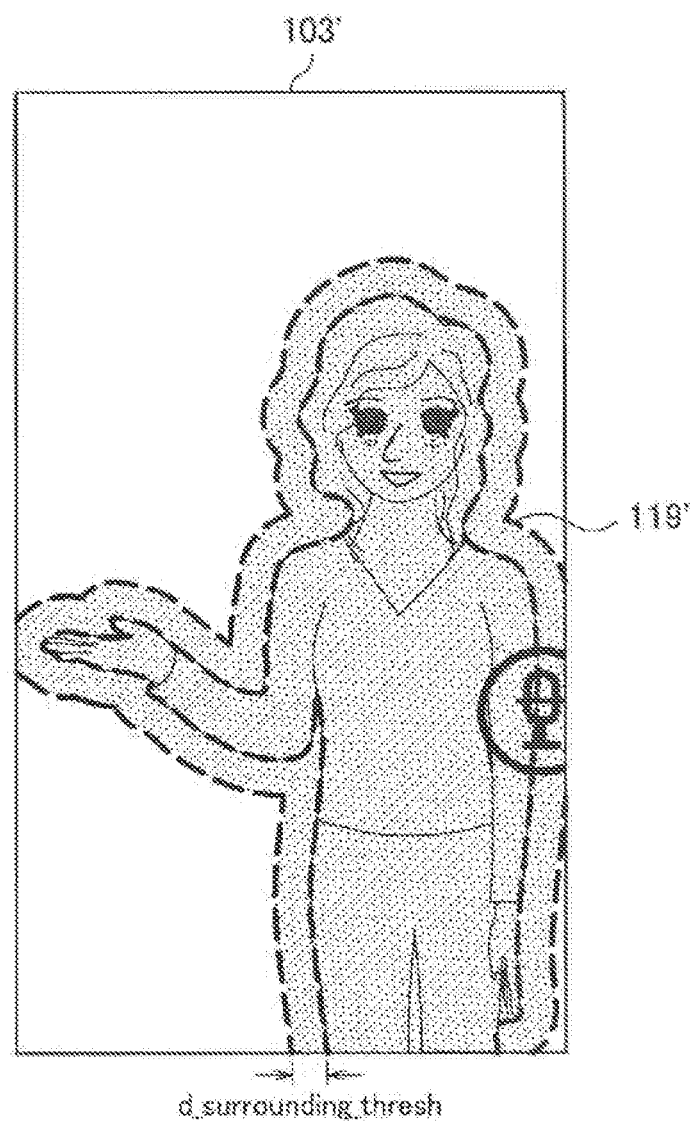
FIG. 24 is an explanatory diagram for describing that a communication system 1 performs listener side processing overflow determination.

FIG. 24 is an explanatory diagram for describing that the communication system 1 performs the listener side processing overflow determination. FIG. 24 illustrates a state in which the image of the user u1 is displayed on the display 103' on the user u2 side.

A region 119' obtained by adding a predetermined threshold value d_surrounding_thresh to the confronting body outline region of the user u1 is illustrated in FIG. 24. This region 119' may not be displayed on the display 103'. In a case in which, while the user u1 who is the speaker is speaking, the gaze of the user u2 is outside the region 119' for a predetermined time t_surrounding_thresh or more, the communication system 1 determines that the user u2 undergoes the processing overflow. On the other hand, if, while the user u1 who is the speaker is speaking, the gaze of the user u2 is inside the region 119' or the gaze returns to the inside of the region 119' before the predetermined time t_surrounding_thresh elapses even when the gaze is outside the region 119', the communication system 1 determines that the user u2 does not undergo the processing overflow.

(Listener Side Processing Overflow Determination (2))

Next, a second example of the listener side processing overflow determination will be described.

When a predetermined time or more elapses after the user u2 who is the listener side does not nod while the user u1 who is the speaker is speaking, the communication system 1 determines that the user u2 undergoes the processing overflow.

Figure 25:
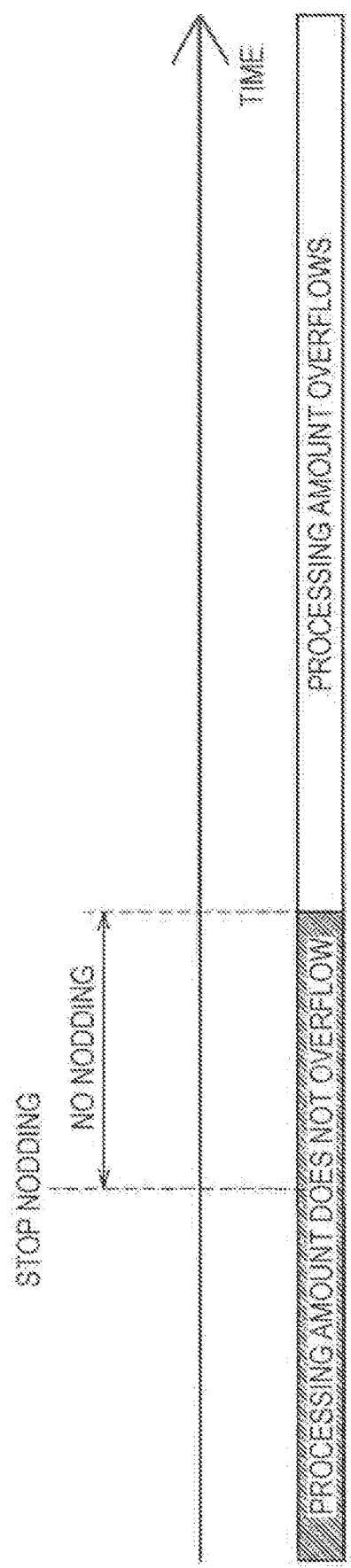
FIG. 25 is an explanatory diagram for describing that a communication system 1 performs listener side processing overflow determination.

FIG. 25 is an explanatory diagram for describing that the communication system 1 performs the listener side processing overflow determination. When the user u2 does not nod at a certain time point, and a predetermined time or more passes after the nodding is not detected, the communication system 1 determines that the user u2 undergoes the processing overflow.

(Listener Side Processing Overflow Determination (3))

Next, a third example of the listener side processing overflow determination will be described.

When the user u2 who is the listener side causes the palm to face the user u1 while the user u1 who is the speaker is speaking, and the state is continued for a predetermined time or more, the communication system 1 determines that the user u2 undergoes the processing overflow.

Figure 26:
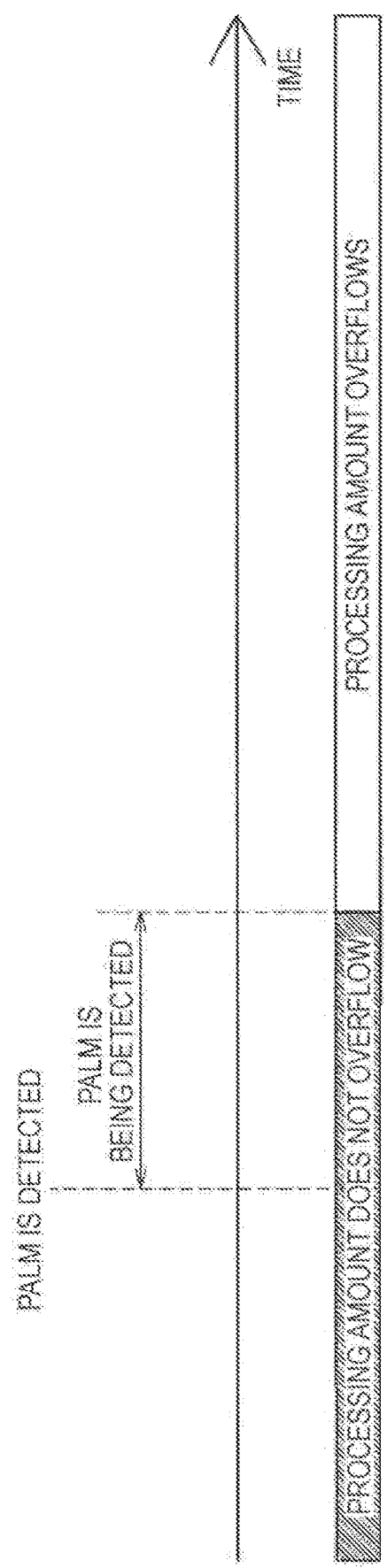
FIG. 26 is an explanatory diagram for describing that a communication system 1 performs listener side processing overflow determination.

FIG. 26 is an explanatory diagram for describing that the communication system 1 performs the listener side processing overflow determination. When the user u2 causes the palm to face the user u1 at a certain time point, and then the state continues for a predetermined time or more, the communication system 1 determines that the user u2 undergoes the processing overflow.

(Listener Side Processing Overflow Determination (4))

Next, a fourth example of the listener side processing overflow determination will be described.

In, in a case in which the text of the voice recognition result or the text obtained by translating the voice recognition result satisfies a predetermined condition while the user u1 who is the speaker is speaking, the communication system 1 determines that the user u2 undergoes the processing overflow. Examples of the predetermined condition include a condition that the number of phrases exceeds a certain threshold value as a result of phrase analysis (that the number of words exceeds a certain threshold value in the case of a language written with a space between words) and a condition that the number of nouns and verbs which are main parts of speech among morphemes (words in English) exceeds a certain threshold value, and a condition that the number of characters exceeds a certain threshold value.

Figure 27:
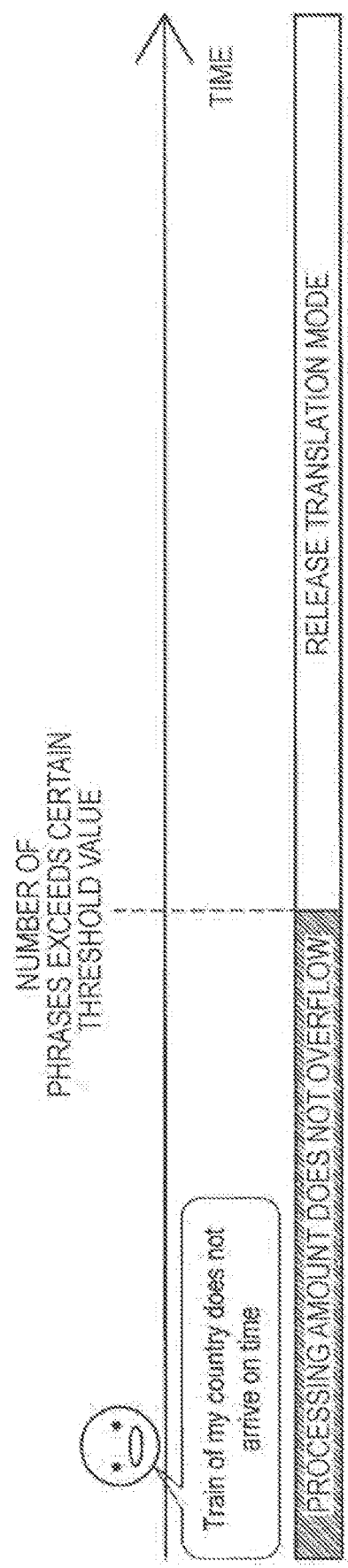
FIG. 27 is an explanatory diagram for describing that a communication system 1 performs listener side processing overflow determination.

FIG. 27 is an explanatory diagram for describing that the communication system 1 performs the listener side processing overflow determination. In a case in which the text of the voice recognition result or the text obtained by translating the voice recognition result satisfies the predetermined condition while the user u1 is speaking, the communication system 1 determines that the user u2 undergoes the processing overflow The communication system 1 may reduce the number of phrases above in a case in which highly specialized words are included in content spoken by the speaker or the translation result of the speech content, and content thereof is difficult. Further, when the content spoken by the speaker is difficult, the communication system 1 may determine whether or not the listener side undergoes the processing overflow by weighting highly specialized words.

The five examples of determining whether or not the listener side undergoes the processing overflow have been described above. The communication system 1 determines whether or not the listener side undergoes the processing overflow using any one of the methods described above or a combination of two or more of the methods described above. Further, it will be appreciated that the above example is just one example for determining whether or not the listener side undergoes the processing overflow.

Further, an amount that causes the processing overflow differs depending on the attribute of the listener. Adults are large in the amount that causes the processing overflow, but kids are small in the amount that causes the processing overflow. Therefore, the communication system 1 may cause the threshold value for determining whether or not the processing overflow occurs depending on the attribute of the listener.

Further, the communication system 1 may determine whether or not the processing overflow occurs on the basis of biometric information of the listener side. For example, information indicating an increase in the heart rate, an increase in an amount of perspiration, or the like may be acquired by a sensor installed in a device owned by the listener side, and the communication system 1 may acquire the information and determine that the listener side undergoes the processing overflow.

(User Interface in Case in which Processing Overflow is Determined to Occur) The communication system 1 presents the user interface for conveying that the listener side undergoes the processing overflow to the speaker side to the display 103 on the speaker side.

In the above example, the user interface in which the communication system 1 causes the ball U1115 to enter the ears of the listener side if the speaker speaks is illustrated.

In a case in which such a user interface is displayed, if the listener side is determined to undergo the processing overflow, the communication system 1 may cause a user interface in which the ball U1115 bounces back at the ears of the listener side and spills down to be displayed.

Figure 28:
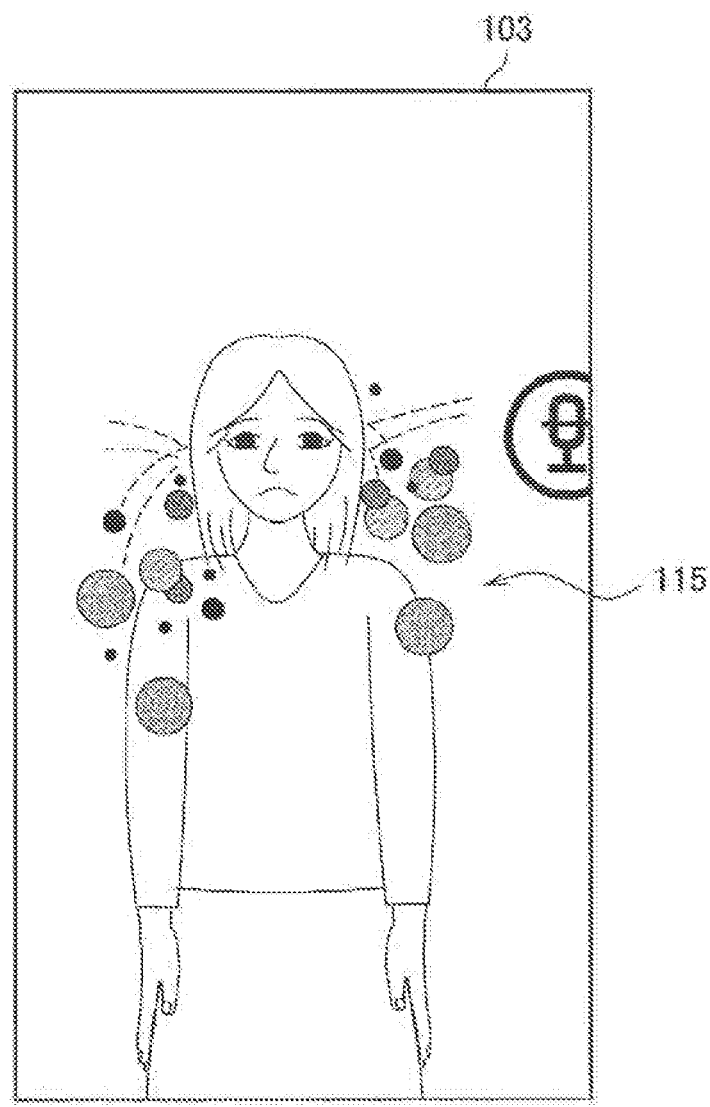
FIG. 28 is an explanatory diagram illustrating an example of a user interface.

FIG. 28 is an explanatory diagram illustrating an example of the user interface displayed on the display 103 on the user u1 side. If the user u2 which is the listener side is determined to undergo the processing overflow through the determination, the communication system 1 causes the user interface in which the ball U1115 bounces back at the ears of the user u2 and spills down to be displayed. Since such a user interface is displayed on the display 103 on the speaker side, the communication system 1 can convey the speaker side that the listener side undergoes the processing overflow.

In addition, as the user interface displayed on the display 103 on the user u1 side, for example, a user interface of stopping the display of the recognition result of speech content, a user interface of stopping the display of the ball UI 115, or the like may be provided. Further, the communication system 1 may output a sound cancelling the speaking sound of the speaker in order to convey the speaker side that the listener side undergoes the processing overflow.

FIG. 28 illustrates an example of presenting the user interface for conveying the speaker side that the listener side undergoes the processing overflow to the display 103 on the speaker side, but the communication system 1 may cause a user interface for blocking the speech of the speaker to be displayed on the listener side. For example, the communication system 1 may cause the translation result of the speech content to be displayed at the position in which the confronting state of the listener collapses, for example, near the microphone UI. The communication system 1 can convey the listener that the listener side undergoes the processing overflow by causing the gaze to deviate or causing the confronting state of the listener to collapse by causing the direction of the body to be changed.

The communication system 1 may cause the user interface displayed on the display 103 to be changed in accordance with conditions causing the processing overflow. For example, if the processing overflow is determined to occur since the that gaze does not face the speaker side, the communication system 1 may cause, for example, a CG in which sweat comes out around the image of the listener side to be displayed on the display 103. Further, for example, if the processing overflow is determined to occur since there is no nodding, the communication system 1 may cause, for example, a CG in which there is an expression in which the listener side is in trouble above the head of the listener side to be displayed on the display 103.

The operation example of the communication system 1 according to the embodiment of the present disclosure has been described using one use case. Next, an operation example of the communication system 1 according to the embodiment of the present disclosure will be described in further detail.

(Overall Flow on Speaker Side)

Figure 29:
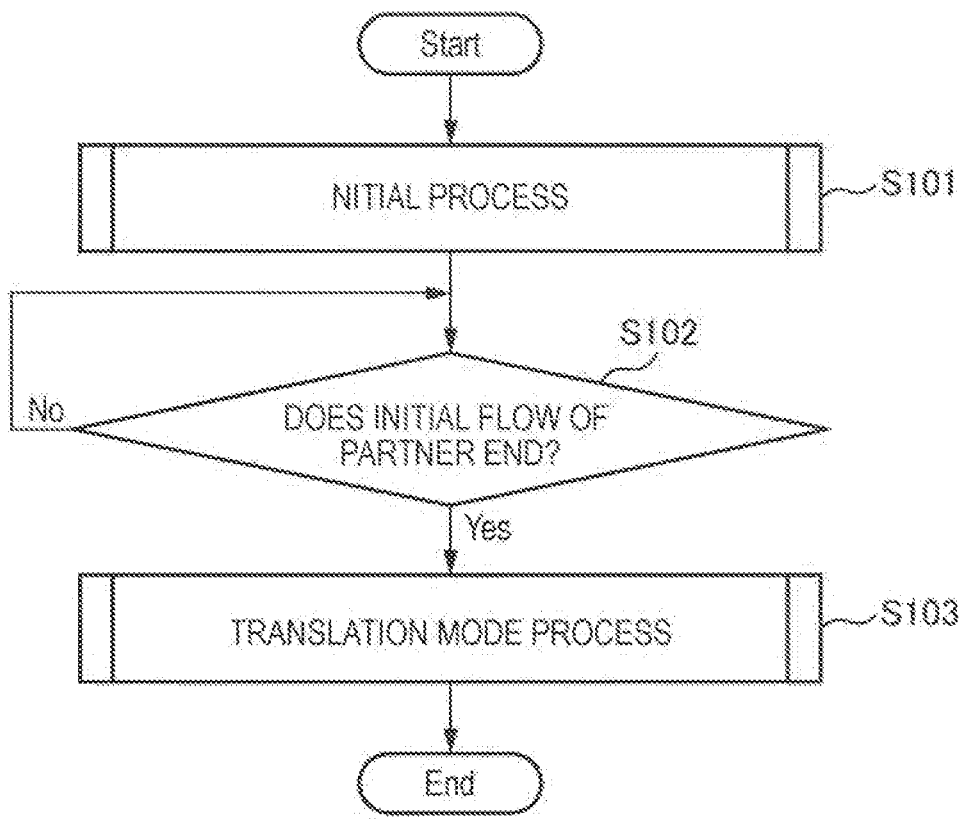
FIG. 29 is a flowchart illustrating an operation example of a communication system 1 according to the embodiment.

FIG. 29 is a flowchart illustrating an operation example of the communication system 1 according to the embodiment of the present disclosure. FIG. 29 illustrates an overall flow on the speaker side.

In a case in which the speaker (the user u1 in the above example) stands in front of the signage terminal 100, the communication system 1 executes the initial process (step S101). This initial process can be executed by the information processing device 200 on the basis of the information acquired by the signage terminal 100. The initial process will be described later in detail.

If the initial process is executed in step S101, the communication system 1 determines whether or not the initial flow of the partner (the user u2 in the above example) ends (step S102). The determination process may be performed by, for example, the information processing device 200 (for example, the determining unit 223).

If the initial flow of the partner is determined to end as a result of the determination in step S102 (Yes in step S102), the communication system 1 executes the process of the translation mode (step S103). On the other hand, if the initial flow of the partner is determined not to end as a result of the determination in step S102 (No in step S102), the communication system 1 is on standby until the initial flow of the partner ends. Further, the communication system 1 may cause the initial flow to end if the initial flow of the partner does not end even after a predetermined time elapses, for example, because the partner does not appear.

(Initial Process Flow)

Figure 30A:
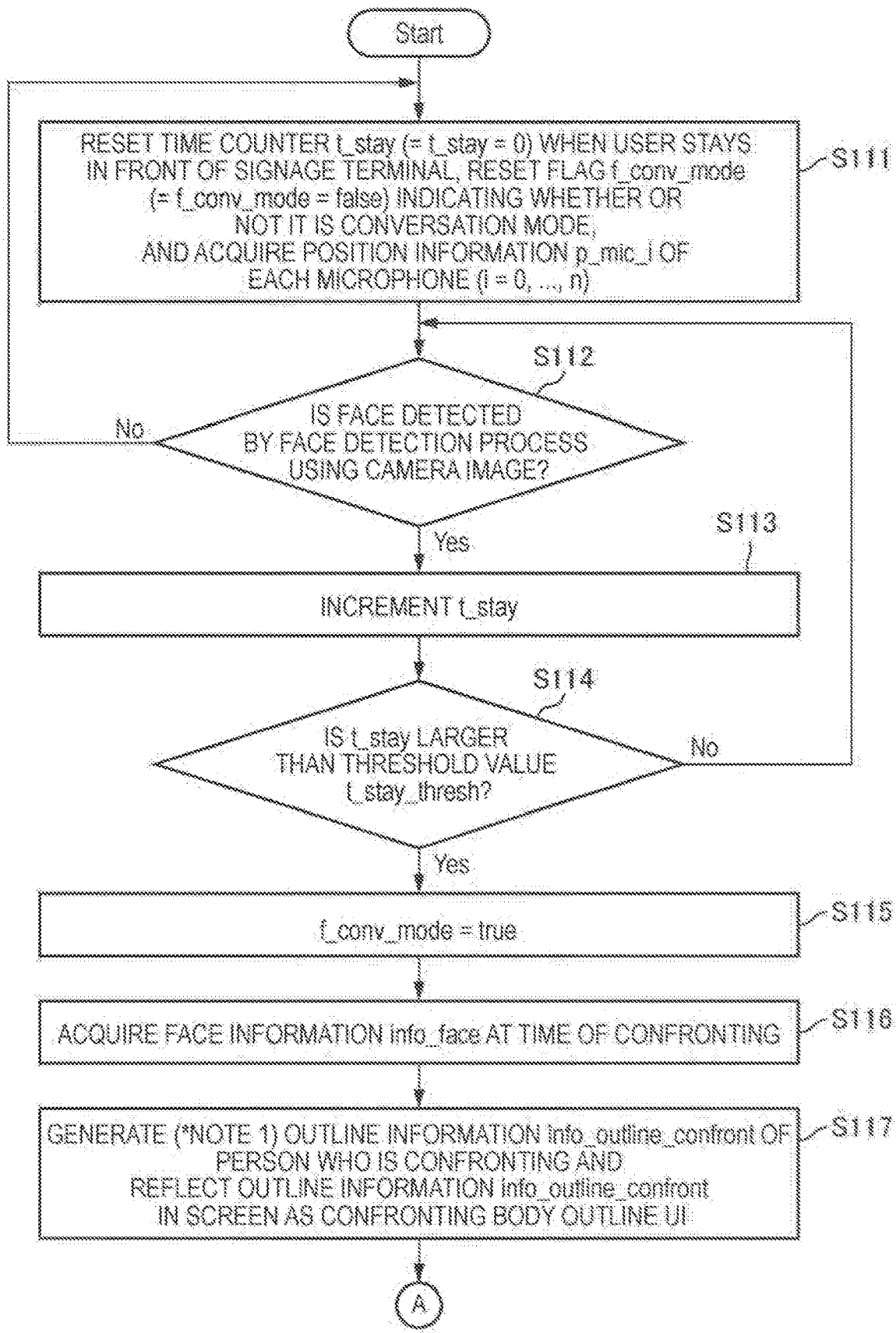
FIG. 30A is a flowchart illustrating an operation example of a communication system 1 according to the embodiment.

Next, a detailed flow of the initial process illustrated in step S101 of FIG. 29 will be described. FIGS. 30A and 30B are flowcharts illustrating an operation example of the communication system 1 according to the embodiment of the present disclosure. FIGS. 30A and 30B illustrate the detailed flow of the initial process illustrated in step S101 of FIG. 29. Further, the information processing device 200 is assumed to execute the initial process to be described below on the basis of the information acquired by the signage terminal 100, but the initial process may be performed by any device included in the communication system 1.

First, the communication system 1 reset a time counter t_stay (t_stay=0) when the user stays in front of the signage terminal 100, reset a flag f_conv_mode (f_conv_mode=false) indicating whether or not it is the conversation mode, and acquire position information p_mic_i of the microphone 102 (i=0, . . . , n) (step S111).

Then, the communication system 1 determines whether or not the face is detected by a face detection process using a camera image captured by the camera 101 (step S112).

If the face is not detected as a result of the determination in step S112 (No in step S112), the communication system 1 returns to step S111. On the other hand, if the face is detected as a result of the determination in step S112 (Yes in step S112), the communication system 1 increments the time counter t_stay (step S113).

If the time counter t_stay is incremented in step S113, the communication system 1 then determines whether or not the time counter t_stay is larger than the threshold value t_stay_thresh (step S114).

In a case in which the time counter t_stay is less than the threshold value t_stay_thresh as a result of the determination in step S114 (No in step S114), the communication system 1 returns to the process in step S112. On the other hand, in a case in which the time counter t_stay is larger than threshold value t_stay_thresh as a result of the determination in step S114 (Yes in step S114), the communication system 1 sets the flag f_conv_mode indicating whether or not it is the conversation mode to true (step S115), and acquires face information info_face of the user who is confronting (step S116).

If the flag f_conv_mode is set to true, and the face information info_face of the user who is confronting is acquired, the communication system 1 then generates outline information info_outline_confront of a person who is confronting, and reflects the outline information info_outline_confront in the screen as the confronting body outline UI (step S117).

If the outline information info_outline_confront of the person who is confronting is generated, the communication system 1 acquires eye information info_eye, mouth information info_mouth, and nose information info_nose from the face information info_face of the user who is confronting or the outline information info_outline_confront of the person who is confronting (step S118).

If the eye information info_eye, the mouth information info_mouth, and the nose information info_nose are acquired, the communication system 1 then generates face information info_facial_exp in which a facial expression is variously changed from info_fase (step S119). Examples of the facial expression include a facial expression in a state in which no emotion is expressed, a smiling expression, and an anxious expression, but the present embodiment is not limited to these expressions.

If the face information info_facial_exp is generated in step S119, the communication system 1 executes the ear position estimation flow (step S120). The ear position estimation flow will be described later in detail.

If the ear position estimation flow is executed in step S120, the communication system 1 then executes the high sensitivity microphone position acquisition flow (step S121). The high sensitivity microphone position acquisition flow will be described later in detail.

If the high sensitivity microphone position acquisition flow in step S121 is executed, the communication system 1 causes the microphone UI to be moved by animation from mouth position information p_mouth to high sensitivity microphone position p_h_sensitive_mic (step S122).

The detailed flow of the initial process illustrated in step S101 in FIG. 29 has been described above. Next, a detailed flow of the ear position estimation flow of step S120 will be described.

(Ear Position Estimation Flow)

Figure 31:
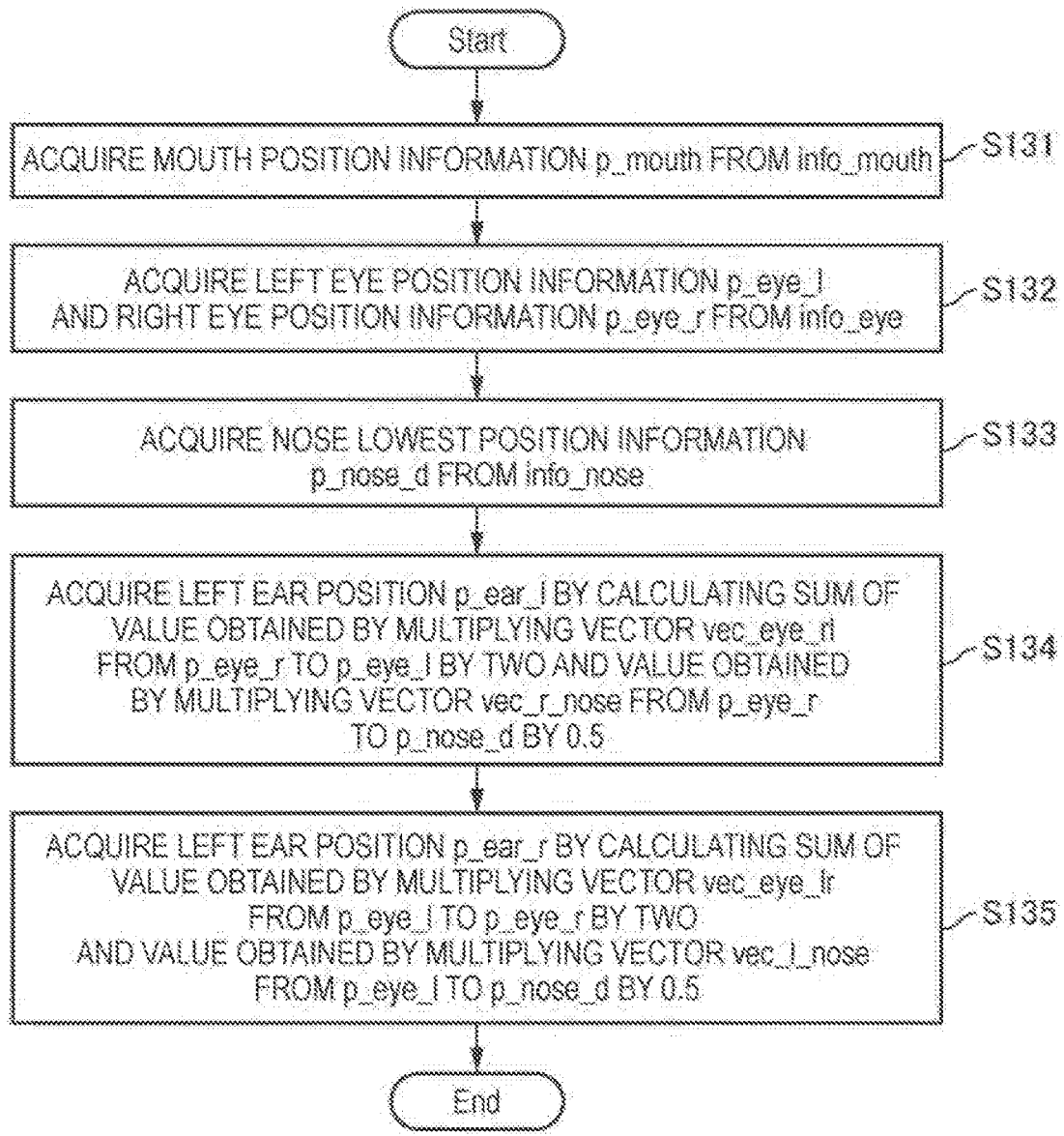
FIG. 31 is a flowchart illustrating an operation example of a communication system 1 according to the embodiment.

FIG. 31 is a flowchart illustrating an operation example of the communication system 1 according to the embodiment of the present disclosure. FIG. 31 illustrates a detailed flow of the ear position estimation flow in step S120 of FIG. 30B. Further, the ear position estimation flow to be described below is assumed to be executed by the information processing device 200 on the basis of the information acquired by the signage terminal 100, but the ear position estimation flow may be performed by any device included in the communication system 1.

When the ear position estimation flow is executed, the communication system 1 first acquires the mouth position information p_mouth from the mouth information info_mouth (step S131). Further, the communication system 1 acquires left eye position information p_eye_l and right eye position information p_eye_r from the eye information info_eye (step S132). Further, the communication system 1 acquires nose lowest position information p_nose_d from the nose information info_nose (step S133).

Figure 32:
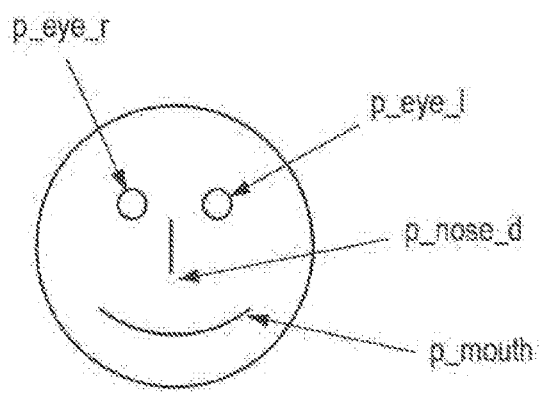
FIG. 32 is an explanatory diagram illustrating mouth position information, left eye position information, right eye position information, and nose lowest position information.

FIG. 32 is an explanatory diagram illustrating the mouth position information p_mouth, the left eye position information p_eye_l, the right eye position information p_eye_r, and the nose lowest position information p_nose_d. As illustrated in FIG. 32, the communication system 1 acquires the mouth position information p_mouth, the left eye position information p_eye_l, the right eye position information p_eye_r, and the nose lowest position information p_nose_d from the eye information info_eye, the mouth information info_mouth, and the nose information info_nose of the user who stands in front of the signage terminal 100.

Then, the communication system 1 acquires the left ear position p_ear_l by calculating a sum of a value obtained by multiplying a vector vec_eye_rl from the right eye position information p_eye_r to the left eye position information p_eye_l by two and a value obtained by multiplying a vector vec_r_nose from the right eye position information p_eye_r to the nose lowest position information p_nose_d by 0.5 (step S134).

Similarly, the communication system 1 acquires the left ear position p_ear_r by calculating a sum of a value obtained by multiplying the vector vec_eye_lr from the left eye position information p_eye_l to the right eye position information p_eye_r by two and a value obtained by multiplying the vector vec_l_nose from p_eye_l to p_nose_d by 0.5 (step S135).

Figure 33:
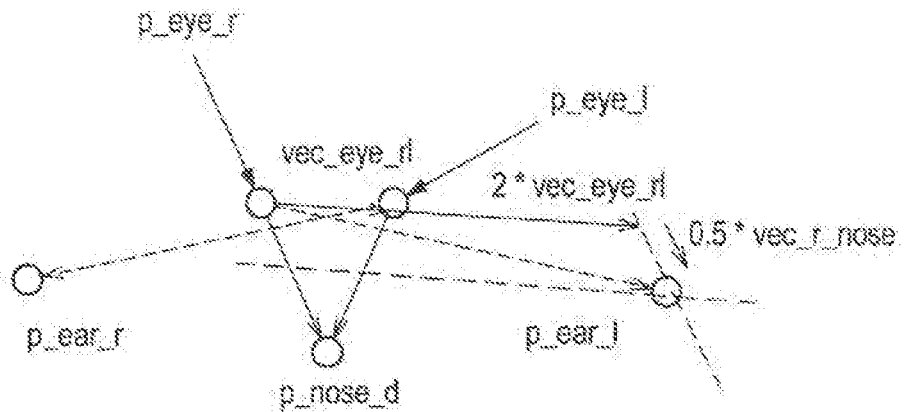
FIG. 33 is an explanatory diagram illustrating a left ear position and a right ear position.

FIG. 33 is an explanatory diagram illustrating the left ear position p_ear_l and the right ear position p_ear_r calculated from the mouth position information p_mouth, the left eye position information p_eye_l, the right eye position information p_eye_r, and the nose lowest position information p_nose_d. As described above, the communication system 1 calculates the approximate left ear position p_ear_l and the approximate right ear position p_ear_r of the user.

The detailed flow of the ear position estimation flow illustrated in step S120 of FIG. 30B has been described above. Next, the detailed flow at the high sensitivity microphone position acquisition flow in step S121 of FIG. 30B will be described.

(High Sensitivity Microphone Position Acquisition Flow)

Figure 34:
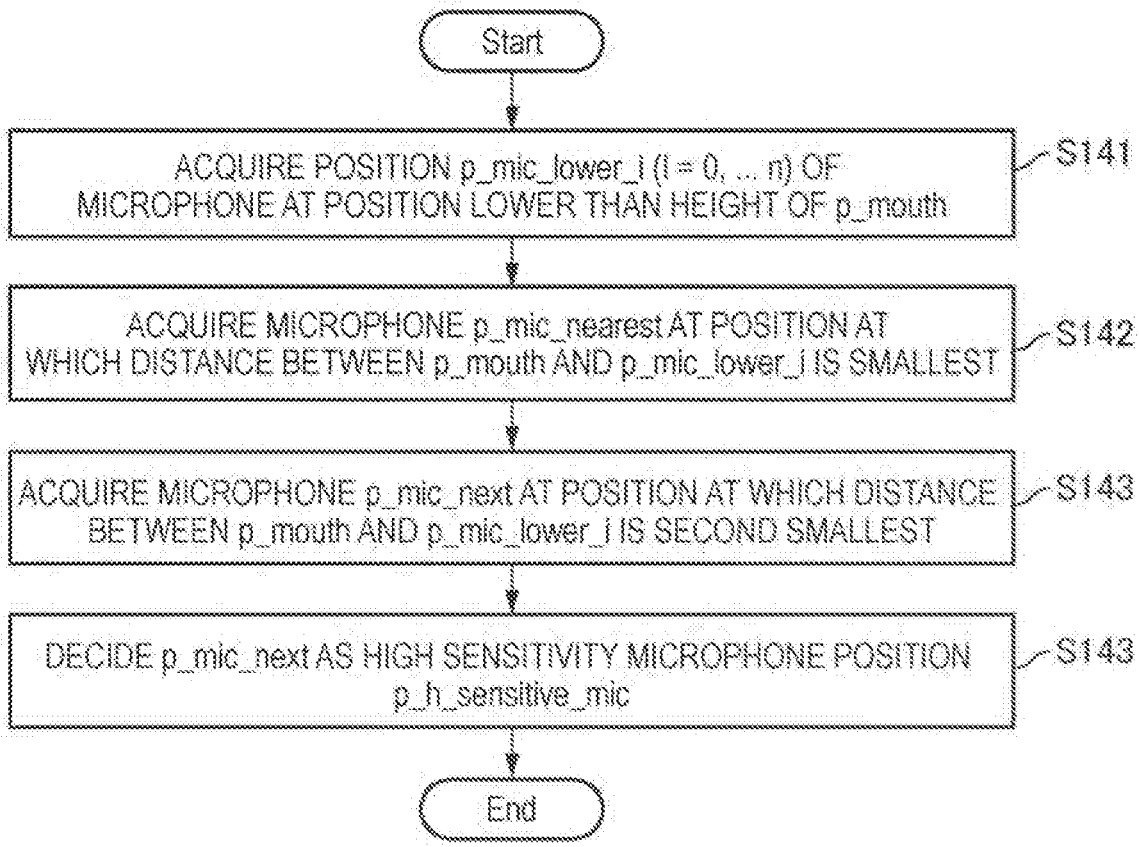
FIG. 34 is a flowchart illustrating an operation example of a communication system 1 according to the embodiment.

FIG. 34 is a flowchart illustrating an operation example of the communication system 1 according to the embodiment of the present disclosure. FIG. 34 illustrates a detailed flow of the high sensitivity microphone position acquisition flow in step S121 of FIG. 30B. Further, the information processing device 200 is assumed to execute the high sensitivity microphone position acquisition flow as described below on the basis of the information acquired by the signage terminal 100, but the high sensitivity microphone position acquisition flow may be executed by any device included in the communication system 1.

When the high sensitivity microphone position acquisition flow is executed, the communication system 1 first acquires the position p_mic_lower_i (i=0, . . . , n) of the microphone 102 at a position lower than the height of the mouth position information p_mouth (step S141).

If the position p_mic_lower_i (i=0, . . . , n) of the microphone 102 is acquired, the communication system 1 acquires the position p_mic_nearest of the microphone 102 at a position at which the distance between the mouth position information p_mouth of the user and the position p_mic_lower_i of the microphone 102 is smallest (step S142). Then, the communication system 1 acquires the position p_mic_next of the microphone 102 at a position in which the distance between the mouth position information p_mouth of the user and the position p_mic_lower_i of the microphone 102 is second smallest (step S143).

Then, the communication system 1 decides the position p_mic_next of the microphone 102 acquired in step S143 as the high sensitivity microphone position p_h_sensitive_mic (step S144).

Figure 35:
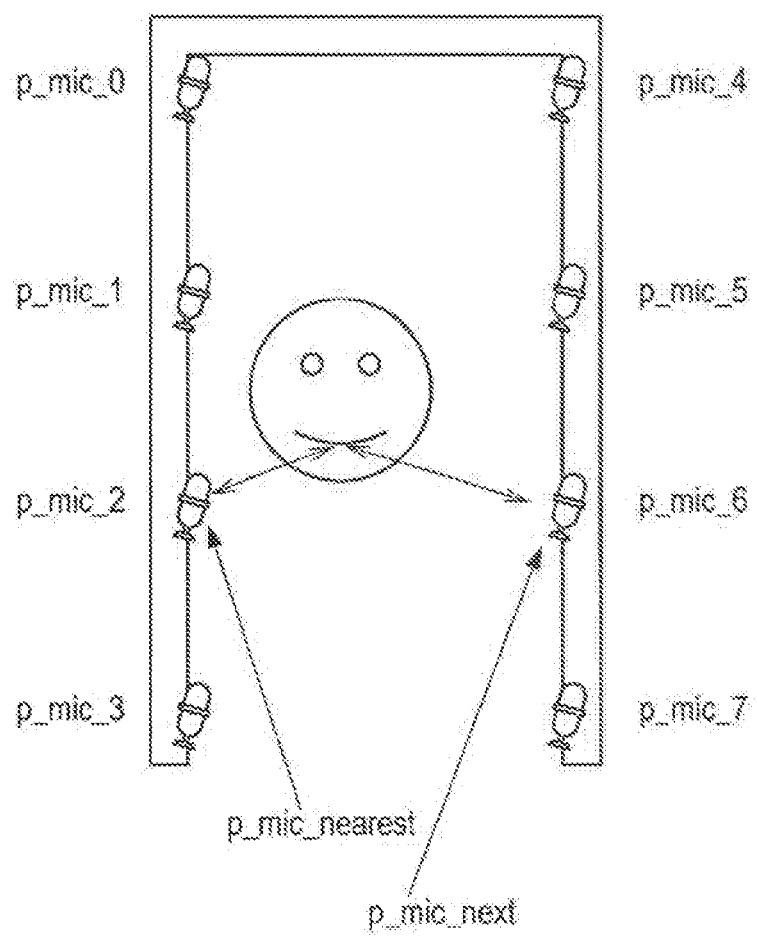
FIG. 35 is an explanatory diagram for describing a method of determining a high sensitivity microphone position.

FIG. 35 is an explanatory diagram for describing a method of determining the high sensitivity microphone position. In a case in which the face of the user and the microphone 102 are arranged as illustrated in FIG. 35, p_mic_lower_i is p_mic_2, p_mic_3, p_mic_6, p_mic_7.

Then, p_mic_nearest is p_mic_2, and p_mic_next is p_mic_6. Therefore, in a case in which the face of the user and the microphone 102 are arranged as illustrated in FIG. 35, the communication system 1 determines the microphone at the position of p_mic-6 as the high sensitivity microphone position p_h_sensitive_mic.

Since the high sensitivity microphone position is decided on the basis of the position of the face of the user as described above, the communication system 1 can cause the voice of the user to be successfully input without depending on the position of the microphone or the height of the user.

The detailed flow of the high sensitivity microphone position acquisition flow illustrated in step S121 of FIG. 30B has been described above. Then, a detailed flow of the translation mode process flow in step S103 of FIG. 29 will be described.

(Translation mode process flow) FIGS. 36A and 36B are flow diagrams illustrating an operation example of the communication system 1 according to the embodiment of the present disclosure. FIGS. 36A and 36B illustrate a detailed flow of the translation mode process flow in step S103 of FIG. 29. Further, the information processing device 200 is assumed to execute the translation mode process flow described below on the basis of the information acquired by the signage terminal 100 and the information generated by the translation processing device 400, but the translation mode process flow may be performed by any device included in the communication system 1.

When the translation mode process flow is executed, the communication system 1 first resets the flag f_trans_mode (f_trans_mode=false) indicating whether or not it is the translation mode (step S151).

If the flag f_trans_mode is reset, the communication system 1 then executes a translation mode activation process (step S152). The translation mode activation process will be described later in detail.

If the translation mode activation process is executed, the communication system 1 then determines whether or not the distance d_mic_mouth between the high sensitivity microphone position p_h_sensitive_mic and the mouth position information p_mouth is smaller than a threshold value d_mic_mouth_thresh (step S153).

If the distance d_mic_mouth between the high sensitivity microphone position p_h_sensitive_mic and the mouth position information p_mouth is equal to or larger than the threshold value d_mic_mouth_thresh as a result of the determination in the step S153 (No in step S153), the communication system 1 then determines whether or not the current body outline information remains within the confronting outline information for more than the threshold value t_stay_confront_thresh from the body outline information info_outline_current at that time and the outline information info_outline_confront of the person who is confronting (step S154).

If the current body outline information remains within the confronting outline information for more than the threshold value t_stay_confront_thresh as a result of the determination in step S154 (Yes in step S154), the communication system 1 executes the translation mode end process (step S155). The translation mode end process will be described later in detail. On the other hand, if the current body outline information does not remain within the confronting outline information for more than the threshold value t_stay_confront_thresh as a result of the determination in step S154 (No in step S154), the communication system 1 returns to the determination process of the step S153.

On the other hand, if the distance d_mic_mouth between the high sensitivity microphone position p_h_sensitive_mic and the mouth position information p_mouth is smaller than the threshold value d_mic_mouth_thresh as a result of the determination in step S153 (Yes in step S153), the communication system 1 then repeats animation of fade-in and fade-out for the confronting body outline UI (step S156).

If the animation of fade-in and fade-out is repeated for the confronting body outline UI is repeated, the communication system 1 generates the body outline information info_outline_current at that time and reflects the body outline information info_outline_current in the screen as the current body outline UI (step S157).

If the body outline information info_outline_current is generated and reflected in the screen as the current body outline UI, the communication system 1 then determines whether or not the volume of the voice information info_voice collected by the microphone 102 exceeds a voice input determination threshold value recognition_vol_thresh (step S158).

If the volume of the voice information info_voice exceeds the voice input determination threshold value recognition_vol_thresh as a result of the determination in step S158 (Yes in step S158), the communication system 1 executes the voice translation feedback process (step S159). The voice translation feedback process will be described later in detail. If the voice translation feedback process is executed, the communication system 1 returns to the determination process of the step S153.

On the other hand, if the volume of the voice information info_voice does not exceed the voice input determination threshold value recognition_vol_thresh as a result of the determination in step S158 (No in step S158), the communication system 1 executes the translation mode continuation determination process (step S160). The translation mode continuation determination process will be described later in detail.

If the translation mode continuation determination process in step S160 is executed, the communication system 1 then determines whether or not the value of the flag f_trans_mode indicating whether or not it is the translation mode is true (step S161). If the value of the flag f_trans_mode is true (Yes in step S161), the communication system 1 returns to the determination process in step S153. On the other hand, if the value of the flag f_trans_mode is not true, that is, false (No in step S161), the communication system 1 executes the translation mode end process in step S155.

The detailed flow of the translation mode process flow in step S103 of FIG. 29 has been described above with reference to FIGS. 36A and 36B. Next, a detailed flow of the translation mode activation process flow in step S152 of FIG. 36A will be described.

(Translation Mode Activation Process Flow)

FIG. 37 is a flowchart illustrating an operation example of the communication system 1 according to the embodiment of the present disclosure. FIG. 37 illustrates a detailed flow of the translation mode activation process flow in step S152 of FIG. 36A. Further, the translation mode activation process flow to be described below is assumed to be executed by the information processing device 200 on the basis of the information acquired by the signage terminal 100, but the translation mode activation process flow may be performed by any device included in the communication system 1.

The communication system 1 determines whether or not the distance d_mic_mouth between the high sensitivity microphone position p_h_sensitive_mic and the mouth position information p_mouth is smaller than a threshold value d_mic_mouth_thresh (step S171).

If the distance d_mic_mouth between the high sensitivity microphone position p_h_sensitive_mic and the mouth position information p_mouth is not smaller than the threshold value d_mic_mouth_thresh as a result of the determination in step S171 (No in step S171), the communication system 1 repeats the process in step S171. On the other hand, if the distance d_mic_mouth between the high sensitivity microphone position p_h_sensitive_mic and the mouth position information p_mouth is smaller than the threshold value d_mic_mouth_thresh as a result of the determination in step S171 (Yes in step S171), the communication system 1 then starts to reflect the image of the face information info_face of the user in the screen of the partner (step S172).

Then, the communication system 1 stops the microphone process, that is, the sound collection process of the microphone which does not become the high sensitivity microphone position p_h_sensitive_mic (step S173).

If the microphone process of the microphone that does not become the high sensitivity microphone position p_h_sensitive_mic is stopped, the communication system 1 then starts acquiring the gaze information info_gaze of the user using the image captured by the camera 101 (step S173).

If the acquisition of the gaze information info_gaze of the user is started, the communication system 1 then starts acquiring speech the frequency information info_voice_freq of the speech of the user collected by the microphone 102 at the high sensitivity microphone position (step S174).

If the acquisition of the frequency information info_voice_freq is started, the communication system 1 then activates the voice recognition with the voice information info_voice for the high sensitivity microphone position p_h_sensitive_mic (step S175).

If the voice recognition is started, the communication system 1 then sets the value of the flag f_trans_mode indicating whether or not it is the translation mode to true (step S176). Further, a timing at which the value of the flag f_trans_mode indicating whether or not it is the translation mode is to true is not limited to this timing. Further, the timings of the starting or the activation of the respective processes in the process flow illustrated in FIG. 37 are not limited to the order illustrated in FIG. 37.

The detailed flow of the translation mode activation process flow in step S152 of FIG. 36A has been described above. Next, a detailed flow of the translation mode end flow in step S155 of FIG. 36A will be described.

(Translation Mode End Flow)

FIG. 38 is a flowchart illustrating an operation example of the communication system 1 according to the embodiment of the present disclosure. FIG. 38 illustrates a detailed flow of the translation mode end flow in step S155 of FIG. 36A. Further, the translation mode end flow to be described below is assumed to be executed by the information processing device 200 on the basis of the information acquired by the signage terminal 100, but the translation mode end flow may be performed by any device included in the communication system 1.

In a case in which the translation mode end flow is executed, the communication system 1 first set the value of the flag f_trans_mode indicating whether or not it is the translation mode to false (step S181). Further, a timing at which the value of the flag f_trans_mode indicating whether or not it is the translation mode is set to false is not limited to this timing.

If the value of the flag f_trans_mode indicating whether or not it is the translation mode is set to false, the communication system 1 then stops presenting the body outline information info_outline_current of the user to the display 103 (step S182).

If the presenting of the body outline information info_outline_current of the user to the display 103 is stop, the communication system 1 then stops repeating the animation of fade-in and fade-out for the confronting body outline UI (step S183).

If the repetition of the animation of the fade-in and the fade-out for the confronting body outline UI is stopped, the communication system 1 then stops the voice recognition with the voice information info_voice at the high sensitivity microphone position p_h_sensitive_mic (step S184).

If the voice recognition with the voice information info_voice at the high sensitivity microphone position p_h_sensitive_mic is stopped, the communication system 1 then stops acquiring the speech frequency information info_voice_freq of the speech of the user collected by the microphone 102 at the high sensitivity microphone position (step S185).

If the acquisition of the speech frequency information info_voice_freq of the user is stopped, the communication system 1 stops acquiring the gaze information info_gaze of the user (step S186).

If the acquisition of the gaze information info_gaze of the user is stopped, the communication system 1 then releases the stop of the microphone process, that is, the sound collection process of the microphone which does not become the high sensitivity microphone position p_h_sensitive_mic (step S187).

If the stop of the microphone process of the microphone which does not become the high sensitivity microphone position p_h_sensitive_mic is released, the communication system 1 then stops reflecting the image of the face information info_face of the user in the screen of the partner (step S188).

Further, the timings of stopping the respective processes in the process flow illustrated in FIG. 38 are not limited to the order illustrated in FIG. 38.

The detailed flow of the translation mode end flow in step S155 of FIG. 36A has been described above. Next, a detailed flow of the voice translation feedback process in step S159 of FIG. 36B will be described.

Figure 39B:
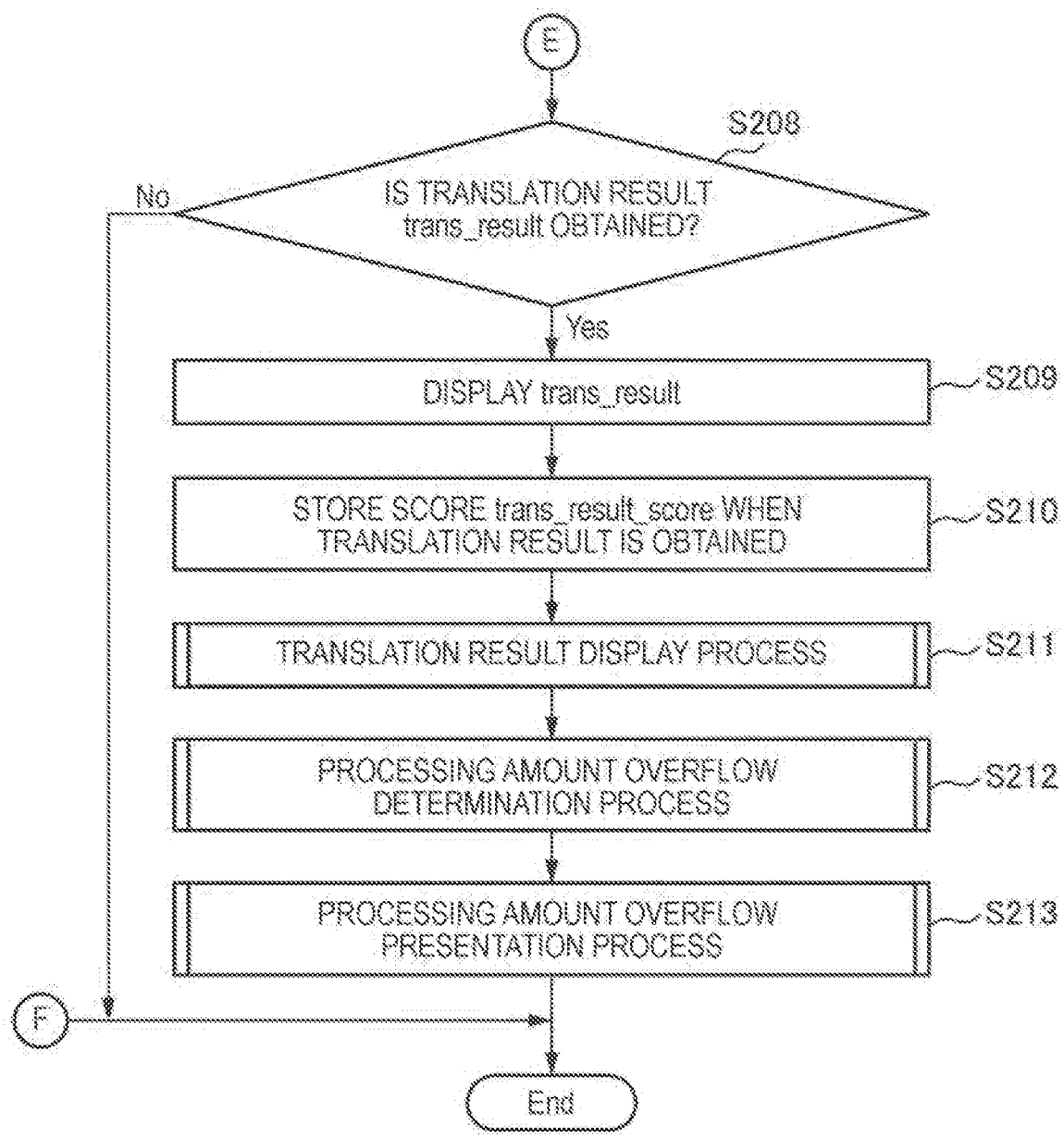
FIG. 39B is a flowchart illustrating an operation example of a communication system 1 according to the embodiment.

(Voice translation feedback process flow) FIGS. 39A and 39B are flowcharts each illustrating an operation example of the communication system 1 according to the embodiment of the present disclosure. FIGS. 39A and 39B each illustrate a detailed flow of the voice translation feedback process in step S159 of FIG. 36B. Further, the voice translation feedback process flow to be described below is assumed to be executed by the information processing device 200 on the basis of the information acquired by the signage terminal 100, but the voice translation feedback process flow may be performed by any device included in the communication system 1.

The communication system 1 determines whether or not the volume of the voice information info_voice input to the microphone 102 at the high sensitivity microphone position p_h_sensitive_mic exceeds a threshold value voice_vol_thresh (step S201).

If the volume of the voice information info_voice exceeds the threshold value voice_vol_thresh as a result of the determination in step S201 (Yes in step S201), the communication system 1 then generates a ball object obj_ball having a radius corresponding to the size of the volume (step S202). If the ball object obj_ball is generated, the communication system 1 then executes the ball object animation process (step S203). The ball object animation process will be described later in detail.

If the ball object animation process in step S203 is executed or if the volume of the voice information info_voice does not exceed the threshold value voice_vol_thresh as a result of the determination of step S201 (No in step S201), the communication system 1 then calculates info_voice_freq_ave as the frequency average information of the past speech of the user (step S204).

If the frequency average information info_voice_freq_ave is calculated, the communication system 1 determines whether or not the voice recognition result voice_result is obtained by the voice information processing device 300 (step S205).

In a case in which the voice recognition result voice_result is obtained by the voice information processing device 300 as a result of the determination in step S205 (Yes in step S205), the communication system 1 then executes the voice recognition result display process (step S206). The voice recognition result display process will be described later in detail.

If the voice recognition result display process is executed, the communication system 1 then activates the translation process in translation processing device 400 on the voice recognition result voice_result (step S207).

If the translation process in the translation processing device 400 on the voice recognition result voice_result is activated, the communication system 1 then determines whether or not a translation result trans_result in the translation processing device 400 on voice recognition result voice_result is obtained (step S208).

If the translation result trans_result in the translation processing device 400 on the voice recognition result voice_result is obtained as a result of the determination at step S208 (Yes step S208), the communication system 1 then causes the translation result trans_result in the translation processing device 400 to be displayed on the signage terminal 100 (step S209).

If the translation result trans_result in the translation processing device 400 is displayed on the signage terminal 100, the communication system 1 then stores a score trans_result_score when the translation result trans_result is obtained (step S210). The score generating unit 422 of the translation processing device 400 generates the translation score in accordance with certainty of the translation result trans_result.

If the score trans_result_score when the translation result trans_result is obtained is stored, the communication system 1 then executes the translation result display process (step S211). The translation result display process will be described later in detail.

If the translation result display process is executed, the communication system 1 then executes the processing amount overflow determination process (step S212). The processing amount overflow determination process will be described later in detail.

If the processing amount overflow determination process is executed, the communication system 1 then executes the processing amount overflow presentation process (step S213). The processing amount overflow presentation process will be described later in detail. If the processing amount overflow presentation process is executed, the communication system 1 ends the voice translation feedback process.

In a case in which the voice recognition result voice_result is not obtained by the voice information processing device 300 as a result of the determination in step S205 (No step S205) or in a case in which the translation result trans_result in the translation processing device 400 on the voice recognition result voice_result is not obtained as a result of the determination in step S208 (No in step S208), the communication system 1 ends the voice translation feedback process.

The detailed flow of the voice translation feedback process in step S159 of FIG. 36B has been described above. Next, a detailed flow of the ball object animation process in step S203 of FIG. 39A will be described.

(Ball Object Animation Process Flow)

Figure 40:
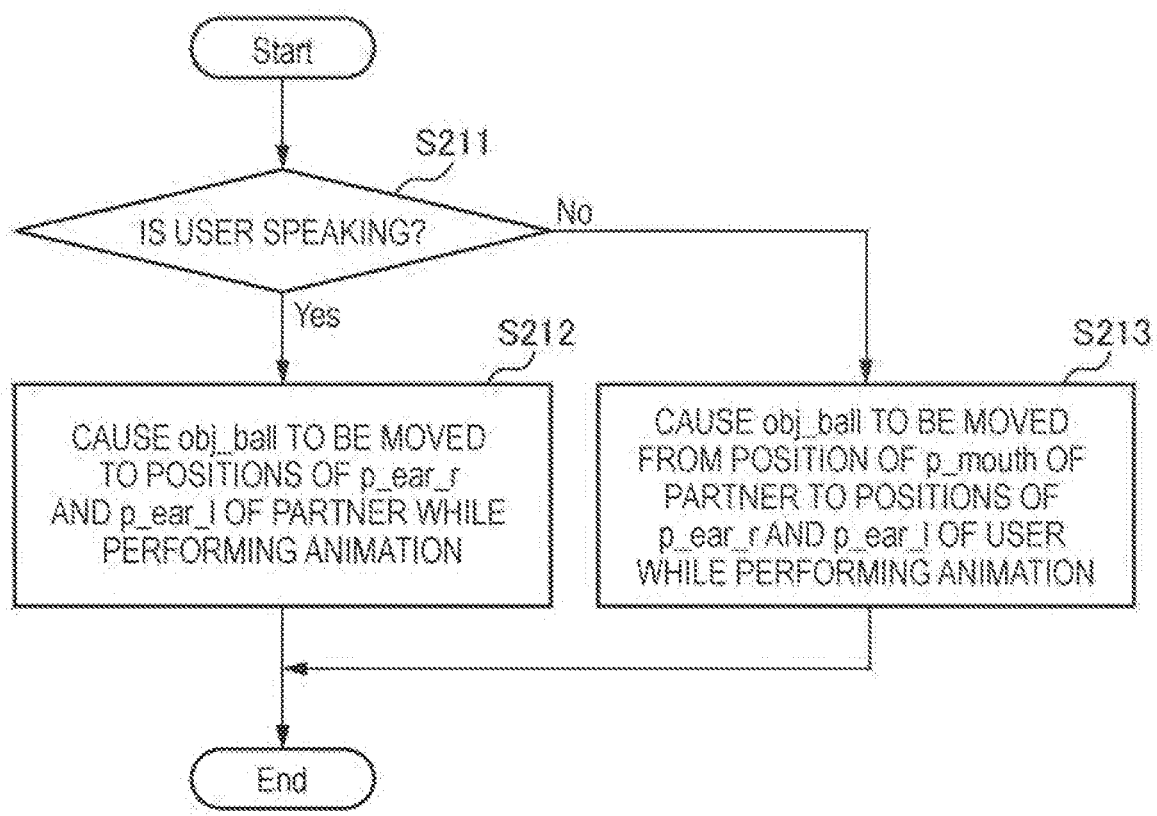
FIG. 40 is a flowchart illustrating an operation example of a communication system 1 according to the embodiment.

FIG. 40 is a flowchart illustrating an operation example of the communication system 1 according to the embodiment of the present disclosure. FIG. 40 illustrates a detailed flow of the ball object animation process in step S203 of FIG. 39A. Further, the ball object animation process flow to be described below is assumed to be executed by the information processing device 200 on the basis of the information acquired by the signage terminal 100, but the ball object animation process flow may be performed by any device included in the communication system 1.

In a case in which the ball object animation process is executed, the communication system 1 determines whether or not the user is speaking (step S211).

In a case in which the user is speaking as a result of the determination in step S211 (Yes in step S211), the communication system 1 then causes the ball object obj_ball to be moved to the positions of the left ear position p_ear_l and the position of the right ear position p_ear_r of the partner while performing animation (step S212).

On the other hand, in a case in which the user is not speaking as a result of the determination in step S211 (No in step S211), the communication system 1 then causes the ball object obj_ball to be moved from the mouth position information p_mouth of the partner to the positions of the left ear position p_ear_l and the position of the right ear position p_ear_r while performing animation (step S213).

The detailed flow of the ball object animation process in step S203 of FIG. 39A has been described above. Next, a detailed flow of the processing amount overflow determination process in step S212 of FIG. 39B will be described.

(Processing Amount Overflow Determination Process Flow (1))

Figure 41:
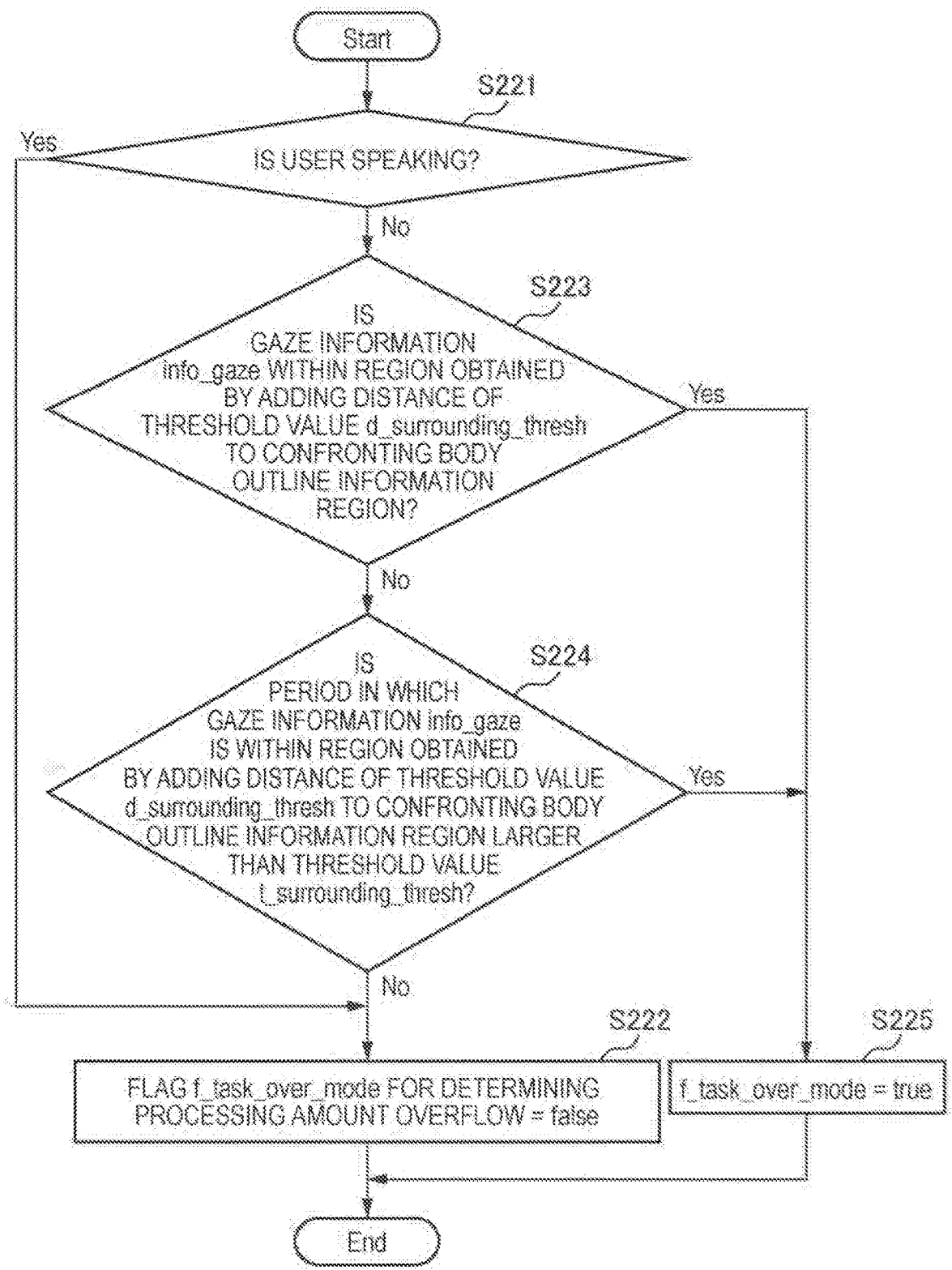
FIG. 41 is a flowchart illustrating an operation example of a communication system 1 according to the embodiment.

FIG. 41 is a flowchart illustrating an operation example of the communication system 1 according to the embodiment of the present disclosure. FIG. 41 illustrates a detailed flow of the processing amount overflow determination process in step S212 of FIG. 39B. Further, the information processing device 200 is assumed to execute the processing amount overflow determination process flow to be described below on the basis of the information acquired by the signage terminal 100 or the like, but the processing amount overflow determination process flow may be performed by any device included in the communication system 1.

In a case in which the processing amount overflow determination process is executed, the communication system 1 first determines whether or not the user is speaking (step S221).

In a case in which the user is speaking as a result of the determination in step S221 (Yes in step S221), the communication system 1 then sets the value of the flag f_task_over_mode for determining the processing amount overflow to false (step S222).

On the other hand, in a case in which the user is not speaking as a result of the determination in the above step S221 (No in step S221), the communication system 1 then determines whether or not the gaze information info_gaze of the user is within the region obtained by adding the distance of the threshold value d_surrounding_thresh to the confronting body outline information region of the partner (step S223).

If the gaze information info_gaze of the user is not within the region obtained by adding the distance of the threshold value d_surrounding_thresh to the confronting body outline information region of the partner as a result of the determination in the step S223 (No in step S223), the communication system 1 then determines whether or not a period in which the gaze information info_gaze of the user is within the region obtained by adding the distance of the threshold value d_surrounding_thresh to the confronting body outline information region of the partner is larger than a threshold value t_surrounding_thresh (step S224).

If the period in which the gaze information info_gaze of the user is within the region obtained by adding the distance of the threshold value d_surrounding_thresh to the confronting body outline information region of the partner is not larger than a threshold value t_surrounding_thresh as a result of the determination in the step S224 (No in step S224), the communication system 1 sets the value of the flag f_task_over_mode for determining the processing amount overflow to false (step S222).

On the other hand, If the gaze information info_gaze of the user is within the region obtained by adding the distance of the threshold value d_surrounding_thresh to the confronting body outline information region of the partner as a result of the determination in the step S223 (Yes in step S223) or if the period in which the gaze information info_gaze of the user is within the region obtained by adding the distance of the threshold value d_surrounding_thresh to the confronting body outline information region of the partner is larger than a threshold value t_surrounding_thresh as a result of the determination in the step S224 (Yes in step S224), the communication system 1 then sets the value of the flag f_task_over_mode for determining the processing amount overflow to true (step S225).

(Processing Amount Overflow Determination Process Flow (2))

Figure 42:
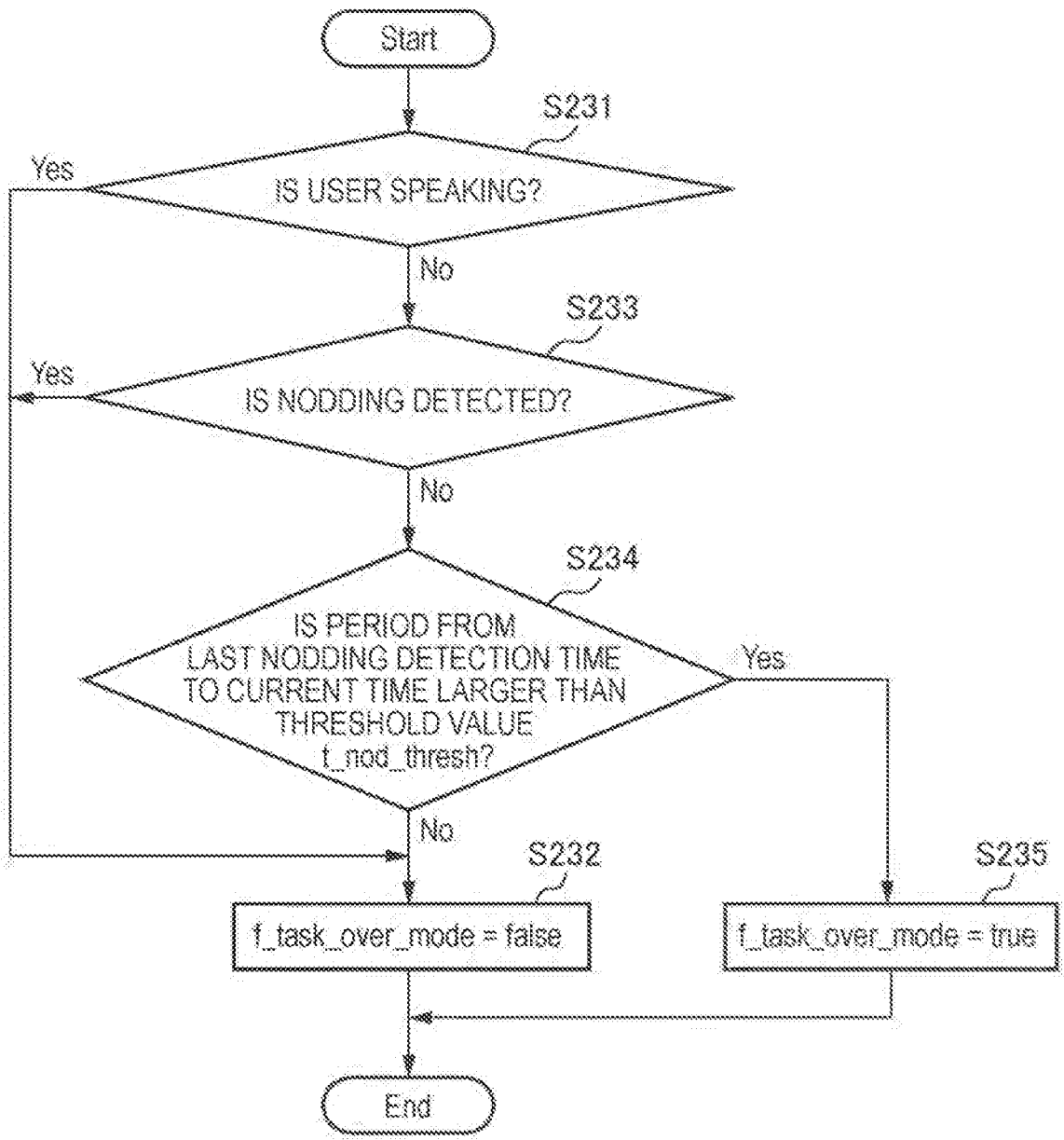
FIG. 42 is a flowchart illustrating an operation example of a communication system 1 according to the embodiment.

A second example of the processing amount overflow determination process flow will be described. FIG. 42 is a flowchart illustrating an operation example of the communication system 1 according to the embodiment of the present disclosure. FIG. 42 illustrates a detailed flow of the processing amount overflow determination process in step S212 of FIG. 39B. Further, the information processing device 200 is assumed to execute the processing amount overflow determination process flow to be described below on the basis of the information acquired by the signage terminal 100 or the like, but the processing amount overflow determination process flow may be performed by any device included in the communication system 1.

In a case in which the processing amount overflow determination process is executed, the communication system 1 first determines whether or not the user is speaking (step S231).

In a case in which the user is speaking as a result of the determination in step S231 (Yes in step S231), the communication system 1 then sets the value of the flag f_task_over_mode for determining the processing amount overflow to false (step S232).

On the other hand, in a case in which the user is not speaking as a result of the determination in step S231 (No in step S231), the communication system 1 then determines whether or not nodding of the user is detected (step S233).

If the nodding of a user is not detected as a result of the determination in step S233 (No in step S233), the communication system 1 then determines whether or not a period from the last nodding detection time to the current time is larger than the threshold value t_nod_thresh (step S234).

If the period from the last nodding detection time to the current time is not larger than the threshold value t_nod_thresh as a result of the determination in step S234 (No in step S234), the communication system 1 then sets the value of the flag f_task_over_mode for determining the processing amount overflow to false (step S232).

Further, if the nodding of a user is detected as a result of the determination in step S233 (Yes in step S233), the communication system 1 then sets the value of the flag f_task_over_mode for determining the processing amount overflow to false (step S232).

On the other hand, if the period from the last nodding detection time to the current time is larger than the threshold value t_nod_thresh as a result of the determination in step S234 (Yes in step S234), the communication system 1 then sets the value of the flag f_task_over_mode for determining the processing amount overflow to true (step S235).

(Processing Amount Overflow Determination Process Flow (3))

Figure 43:
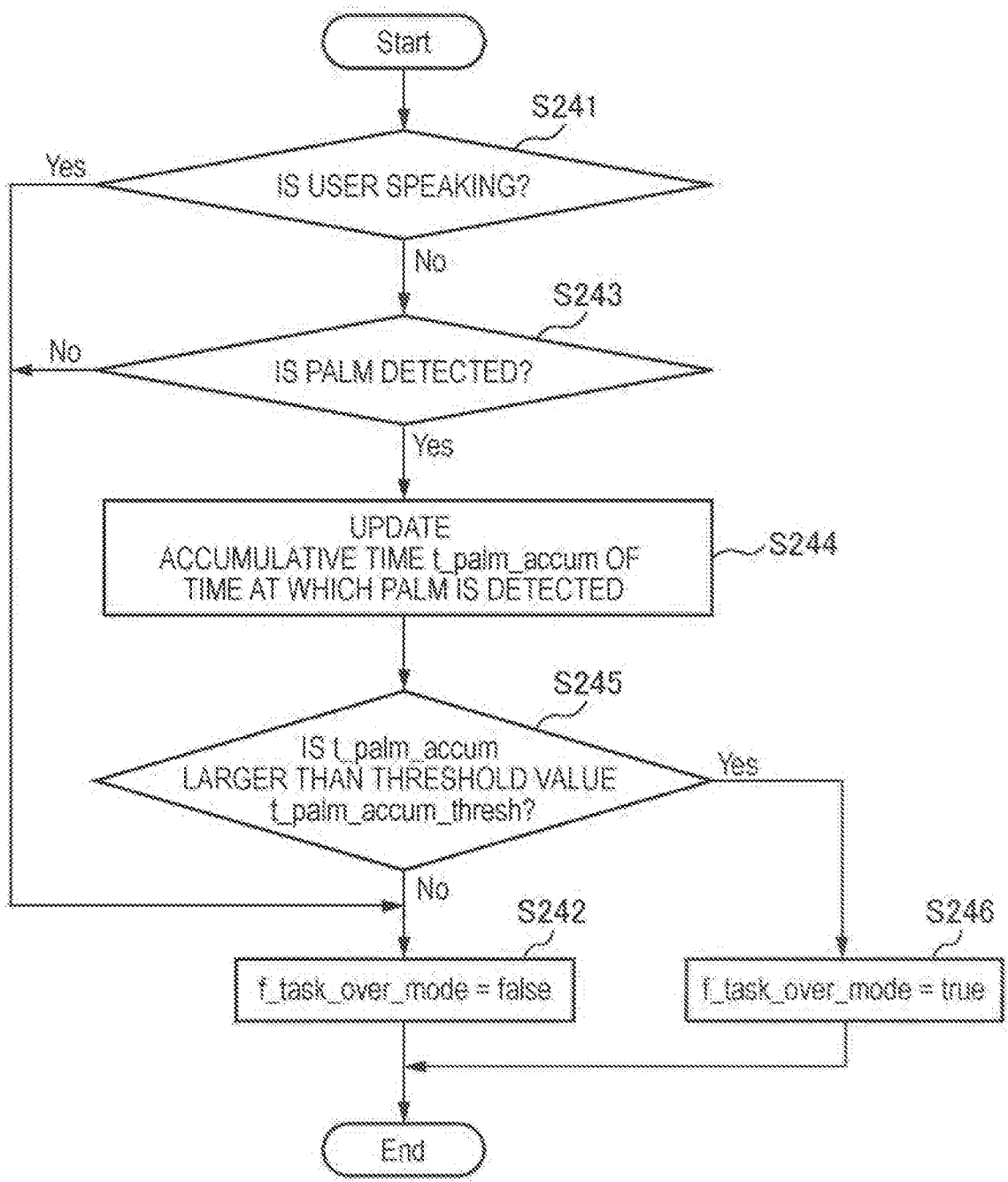
FIG. 43 is a flowchart illustrating an operation example of a communication system 1 according to the embodiment.

A third example of the processing amount overflow determination process flow will be described. FIG. 43 is a flowchart illustrating an operation example of the communication system 1 according to the embodiment of the present disclosure. FIG. 43 illustrates a detailed flow of the processing amount overflow determination process in step S212 of FIG. 39B. Further, the information processing device 200 is assumed to execute the processing amount overflow determination process flow to be described below on the basis of the information acquired by the signage terminal 100 or the like, but the processing amount overflow determination process flow may be performed by any device included in the communication system 1.

In a case in which the processing amount overflow determination process is executed, the communication system 1 first determines whether or not the user is speaking (step S241).

In a case in which the user is speaking as a result of the determination in step S241 (Yes in step S241), the communication system 1 then sets the value of the flag f_task_over_mode for determining the processing amount overflow to false (step S242).

On the other hand, in a case in which the user is not speaking as a result of the determination in step S241 (No in step S241), the communication system 1 then determines whether or not a palm of the user is detected (step S243).

If the palm of the user is detected as a result of the determination in step S243 (Yes in step S243), the communication system 1 then updates an accumulative time t_palm_accum of the time at which the palm of the user is detected (step S244). If the accumulative time t_palm_accum of the time at which the palm of the user is detected is updated, the communication system 1 then determines whether or not the accumulative time t_palm_accum of the time at which the palm of the user is detected is larger than a threshold value t_palm_accum_thresh (step S245).

If the accumulative time t_palm_accum of the time at which the palm of the user is detected is larger than a threshold value t_palm_accum_thresh as a result of the determination of step S245 (No in step S245), the communication system 1 then sets the value of the flag f_task_over_mode for determining the processing amount overflow to false (step S242).

Further, if a palm of a user is not detected as a result of the determination in step S243 (Yes in step S243), the communication system 1 then sets the value of the flag f_task_over_mode for determining the processing amount overflow to false (step S242).

On the other hand, if the accumulative time t_palm_accum of the time at which the palm of the user is detected is larger than a threshold value t_palm_accum_thresh as a result of the determination of step S245 (Yes in step S245), the communication system 1 then sets the value of the flag f_task_over_mode for determining the processing amount overflow to true (step S246).

(Processing Amount Overflow Determination Process Flow (4))

Figure 44:
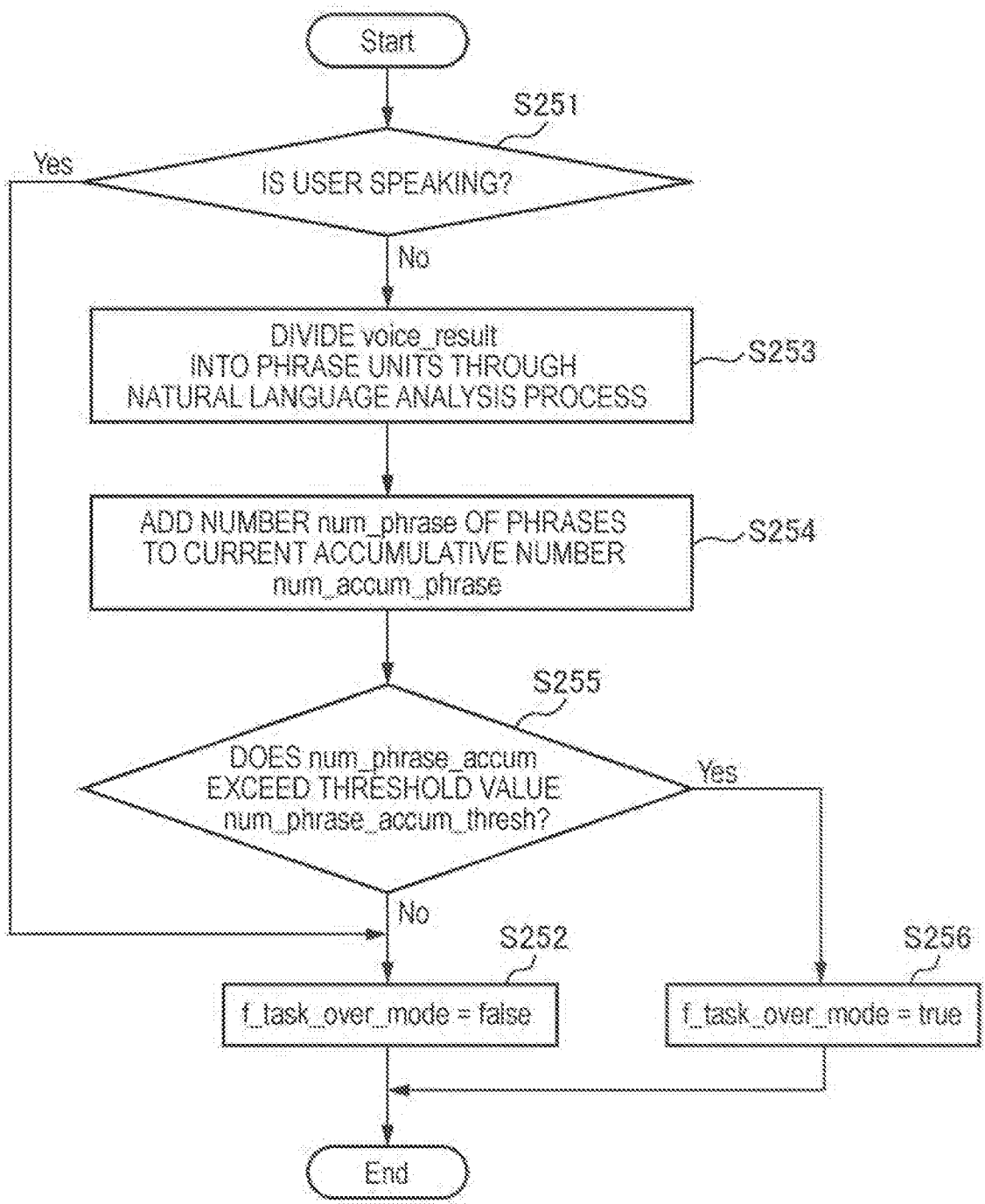
FIG. 44 is a flowchart illustrating an operation example of a communication system 1 according to the embodiment.

A fourth example of the processing amount overflow determination process flow will be described. FIG. 44 is a flowchart illustrating an operation example of the communication system 1 according to the embodiment of the present disclosure. FIG. 44 illustrates a detailed flow of the processing amount overflow determination process in step S212 of FIG. 39B. Further, the information processing device 200 is assumed to execute the processing amount overflow determination process flow to be described below on the basis of the information acquired by the signage terminal 100 or the like, but the processing amount overflow determination process flow may be performed by any device included in the communication system 1.

In a case in which the processing amount overflow determination process is executed, the communication system 1 first determines whether or not the user is speaking (step S251).

In a case in which the user is speaking as a result of the determination in step S251 (Yes in step S251), the communication system 1 then sets the value of the flag f_task_over_mode for determining the processing amount overflow to false (step S252).

On the other hand, in a case in which the user is not speaking as a result of the determination in step S251 (No in step S251), the communication system 1 then divides the voice recognition result voice_result into phrase units through a natural language analysis process (step S253).

If the voice recognition result voice_result is divided into phrase units through the natural language analysis process, the communication system 1 adds the number num_phrase of phrases of the voice recognition result voice_result to the current accumulative number num_accum_phrase (step S254).

If the number num_phrase of phrases of the voice recognition result voice_result is added to the current accumulative number num_accum_phrase, the communication system 1 then determines whether or not the added accumulative number num_phrase_accum exceeds a threshold value num_phrase_accum_thresh (step S255).

If the added accumulative number num_phrase_accum does not exceed a threshold value num_phrase_accum_thresh as a result of the determination in step S255 (No in step S255), the communication system 1 then sets the value of the flag f_task_over_mode for determining the processing amount overflow to false (step S252).

On the other hand, if the added accumulative number num_phrase_accum exceeds a threshold value num_phrase_accum_thresh as a result of the determination in step S255 (Yes in step S255), the communication system 1 then sets the value of the flag f_task_over_mode for determining the processing amount overflow to true (step S256).

The detailed flow of the processing amount overflow determination process has been described above. Further, five examples of the processing amount overflow determination process flows have been described above, but the communication system 1 may select one of the five flows and execute the processing amount overflow determination process or may select two or more flows and execute the processing amount overflow determination process flow. In a case in which two or more flows are selected, the results of the flows may be different. Therefore, in a case in which two or more flows are selected, the communication system 1 may select an odd number of flows and employ a flow in which a result of setting the value of the flag f_task_over_mode is larger. Next, a detailed flow of the processing amount overflow presentation process in step S213 of FIG. 39B will be described.

(Processing Amount Overflow Presentation Process Flow)

Figure 45:
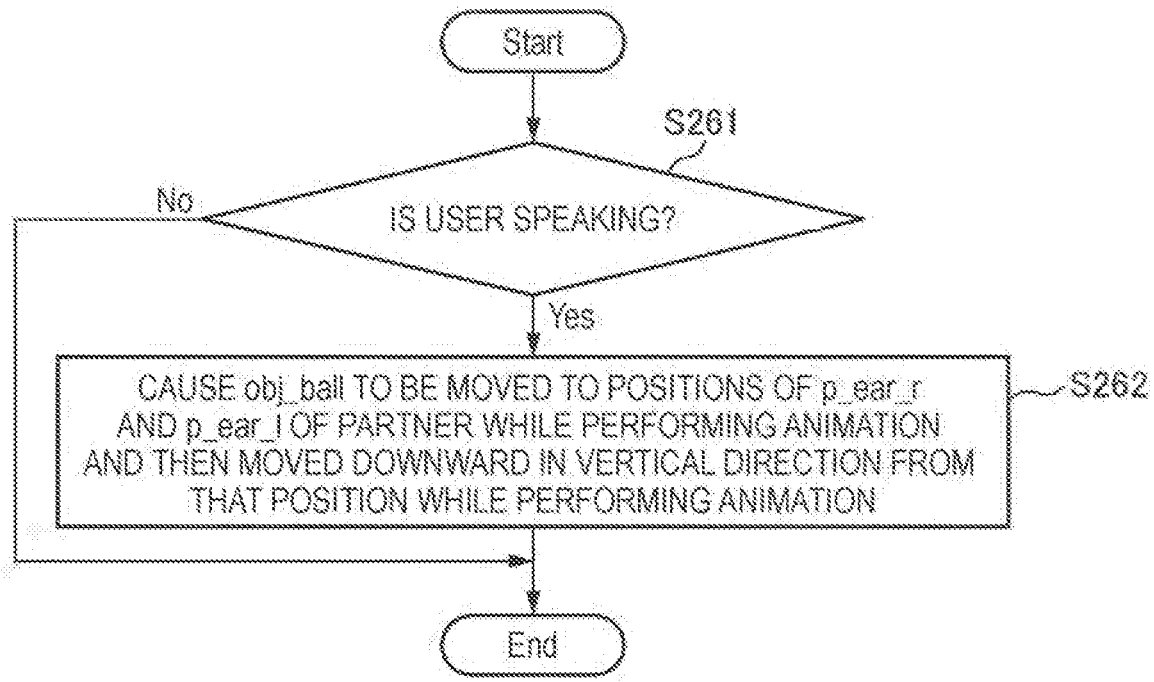
FIG. 45 is a flowchart illustrating an operation example of a communication system 1 according to the embodiment.

FIG. 45 is a flowchart illustrating an operation example of the communication system 1 according to the embodiment of the present disclosure. FIG. 45 illustrates a detailed flow of the processing amount overflow presentation process in step S213 of FIG. 39B. Further, the information processing device 200 is assumed to execute the processing amount overflow presentation process flow to be described below on the basis of the information acquired by the signage terminal 100 or the like, but the processing amount overflow presentation process flow may be performed by any device included in the communication system 1.

In a case in which the processing amount overflow presentation process is executed, the communication system 1 first determines whether or not the user is speaking (step S261).

If the user is speaking as a result of the determination in step S261 (Yes in step S261), the communication system 1 causes the ball object obj_ball having a radius corresponding to the size of the volume of the speech of the user to be displayed on the signage terminal 100 so that the ball object obj_ball moves toward the position of the right ear position p_ear_r and the position of the left ear position p_ear_l of the partner while performing animation and then moves downwards in the vertical direction from the position while performing animation (step S262).

On the other hand, if the user is not speaking as a result of the determination in step S261 (No in step S261), the communication system 1 ends the processing amount overflow presentation process without change.

The detailed flow of processing amount overflow presentation process has been described above. Next, a detailed flow of the voice recognition result display process will be described.

(Voice Recognition Result Display Process Flow)

Figure 46:
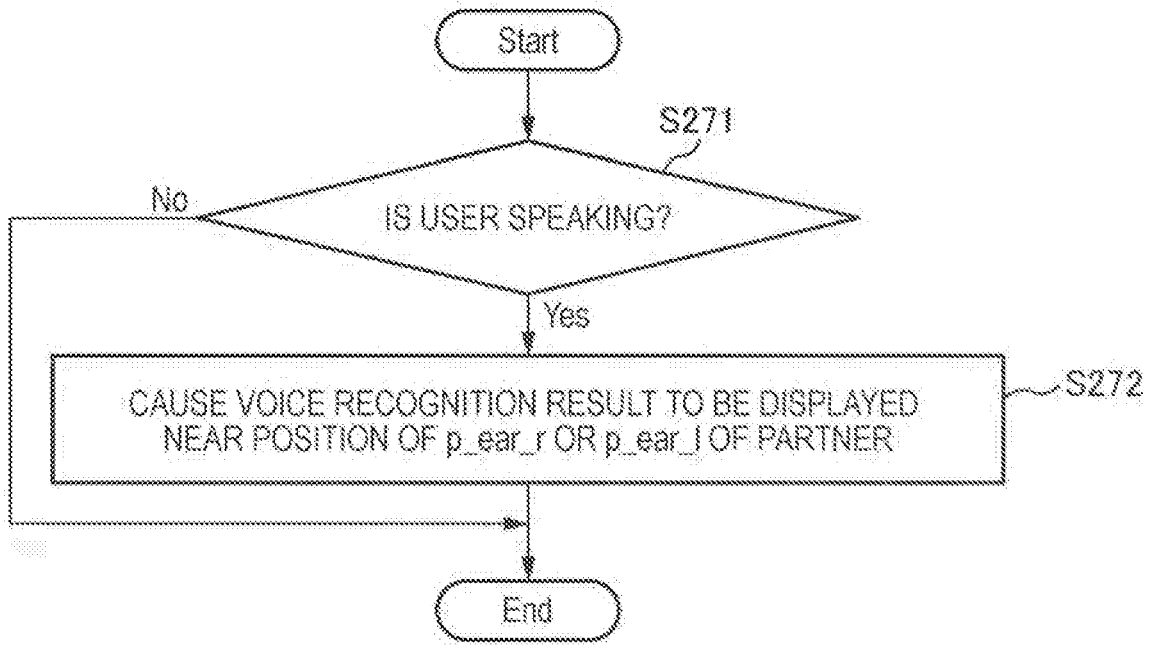
FIG. 46 is a flowchart illustrating an operation example of a communication system 1 according to the embodiment.

FIG. 46 is a flowchart illustrating an operation example of the communication system 1 according to the embodiment of the present disclosure. FIG. 46 illustrates a detailed flow of the voice recognition result display process in step S206 of FIG. 39A. Further, the information processing device 200 is assumed to execute the voice recognition result display process flow to be described below on the basis of the information acquired by the signage terminal 100 or the like, but the voice recognition result display process flow may be performed by any device included in the communication system 1.

In a case in which the voice recognition result display process is executed, the communication system 1 first determines whether or not the user is speaking (step S271).

In a case in which the user is speaking as a result of the determination of step S271 (Yes in step S271), the communication system 1 causes the voice recognition result to be displayed near the right ear position p_ear_r or the left ear position p_ear_l of the partner in the signage terminal 100 (step S272).

On the other hand, in a case in which the user is not speaking as a result of the determination in step S271 (No in step S271), the communication system 1 ends the voice recognition result display process without change.

The detailed flow of the voice recognition result display process has been described above. Then, a detailed flow of the translation result display process will be described.

(Translation Result Display Process Flow)

Figure 47:
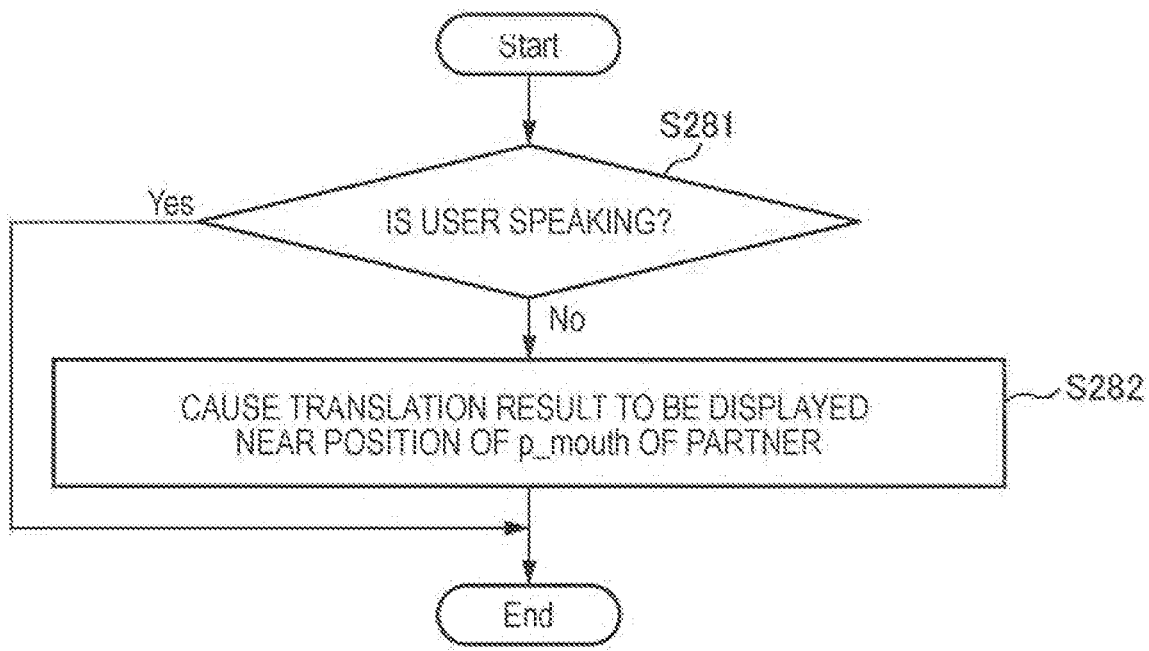
FIG. 47 is a flowchart illustrating an operation example of a communication system 1 according to the embodiment.

FIG. 47 is a flowchart illustrating an operation example of the communication system 1 according to the embodiment of the present disclosure. FIG. 47 illustrates a detailed flow of the translation result display process in step S211 of FIG. 39B. Further, the information processing device 200 is assumed to execute the translation result display process flow to be described below on the basis of the information acquired by the signage terminal 100 or the like, but the translation result display process flow may be performed by any device included in the communication system 1.

In a case in which the translation result display process is executed, the communication system 1 first determines whether or not the user is speaking (step S281).

In a case in which the user is not speaking as a result of the determination in step S281 (No in step S281), the communication system 1 causes the translation result to be displayed near the mouth position information p_mouth of the partner in the signage terminal 100 (step S282).

On the other hand, in a case in which the user is speaking as a result of the determination in step S281 (Yes in step S281), the communication system 1 ends the translation result display process without change.

The detailed flow of the translation result display process has been described above. Next, a detailed flow of the translation mode continuation determination process in step S160 in FIG. 36B will be described.

(Translation Mode Continuation Determination Process Flow (1))

Figure 48:
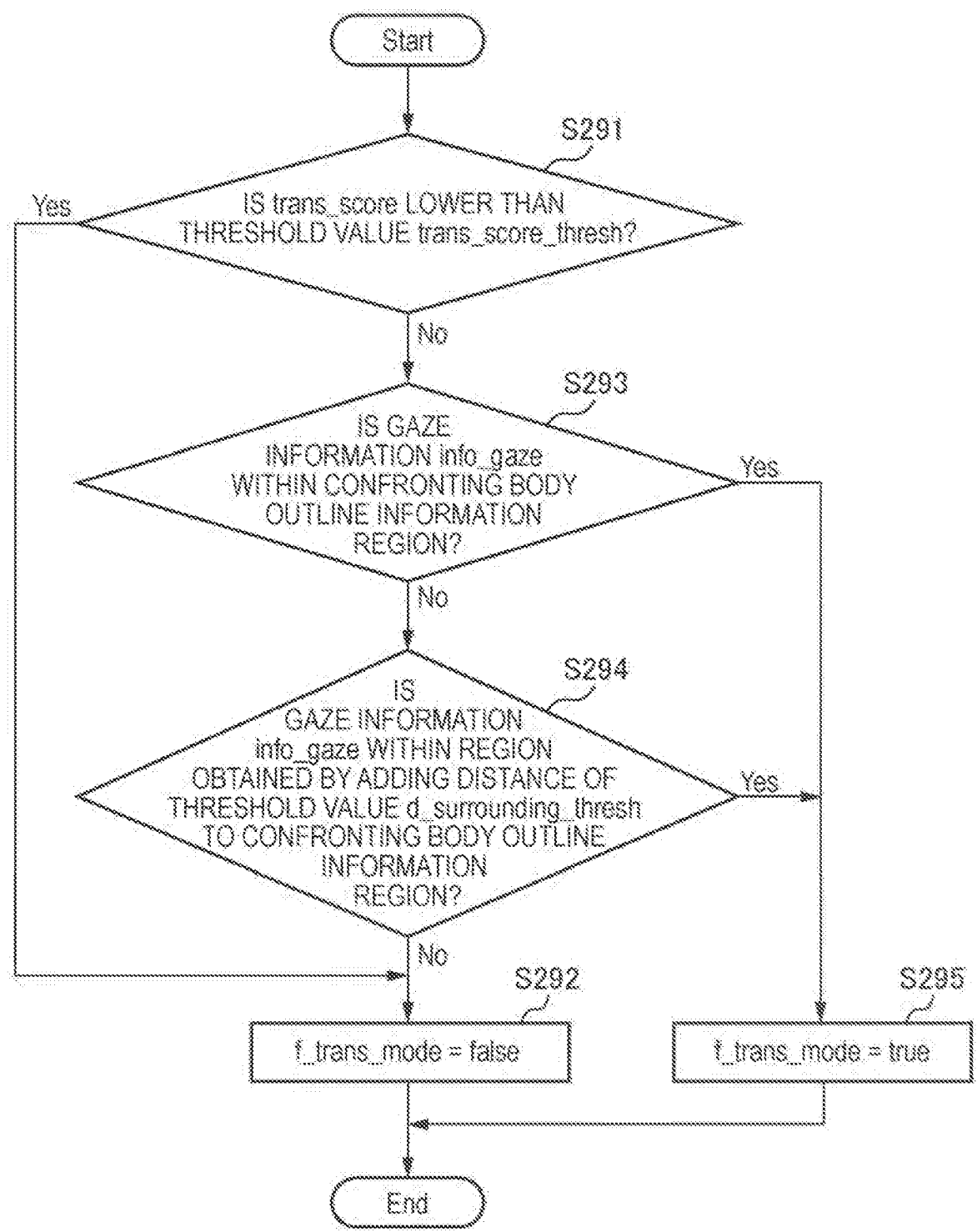
FIG. 48 is a flowchart illustrating an operation example of a communication system 1 according to the embodiment.

FIG. 48 is a flowchart illustrating an operation example of the communication system 1 according to the embodiment of the present disclosure. FIG. 48 illustrates a detailed flow of the translation mode continuation determination process in step S160 of FIG. 36B. Further, the translation mode continuation determination process flow to be described below is assumed to be executed by the information processing device 200 on the basis of the information acquired by the signage terminal 100 or the like, but the translation mode continuation determination process flow may be performed by any device included in the communication system 1.

In a case in which the translation mode continuation determination process flow is executed, the communication system 1 first determines whether or not the translation score trans_score is lower than a threshold value trans_score_thresh (step S291).

If the translation score trans_score is lower than the threshold value trans_score_thresh as a result of the determination in step S291 (Yes in step S291), the communication system 1 sets the value of the flag f_trans_mode indicating whether or not it is the translation mode to false, and ends the translation mode continuation determination Process flow (step S292).

On the other hand, if the translation score trans_score is not lower than the threshold value trans_score_thresh as a result of the determination in step S291 (No in step S291), the communication system 1 then determines that the gaze information info_gaze of the user is within the confronting body outline information region of the partner (step S293).

If the gaze information info_gaze of the user is not within the confronting body outline information region of the partner as a result of the determination in the step S293 (No in the step S293), the communication system 1 then determines whether or not the gaze information info_gaze of the user is within the region obtained by adding the distance of the threshold value d_surrounding_thresh to the confronting body outline information region of the partner (step S294).

If the gaze information info_gaze of the user is not within the region obtained by adding the distance of the threshold value d_surrounding_thresh to the confronting body outline information region of the partner as a result of the determination in step S294 (No in step S294), the communication system 1 sets the value of the flag f_trans_mode indicating whether or not it is the translation mode to false, and ends the translation mode continuation determination process flow (step S292).

On the other hand, if the gaze information info_gaze of the user is within the confronting body outline information region of the partner as a result of the determination in step S293 (Yes in step S293) or if the gaze information info_gaze of the user is within the region obtained by adding the distance of the threshold value d_surrounding_thresh to the confronting body outline information region of the partner as a result of the determination in step S294 (Yes in step S294), the communication system 1 sets the value of the flag f_trans_mode indicating whether or not it is the translation mode to true, and ends the translation mode continuation determination process flow (step S295).

(Translation Mode Continuation Determination Process Flow (2))

Figure 49:
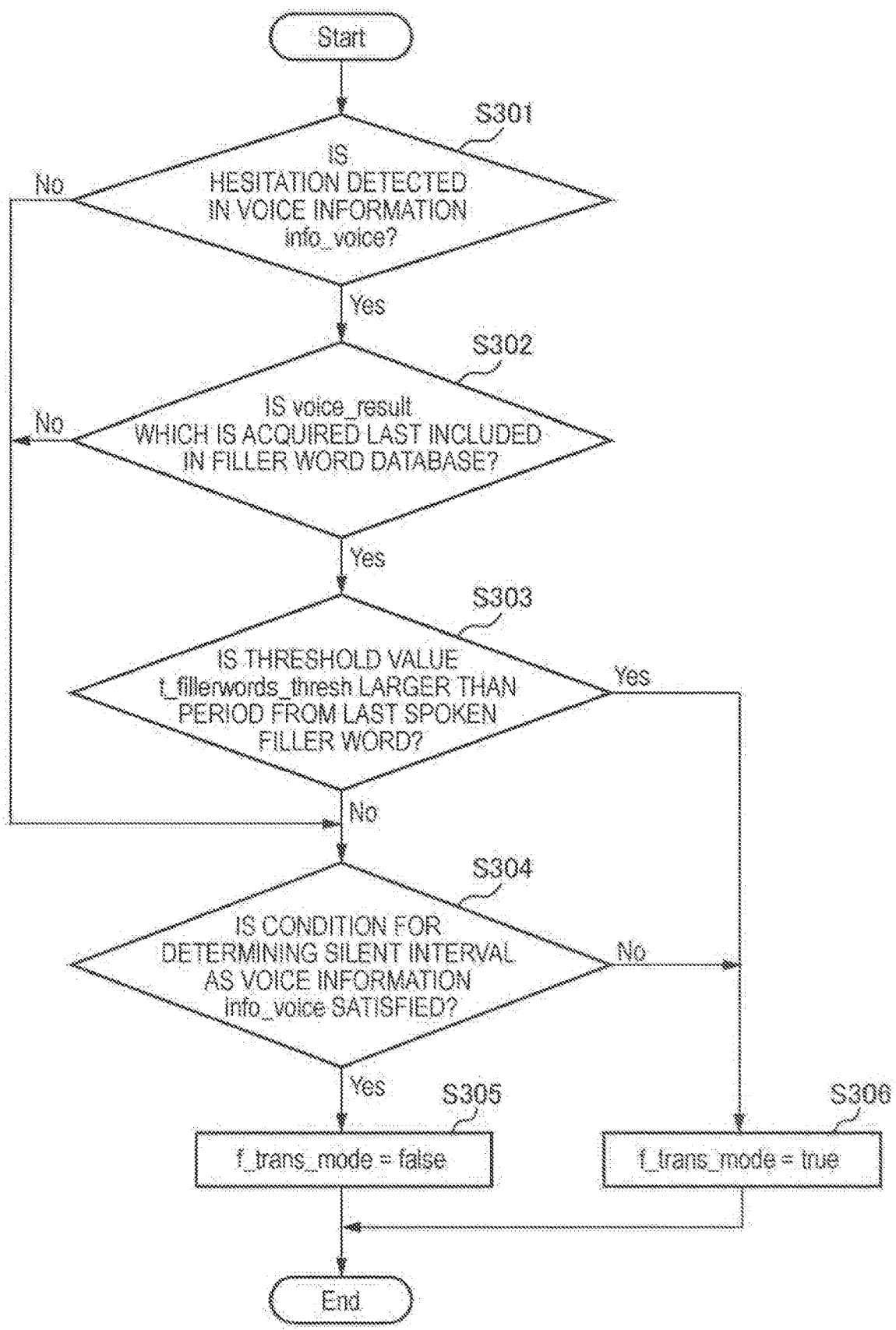
FIG. 49 is a flowchart illustrating an operation example of a communication system 1 according to the embodiment.

A second example of the translation mode continuation determination process flow will be described. FIG. 49 is a flowchart illustrating an operation example of the communication system 1 according to the embodiment of the present disclosure. FIG. 49 illustrates a detailed flow of the translation mode continuation determination process in step S160 of FIG. 36B. Further, the translation mode continuation determination process flow to be described below is assumed to be executed by the information processing device 200 on the basis of the information acquired by the signage terminal 100 or the like, but the translation mode continuation determination process flow may be performed by any device included in the communication system 1.

In a case in which the translation mode continuation determination process flow is executed, the communication system 1 first determines whether or not a hesitation of the user is detected in the voice information info_voice obtained by the speech of the user (step S301).

If a hesitation of the user is detected in the voice information info_voice obtained by the speech of the user as a result of the determination in step S301 (Yes in step S301), the communication system 1 then determines whether or not the voice recognition result voice_result of the user which is acquired last is included in the filler word database (step S302).

Table 1 is a table showing an example of content of filler word database. The communication system 1 may perform determination of whether or not the voice recognition result voice_result of the user coincides with a similar pronunciation filler word group in addition to determination of whether or not the voice recognition result voice_result of the user coincides with a filler word group included in the filler word database.

TABLE 1

(example of filler word database)

| Filler word group | Similar sound filler word group |
|---|---|
| ano | anou, anoo, ano, |
| etto | eeto, eto, etto, eto, |
| um | Uh, huh, |
| You know | Know, you non |

If the voice recognition result voice_result of the user is included in the filler word database as a result of the determination in step S302 (Yes in step S302), the communication system 1 then determines whether or not a period from the last spoken filler word does not exceed a threshold value t_fillerwords_thresh (step S303).

If a hesitation of the user is detected in the voice information info_voice as a result of the determination in step S301 (No in step S301), if the voice recognition result voice_result of the user is included in the filler word database as a result of the determination in step S302 (No step S302), or if the period from the last spoken filler word exceeds the threshold value t_fillerwords_thresh as a result of the determination in the above step S303 (No in step S303), the communication system 1 determines whether or not the condition for determining the silent interval as the voice information info_voice is satisfied (step S304). As the condition for determining the silent interval, for example, it may be determined whether or not intervals with a very small volume are consecutive.

If the condition for determining the silent interval as the voice information info_voice is satisfied as a result of the determination in step S304 (Yes in step S304), the communication system 1 sets the value of the flag f_trans_mode indicating whether or not it is the translation mode to false, and ends the translation mode continuation determination process flow (step S305).

On the other hand, if the period from the last spoken filler word does not exceed the threshold value t_fillerwords_thresh as a result of the determination in step S303 (Yes in step S303) or if the condition for determining the silent interval as the voice information info_voice is not satisfied as a result of the determination in step S304 (No in step S304), the communication system 1 sets the value of the flag f_trans_mode indicating whether or not it is the translation mode to true and ends the translation mode continuation determination process flow (step S306).

(Translation Mode Continuation Determination Process Flow (3))

Figure 50:
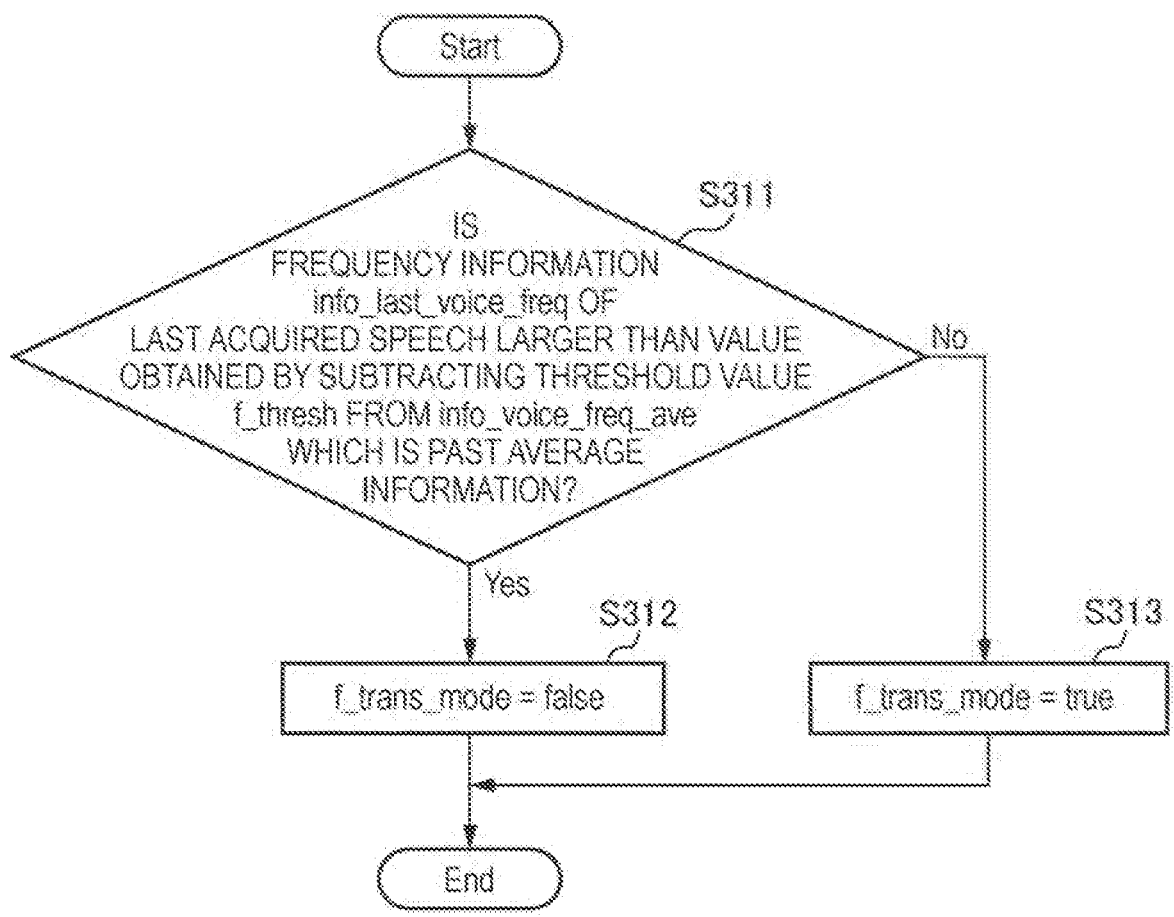
FIG. 50 is a flowchart illustrating an operation example of a communication system 1 according to the embodiment.

A third example of the translation mode continuation determination process flow will be described. FIG. 50 is a flowchart illustrating an operation example of the communication system 1 according to the embodiment of the present disclosure. FIG. 50 illustrates a detailed flow of the translation mode continuation determination process in step S160 of FIG. 36B. Further, the translation mode continuation determination process flow to be described below is assumed to be executed by the information processing device 200 on the basis of the information acquired by the signage terminal 100 or the like, but the translation mode continuation determination process flow may be performed by any device included in the communication system 1.

In a case in which the translation mode continuation determination process flow is executed, first the communication system 1 determines whether or not the frequency information info_last_voice_freq of the last acquired speech is larger than a value obtained by subtracting the threshold value f_thresh from info_voice_freq_ave which is the past average information (step S311).

If the frequency information info_last_voice_freq of the last acquired speech is larger than a value obtained by subtracting the threshold value f_thresh from info_voice_freq_ave which is the past average information as a result of the determination in step S311 (Yes in step S311), the communication system 1 sets the value of the flag f_trans_mode indicating whether or not it is the translation mode to false, and ends the translation mode continuation determination process flow (step S312).

On the other hand, if the frequency information info_last_voice_freq of the last acquired speech is not larger than a value obtained by subtracting the threshold value f_thresh from info_voice_freq_ave which is the past average information as a result of the determination in step S311 (No in step S311), the communication system 1 sets the value of the flag f_trans_mode indicating whether or not it is the translation mode to true, and ends the translation mode continuation determination process flow (step S313).

Figure 51:
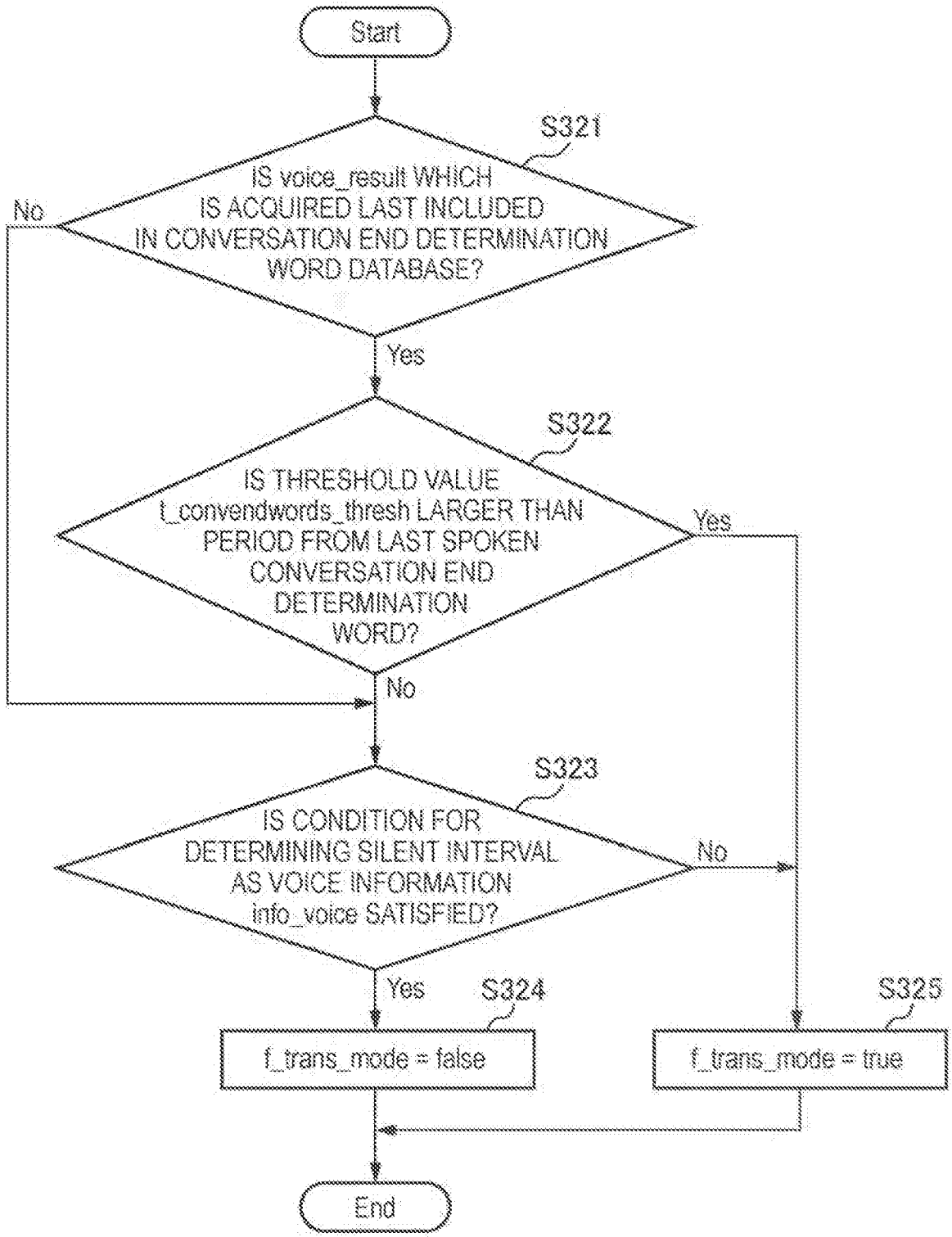
FIG. 51 is a flowchart illustrating an operation example of a communication system 1 according to the embodiment.

(Translation mode continuation determination process flow (4)) A fourth example of the translation mode continuation determination process flow will be described. FIG. 51 is a flowchart illustrating an operation example of the communication system 1 according to the embodiment of the present disclosure. FIG. 51 illustrates a detailed flow of the translation mode continuation determination process in step S160 of FIG. 36B. Further, the translation mode continuation determination process flow to be described below is assumed to be executed by the information processing device 200 on the basis of the information acquired by the signage terminal 100 or the like, but the translation mode continuation determination process flow may be performed by any device included in the communication system 1.

In a case in which the translation mode continuation determination process flow is executed, the communication system 1 first determines whether or not the voice recognition result voice_result of the user which is acquired last is included in the conversation end determination word database (step S321).

Table 2 is a table illustrating an example of content of the conversation end determination word database. The communication system 1 may perform determination of whether or not the voice recognition result voice_result of the user coincides with a similar pronunciation conversation end determination word group in addition to determination of whether or not the voice recognition result voice_result of the user coincides with the conversation end determination word group included in the conversation end determination word database.

TABLE 2

(example of conversation end determination word database)

| Conversation end determination word group | Similar pronunciation conversation end determination word group |
|---|---|
| doudesuka | doudesu, dou, soudesuka |
| koredeyoroshiidesuka | koredeyoi, koredeyoroshii, |
| What do you think of that | What do you think, how do you think |
| Don't you think so | Do you think, do you think so |

If the voice recognition result voice_result of the user which is acquired last is included in the conversation end determination word database as a result of the determination in step S321 (Yes in step S321), the communication system 1 then determines whether or not a period from the last spoken conversation end determination word does not exceed the threshold value t_convendwords_thresh (step S322).

If the voice recognition result voice_result of the user which is acquired last is not included in the conversation end determination word database as a result of the determination in step S321 (No in step S321) or if the period from the last spoken conversation end determination word exceeds the threshold value t_convendwords_thresh as a result of the determination in step S322 (No in step S322), the communication system 1 determines whether or not the condition for determining the silent interval as the voice information info_voice is satisfied (step S323). As a condition for determining silent interval, for example, it may be determined whether or not intervals with a very small volume are consecutive.

If the condition for determining the silent interval as the voice information info_voice is satisfied as a result of the determination in step S323 (Yes in step S323), the communication system 1 sets the value of the flag f_trans_mode indicating whether or not it is the translation mode to false, and ends the translation mode continuation determination process flow (step S324).

On the other hand, if the period from the last spoken conversation end determination word does not exceed the threshold value convendwords_thresh as a result of the determination in step S322 (Yes in step S322) or if the condition for determining the silent interval as the voice information info_voice is not satisfied as a result of the determination in step S323 (No in step S323), the communication system 1 sets the value of the flag f_trans_mode indicating whether or not it is the translation mode to true and ends the translation mode continuation determination process flow (step S324).

(Translation Mode Continuation Determination Process Flow (5))

A fifth example of the translation mode continuation determination process flow will be described. FIG. 52 is a flowchart illustrating an operation example of the communication system 1 according to the embodiment of the present disclosure. FIG. 52 illustrates a detailed flow of the translation mode continuation determination process in step S160 of FIG. 36B. Further, the translation mode continuation determination process flow to be described below is assumed to be executed by the information processing device 200 on the basis of the information acquired by the signage terminal 100 or the like, but the translation mode continuation determination process flow may be performed by any device included in the communication system 1.

In a case in which the translation mode continuation determination process flow is executed, the communication system 1 first determines whether or not a translation mode release button displayed on the screen is pressed (step S331).

If the translation mode release button is pressed as a result of the determination in step S331 (Yes in step S331), the communication system 1 sets the value of the flag f_trans_mode indicating whether or not it is the translation mode to false and ends the translation mode continuation determination process flow (step S332).

On the other hand, if the translation mode release button is not pressed as a result of the determination in step S331 (No in step S331), the communication system 1 sets the value of the flag f_trans_mode indicating whether or not it is the translation mode to true and ends the translation mode continuation determination process flow (step S333).

The detailed flow of the translation mode continuation determination process has been described above. Further, five examples of the translation mode continuation determination process flows have been described above, but the communication system 1 may select one of the five flows and execute the translation mode continuation determination process or may select two or more flows and execute the translation mode continuation determination process flow. In a case in which two or more flows are selected, the results of the flows may be different. Therefore, in a case in which two or more flows are selected, the communication system 1 may select an odd number of flows and employ a flow in which a result of setting the value of the flag f_trans_mode is larger.

The communication system 1 according to the embodiment of the present disclosure executes the operation described above and thus enables natural communication to be performed on the situation of the speaker or the interlocutor when people communicate facing each other through the signage terminal or the like.

2. CONCLUSION

According to the embodiment of the present disclosure, the communication system 1 that enables people to communicate with each other while translating through the signage terminal 100 and prevents translation from being stopped due to only the reason that the speech ceases although the speech ceases as described above is provided.

The communication system 1 according to the embodiment of the present disclosure can prevent translation from being stopped due to only the reason that the speech ceases, and thus even in a case in which the speaker side is unable to recollect the speech content, only a target which is desired to be translated is conveyed to the translation partner, and thus it is possible to prevent the partner from interrupting the speech.

Further, according to the embodiment of the present disclosure, the communication system 1 that enables people to communicate with each other while translating through the signage terminal 100 and gives a notification indicating that the processing amount of the listener side is overflowing to the speaker side using the signage terminal 100 while the speaker side is speaking is provided.

Since the communication system 1 according to the embodiment of the present disclosure gives a notification indicating that the processing amount of the listener side is overflowing to the speaker side using the signage terminal 100 while the speaker side is speaking, it is possible to covey the image of the information processing amount on the listener side to the speaker side without interrupting the speech of the speaker.

In other words, the communication system 1 according to the embodiment of the present disclosure prevents his/her own speech from being interrupted by the partner or conveying the speaker side that the processing amount of the listener side is overflowing, and thus it is possible to cause smooth communication to be performed by the speaker side and the listener side.

Further, in the above embodiment, the example of the communication system 1 using the signage terminal 100 has been described, but the present disclosure is not limited to this example. The present disclosure can also be applied to systems in which people who are not on the spot communicate via a display, a speaker, or a microphone such as a videophone system, a video conference system, and a virtual conversation support system using augmented reality (AR).

In the video conference system, an unnatural situation occurs if conference participants face the microphone instead of the camera during the conference. For this reason, in the video conference system to which the present disclosure is applied, in a case in which conference participants face the microphone, it is replaced with a previously generated image in which the conference participants are confronting, and the previously generated image may be presented on the display of the partner as described above. When it is replaced with the previously generated image in which the conference participants are confronting, and the previously generated image is presented on the display of the partner as described above, the video conference system to which the present disclosure is applied can prevent the unnatural situation.

Further, in a case in which the present disclosure is applied to the video conference system, for example, the speech content of the speaker may be recorded as a log, and the log may be used for translation. In the conference, phrases such as "that" and "before" are often spoken, but in the video conference system to which the present disclosure is applied, such phrases such as "that" and "before" may be replaced with specific nouns and translated, and the translation may be presented to the partner.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Further, it is also possible to create a program which is executed by a single computer or a computer system in which a plurality of computers perform a series of processes for causing hardware such as a CPU, a ROM, and a RAM installed in respective devices to perform functions equivalent to those of the components of the respective devices described above. Further, it is possible to provide a storage medium having the computer program stored therein. Further, it is possible to implement a series of processes by hardware or a hardware circuit by constituting each functional block illustrated in the functional block diagram with hardware or a hardware circuit.

Further, a part or all of the individual functional blocks illustrated in the functional block diagrams used in the above description may be realized by a server device connected via a network such as the Internet. Furthermore, the configuration of the individual functional blocks illustrated in the functional block diagrams used in the above description may be realized by a single device, or may be realized by a system with cooperation of a plurality of devices. The system with the cooperation of a plurality of devices can include, e.g., combination of a plurality of service devices, combination of the server device and a terminal device, or the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control device including:

a control unit configured to execute a process of causing a speaker to stop speaking on a device toward which the speaker speaks on a basis of a result obtained by analyzing speech content based on a result of the speaker speaking toward the device.

(2)

The control device according to (1), in which the control unit determines a situation of a listener who is listening to the speech content of the speaker and executes the process.

(3)

The control device according to (2), in which the control unit executes the process on a basis of an occurrence situation of nodding of the listener.

(4)

The control device according to (2), in which the control unit executes the process on a basis of a situation of gaze of the listener that faces the speaker.

(5)

The control device according to (2), in which the control unit executes the process on a basis of detection of a gesture performed by the listener to cause the speaker to stop speaking.

(6)

The control device according to any of (1) to (5), in which the control unit determines whether or not the process is executed in accordance with a number of words or a number of parts of speech included in the speech content.

(7)

The control device according to any of (1) to (6), in which the control unit determines whether or not the process is executed in accordance with a degree of difficulty of the speech content.

(8)

The control device according to any of (1) to (7), in which the device includes display devices which are installed on the speaker side and the listener side, and the control unit outputs information for causing the speaker to stop speaking to the display device on the speaker side.

(9)

The control device according to (8), in which the control unit causes an effect in which the speech content does not enter an ear of the listener to be displayed on the display device on the speaker side.

(10)

The control device according to (8), in which the control unit stops display of a recognition result of the speech content displayed on the display device of the speaker side.

(11)

The control device according to (8), in which the control unit causes the device to output a sound canceling the speech of the speaker.

(12)

The control device according to any of (1) to (7), in which the device includes display devices which are installed on the speaker side and the listener side, and the control unit outputs information for causing the speaker to stop speaking to the display device on the listener side.

(13)

The control device according to (12), in which the control unit outputs information for causing a posture of the listener to collapse (14)

A control method including:

executing a process of causing a speaker to stop speaking on a device toward which the speaker speaks on a basis of a result obtained by analyzing speech content based on a result of the speaker speaking toward the device.

(15)

A computer program causing a computer to execute a process of causing a speaker to stop speaking on a device toward which the speaker speaks on a basis of a result obtained by analyzing speech content based on a result of the speaker speaking toward the device.

REFERENCE SIGNS LIST 1 communication system
100 signage terminal

What is claimed is:

1. A control device, comprising:
a control unit configured to:
   determine a processing overflow state of a listener based on an analysis of speech content associated with a speaker; and
   output information to the speaker based on the determination of the processing overflow state of the listener, wherein
   the speaker is in a speaking state, and
   the output information indicates, to the speaker in the speaking state, that the listener is in the processing overflow state.

2. The control device according to claim 1, wherein
the output information comprises an animated object in motion, and
the animated object is different from the listener and the speaker.

3. The control device according to claim 1, wherein
the control unit is further configured to determine a situation of the listener.

4. The control device according to claim 3, wherein
the control unit is further configured to output the information to the speaker based on a nodding action of the listener.

5. The control device according to claim 1, wherein
the control unit is further configured to output the information to the speaker based on a gaze of the listener.

6. The control device according to claim 1, wherein
the control unit is further configured to output the information to the speaker based on a gesture of the listener.

7. The control device according to claim 1, wherein
the control unit is further configured to determine the processing overflow state based on one of a number of words or a number of parts of speech in the speech content.

8. The control device according to claim 1, wherein
the control unit is further configured to determine the processing overflow state based on a degree of difficulty of the speech content.

9. The control device according to claim 8, wherein
the control unit is further configured to control a display device on a speaker side, to display an effect, and
the effect indicates that the speech content does not enter an ear of the listener.

10. The control device according to claim 9, wherein
the control unit is further configured to stop display of a recognition result of the speech content on the display device of the speaker side.

11. The control device according to claim 9, wherein
the control unit is further configured to control a device, associated with the speech content, to output a sound that cancels a speech sound of the speaker.

12. A control method, comprising:
determining a processing overflow state of a listener based on an analysis of speech content associated with a speaker; and
outputting information to the speaker based on the determination of the processing overflow state of the listener, wherein
the speaker is in a speaking state, and
the output information indicates, to the speaker in the speaking state, that the listener is in the processing overflow state.

13. A non-transitory computer-readable medium having stored thereon, computer-executable instructions, which when executed by a computer, cause the computer to execute operations, the operations comprising:
determining a processing overflow state of a listener based on an analysis of speech content associated with a speaker; and
outputting information to the speaker based on the determination of the processing overflow state of the listener, wherein
the speaker is in a speaking state, and
the output information indicates, to the speaker in the speaking state, that the listener is in the processing overflow state.

* * * * *